(12) United States Patent
Ray et al.

(10) Patent No.: US 10,733,688 B2
(45) Date of Patent: Aug. 4, 2020

(54) AREA-EFFICIENT IMPLEMENTATIONS OF GRAPHICS INSTRUCTIONS

(71) Applicant: Intel Corporation, Santa Clara, CA (US)

(72) Inventors: Joydeep Ray, Folsom, CA (US); Prasoonkumar Surti, Folsom, CA (US); Abhishek R. Appu, El Dorado Hills, CA (US); Altug Koker, El Dorado Hills, CA (US); Vasanth Ranganathan, El Dorado Hills, CA (US)

(73) Assignee: INTEL CORPOATION, Santa Clara, CA (US)

( * ) Notice: Subject to any disclaimer, the term of this patent is extended or adjusted under 35 U.S.C. 154(b) by 4 days.

(21) Appl. No.: 15/716,280

(22) Filed: Sep. 26, 2017

(65) Prior Publication Data

US 2019/0096024 A1 Mar. 28, 2019

(51) Int. Cl.
*G06T 1/20* (2006.01)
*G06F 9/30* (2018.01)
*G06T 15/00* (2011.01)
*G06F 12/0875* (2016.01)
*G06F 12/1045* (2016.01)
*G06T 1/60* (2006.01)

(52) U.S. Cl.
CPC ............ *G06T 1/20* (2013.01); *G06F 9/30043* (2013.01); *G06F 12/0875* (2013.01); *G06F 12/1045* (2013.01); *G06T 1/60* (2013.01); *G06T 15/005* (2013.01); *G06F 2212/455* (2013.01); *G06F 2212/68* (2013.01)

(58) Field of Classification Search
CPC .. G06T 1/20; G06F 9/30043; G06F 2212/455
See application file for complete search history.

(56) References Cited

U.S. PATENT DOCUMENTS

| | | | | |
|---|---|---|---|---|
| 7,278,008 B1 * | 10/2007 | Case | ................... | G06F 12/1036 710/26 |
| 8,397,049 B2 * | 3/2013 | Wang | .................. | G06F 12/1027 711/207 |
| 9,652,560 B1 * | 5/2017 | Wang | ..................... | G06F 12/08 |

\* cited by examiner

*Primary Examiner* — Samantha (Yuehan) Wang
(74) *Attorney, Agent, or Firm* — Jaffery Watson Mendonsa & Hamilton LLP

(57) ABSTRACT

Embodiments are generally directed to area-efficient implementations of graphics instructions. An embodiment of an apparatus includes a graphics subsystem including one or more of a first logic for processing of memory read-return data for single-instruction-multiple-data instructions; a second logic for assembly of memory read-return data for media block instructions into shader register format; or a third logic to remap scatter or gather instructions to untyped surface instruction types. An embodiment of an apparatus includes a graphics subsystem including a translation lookaside buffer (TLB) and a data port controller to control the TLB, the data port controller including an incoming request pipeline to receive an incoming request with virtual address and generate a response, an incoming response pipeline to receive the response and generate a cache request, and an invalidation flow pipeline.

14 Claims, 33 Drawing Sheets

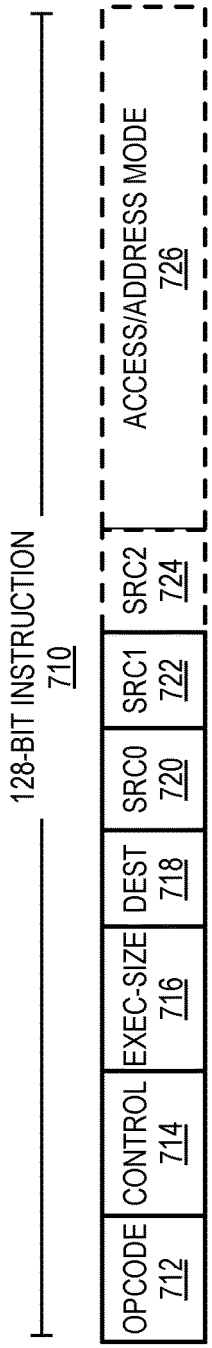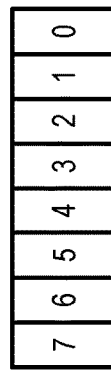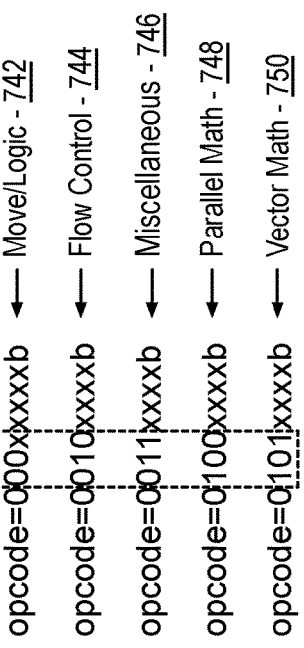
FIG. 7

FIG. 9A    GRAPHICS PROCESSOR COMMAND FORMAT
900
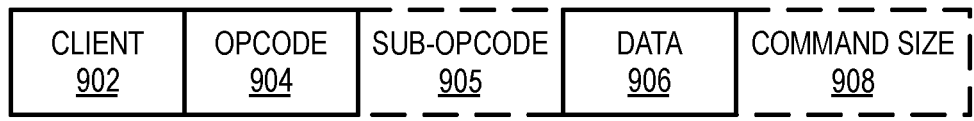
FIG. 9B    GRAPHICS PROCESSOR COMMAND SEQUENCE
910
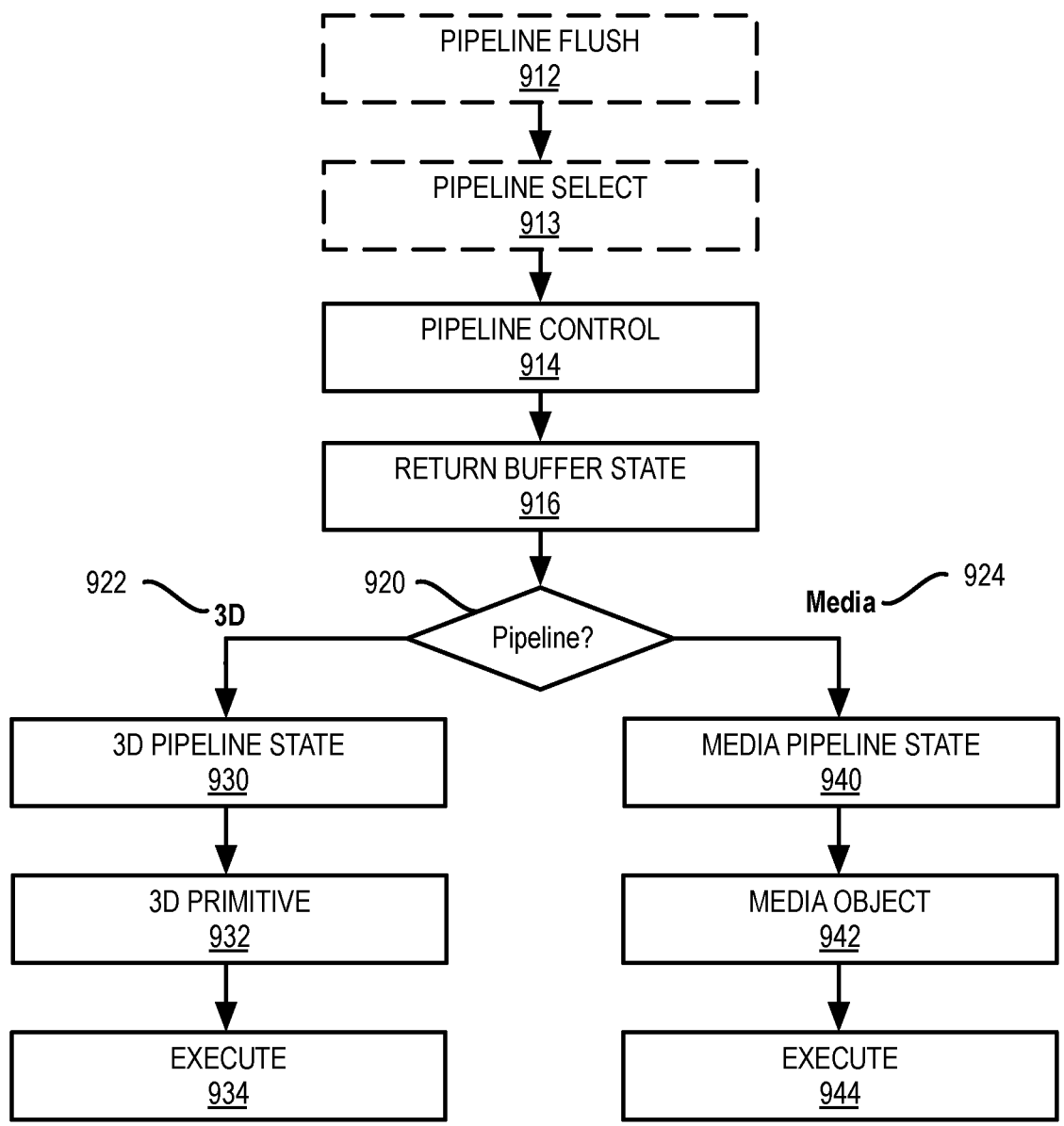

AREA-EFFICIENT IMPLEMENTATIONS OF GRAPHICS INSTRUCTIONS

TECHNICAL FIELD

Embodiments described herein generally relate to the field of electronic devices and, more particularly, area-efficient implementations of graphics instructions.

BACKGROUND

In computer operations, instructions such as single instruction multiple data (SIMD) and media block instructions are commonly utilized for in graphical processing operations. SIMD instructions are instructions in a parallel architecture in which an operation specified in one instruction applies to multiple sets of data. Media block instructions provide for either reading a rectangular block of data samples from a source surface and writing into a general register file array (GRF), or writing data from the GRF to a rectangular block.

However, conventional graphical processor unit (GPU) implementations require significant area and power consumption to support the processing of such instructions, and as a result such instructions are expensive to implement in a system.

BRIEF DESCRIPTION OF THE DRAWINGS

Embodiments described here are illustrated by way of example, and not by way of limitation, in the figures of the accompanying drawings in which like reference numerals refer to similar elements.

FIG. 7 is a block diagram illustrating graphics processor instruction formats according to some embodiments;

FIG. 9A is a block diagram illustrating a graphics processor command format according to some embodiments;

FIG. 9B is a block diagram illustrating a graphics processor command sequence according to an embodiment;

DETAILED DESCRIPTION

Embodiments described herein are generally directed to area-efficient implementations of graphics instructions.

System Overview

Figure 1:
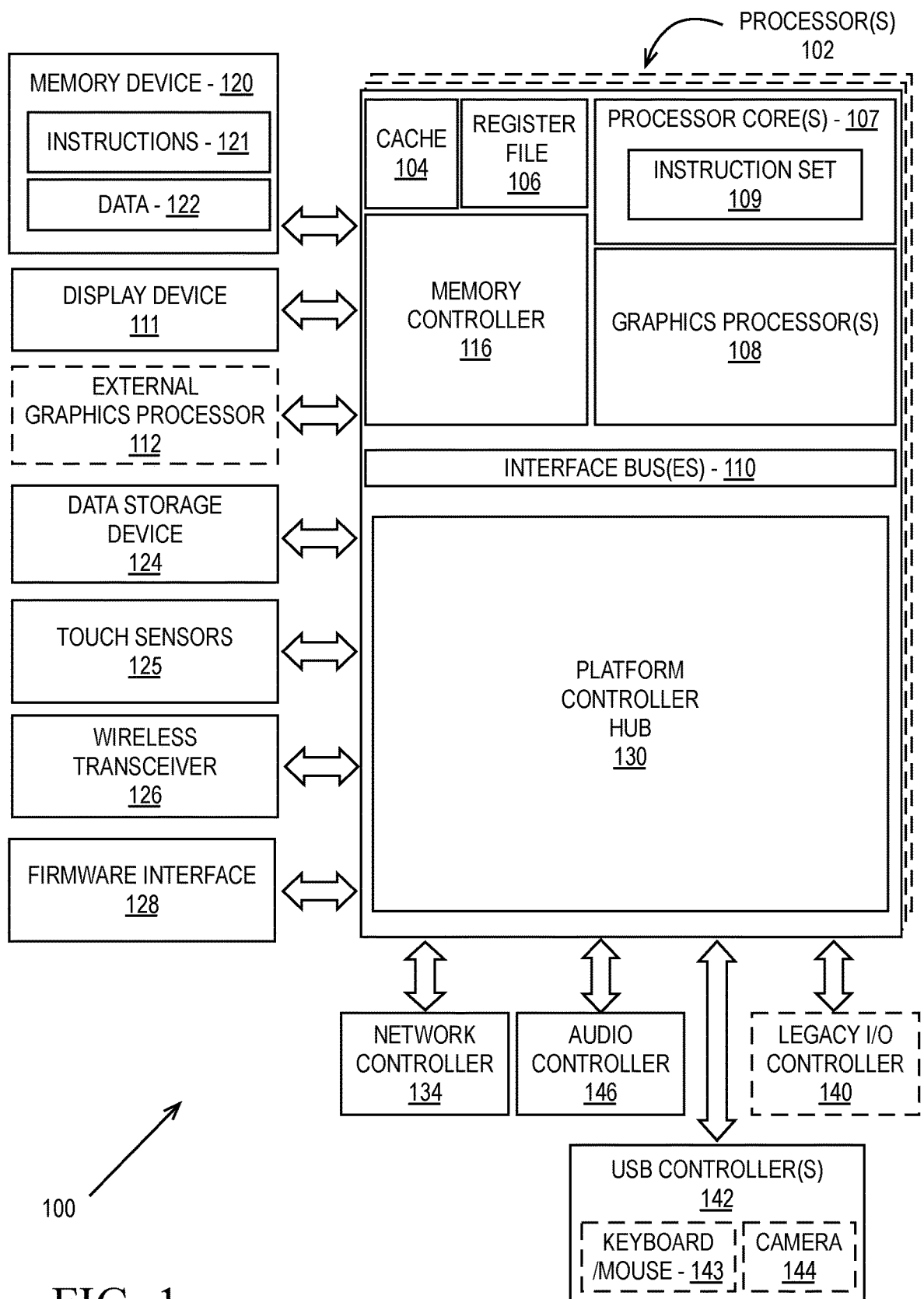
FIG. 1 is a block diagram of a processing system, according to some embodiments.

FIG. 1 is a block diagram of a processing system 100, according to an embodiment. In various embodiments, the system 100 includes one or more processors 102 and one or more graphics processors 108, and may be a single processor desktop system, a multiprocessor workstation system, or a server system having a large number of processors 102 or processor cores 107. In one embodiment, the system 100 is a processing platform incorporated within a system-on-a-chip (SoC) integrated circuit for use in mobile, handheld, or embedded devices.

In one embodiment the system 100 can include, or be incorporated within a server-based gaming platform, a game console, including a game and media console, a mobile gaming console, a handheld game console, or an online game console. In some embodiments the system 100 is a mobile phone, smart phone, tablet computing device or mobile Internet device. The processing system 100 can also include, couple with, or be integrated within a wearable device, such as a smart watch wearable device, smart eyewear device, augmented reality device, or virtual reality device. In some embodiments, the processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, one or more processor(s) 102 are coupled with one or more interface bus(es) 110 to transmit communication signals such as address, data, or control signals between processor 102 and other components in the system 100. The interface bus 110, in one embodiment, can be a processor bus, such as a version of the Direct Media Interface (DMI) bus. However, processor busses are not limited to the DMI bus, and may include one or more Peripheral Component Interconnect buses (e.g., PCI, PCI Express), memory busses, or other types of interface busses. In one embodiment the processor(s) 102 include an integrated memory controller 116 and a platform controller hub 130. The memory controller 116 facilitates communication between a memory device and other components of the system 100, while the platform controller hub (PCH) 130 provides connections to I/O devices via a local I/O bus.

The memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller 116 also couples with an optional external graphics processor 112, which may communicate with the one or more graphics processors 108 in processors 102 to perform graphics and media operations. In some embodiments a display device 111 can connect to the processor(s) 102. The display device 111 can be one or more of an internal display device, as in a mobile electronic device or a laptop device or an external display device attached via a display interface (e.g., DisplayPort, etc.). In one embodiment the display device 111 can be a head mounted display (HMD) such as a stereoscopic display device for use in virtual reality (VR) applications or augmented reality (AR) applications.

In some embodiments the platform controller hub 130 enables peripherals to connect to memory device 120 and processor 102 via a high-speed I/O bus. The I/O peripherals include, but are not limited to, an audio controller 146, a network controller 134, a firmware interface 128, a wireless transceiver 126, touch sensors 125, a data storage device 124 (e.g., hard disk drive, flash memory, etc.). The data storage device 124 can connect via a storage interface (e.g., SATA) or via a peripheral bus, such as a Peripheral Component Interconnect bus (e.g., PCI, PCI Express). The touch sensors 125 can include touch screen sensors, pressure sensors, or fingerprint sensors. The wireless transceiver 126 can be a Wi-Fi transceiver, a Bluetooth transceiver, or a mobile network transceiver such as a 3G, 4G, or Long Term Evolution (LTE) transceiver. The firmware interface 128 enables communication with system firmware, and can be, for example, a unified extensible firmware interface (UEFI). The network controller 134 can enable a network connection to a wired network. In some embodiments, a high-performance network controller (not shown) couples with the interface bus 110. The audio controller 146, in one embodiment, is a multi-channel high definition audio controller. In one embodiment the system 100 includes an optional legacy I/O controller 140 for coupling legacy (e.g., Personal System 2 (PS/2)) devices to the system. The platform controller hub 130 can also connect to one or more Universal Serial Bus (USB) controllers 142 connect input devices, such as keyboard and mouse 143 combinations, a camera 144, or other USB input devices.

It will be appreciated that the system 100 shown is exemplary and not limiting, as other types of data processing systems that are differently configured may also be used. For example, an instance of the memory controller 116 and platform controller hub 130 may be integrated into a discreet external graphics processor, such as the external graphics processor 112. In one embodiment the platform controller hub 130 and/or memory controller 160 may be external to the one or more processor(s) 102. For example, the system 100 can include an external memory controller 116 and platform controller hub 130, which may be configured as a memory controller hub and peripheral controller hub within a system chipset that is in communication with the processor(s) 102.

Figure 2:
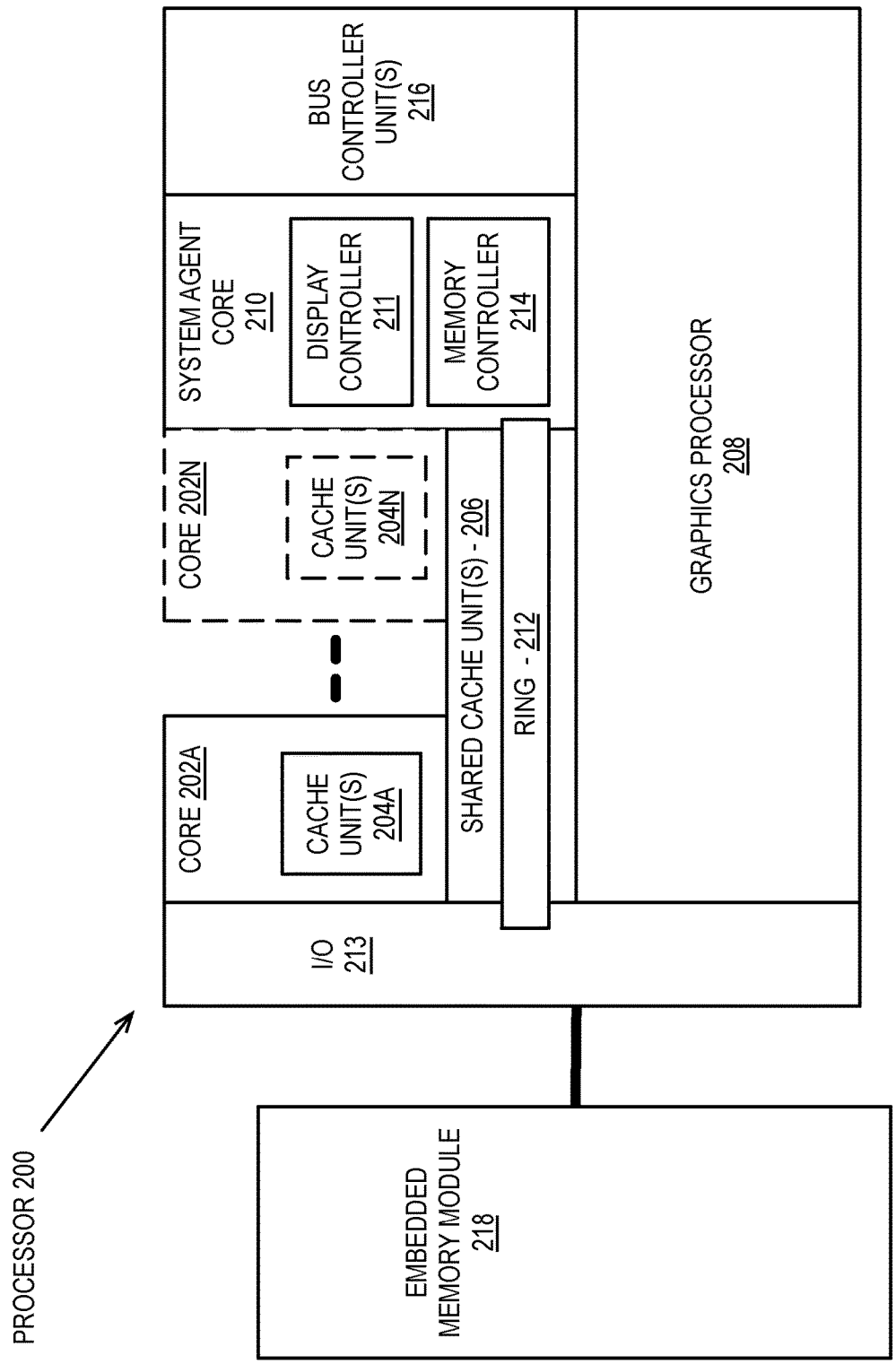
FIG. 2 is a block diagram of an embodiment of a processor having one or more processor cores, an integrated memory controller, and an integrated graphics processor.

FIG. 2 is a block diagram of an embodiment of a processor 200 having one or more processor cores 202A-202N, an integrated memory controller 214, and an integrated graphics processor 208. Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more PCI or PCI express busses. System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, the system agent core 210 also includes a display controller 211 to drive graphics processor output to one or more coupled displays. In some embodiments, display controller 211 may also be a separate module coupled with the graphics processor via at least one interconnect, or may be integrated within the graphics processor 208.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202A-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-202N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 3:
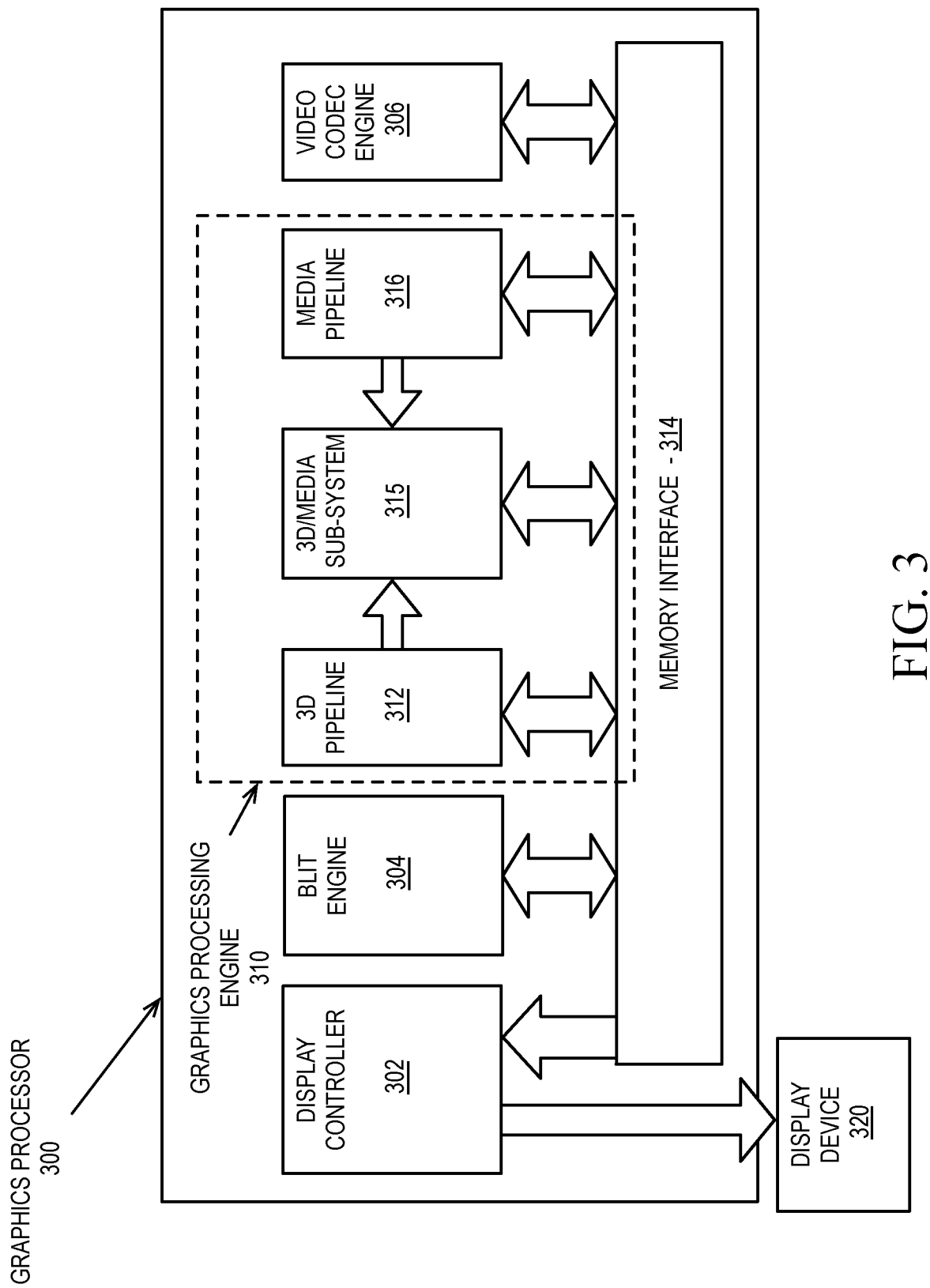
FIG. 3 is a block diagram of a graphics processor according to some embodiments.

FIG. 3 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. The display device 320 can be an internal or external display device. In one embodiment the display device 320 is a head mounted display device, such as a virtual reality (VR) display device or an augmented reality (AR) display device. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, GPE 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media subsystem 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

Graphics Processing Engine

Figure 4:
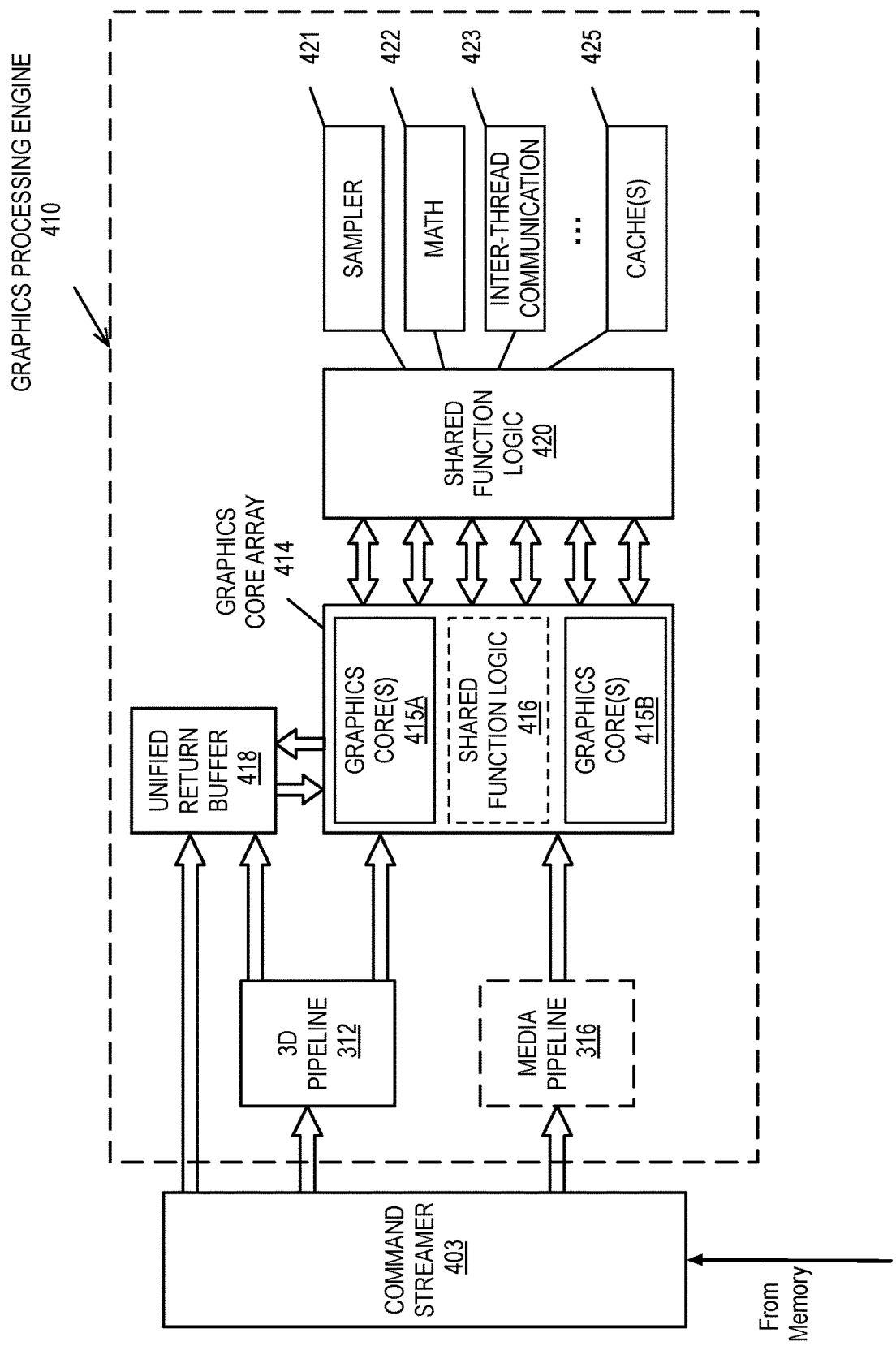
FIG. 4 is a block diagram of a graphics processing engine of a graphics processor in accordance with some embodiments.

FIG. 4 is a block diagram of a graphics processing engine 410 of a graphics processor in accordance with some embodiments. In one embodiment, the graphics processing engine (GPE) 410 is a version of the GPE 310 shown in FIG. 3. Elements of FIG. 4 having the same reference numbers (or names) as the elements of any other figure herein can operate or function in any manner similar to that described elsewhere herein, but are not limited to such. For example, the 3D pipeline 312 and media pipeline 316 of FIG. 3 are illustrated. The media pipeline 316 is optional in some embodiments of the GPE 410 and may not be explicitly included within the GPE 410. For example and in at least one embodiment, a separate media and/or image processor is coupled to the GPE 410.

In some embodiments, GPE 410 couples with or includes a command streamer 403, which provides a command stream to the 3D pipeline 312 and/or media pipelines 316. In some embodiments, command streamer 403 is coupled with memory, which can be system memory, or one or more of internal cache memory and shared cache memory. In some embodiments, command streamer 403 receives commands from the memory and sends the commands to 3D pipeline 312 and/or media pipeline 316. The commands are directives fetched from a ring buffer, which stores commands for the 3D pipeline 312 and media pipeline 316. In one embodiment, the ring buffer can additionally include batch command buffers storing batches of multiple commands. The commands for the 3D pipeline 312 can also include references to data stored in memory, such as but not limited to vertex and geometry data for the 3D pipeline 312 and/or image data and memory objects for the media pipeline 316. The 3D pipeline 312 and media pipeline 316 process the commands and data by performing operations via logic within the respective pipelines or by dispatching one or more execution threads to a graphics core array 414. In one embodiment the graphics core array 414 include one or more blocks of graphics cores (e.g., graphics core(s) 415A, graphics core(s) 415B), each block including one or more graphics cores. Each graphics core includes a set of graphics execution resources that includes general-purpose and graphics specific execution logic to perform graphics and compute operations, as well as fixed function texture processing and/or machine learning and artificial intelligence acceleration logic.

In various embodiments the 3D pipeline 312 includes fixed function and programmable logic to process one or more shader programs, such as vertex shaders, geometry shaders, pixel shaders, fragment shaders, compute shaders, or other shader programs, by processing the instructions and dispatching execution threads to the graphics core array 414. The graphics core array 414 provides a unified block of execution resources for use in processing these shader programs. Multi-purpose execution logic (e.g., execution units) within the graphics core(s) 415A-414B of the graphic core array 414 includes support for various 3D API shader languages and can execute multiple simultaneous execution threads associated with multiple shaders.

In some embodiments the graphics core array 414 also includes execution logic to perform media functions, such as video and/or image processing. In one embodiment, the execution units additionally include general-purpose logic that is programmable to perform parallel general-purpose computational operations, in addition to graphics processing operations. The general-purpose logic can perform processing operations in parallel or in conjunction with general-purpose logic within the processor core(s) 107 of FIG. 1 or core 202A-202N as in FIG. 2.

Output data generated by threads executing on the graphics core array 414 can output data to memory in a unified return buffer (URB) 418. The URB 418 can store data for multiple threads. In some embodiments the URB 418 may be used to send data between different threads executing on the graphics core array 414. In some embodiments the URB 418 may additionally be used for synchronization between threads on the graphics core array and fixed function logic within the shared function logic 420.

In some embodiments, graphics core array 414 is scalable, such that the array includes a variable number of graphics cores, each having a variable number of execution units based on the target power and performance level of GPE 410. In one embodiment the execution resources are dynamically scalable, such that execution resources may be enabled or disabled as needed.

The graphics core array 414 couples with shared function logic 420 that includes multiple resources that are shared between the graphics cores in the graphics core array. The shared functions within the shared function logic 420 are hardware logic units that provide specialized supplemental functionality to the graphics core array 414. In various embodiments, shared function logic 420 includes but is not limited to sampler 421, math 422, and inter-thread communication (ITC) 423 logic. Additionally, some embodiments implement one or more cache(s) 425 within the shared function logic 420.

A shared function is implemented where the demand for a given specialized function is insufficient for inclusion within the graphics core array 414. Instead a single instantiation of that specialized function is implemented as a stand-alone entity in the shared function logic 420 and shared among the execution resources within the graphics core array 414. The precise set of functions that are shared between the graphics core array 414 and included within the graphics core array 414 varies across embodiments. In some embodiments, specific shared functions within the shared function logic 420 that are used extensively by the graphics core array 414 may be included within shared function logic 416 within the graphics core array 414. In various embodiments, the shared function logic 416 within the graphics core array 414 can include some or all logic within the shared function logic 420. In one embodiment, all logic elements within the shared function logic 420 may be duplicated within the shared function logic 416 of the graphics core array 414. In one embodiment the shared function logic 420 is excluded in favor of the shared function logic 416 within the graphics core array 414.

Figure 5:
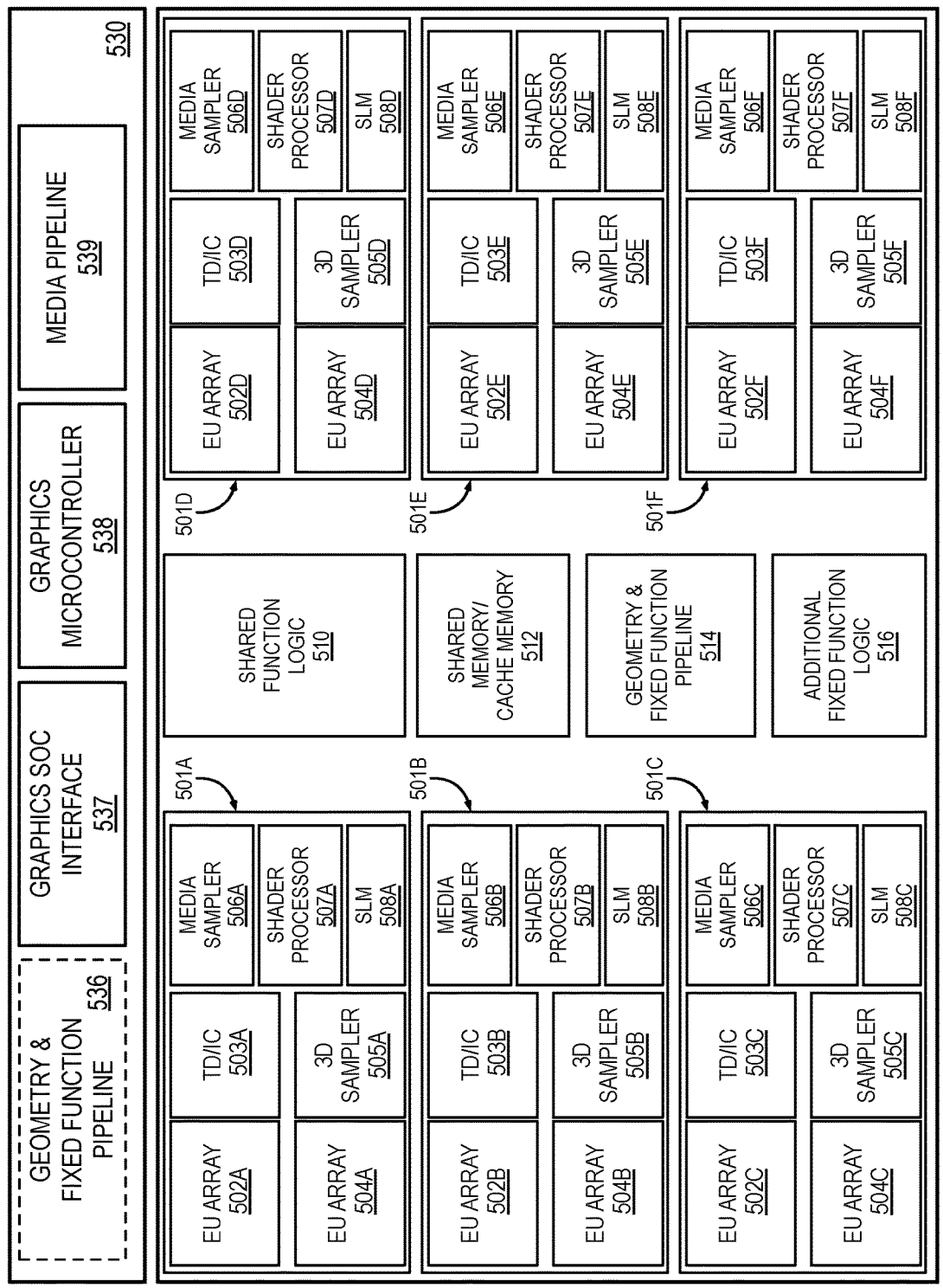
FIG. 5 is a block diagram of hardware logic of a graphics processor core 500, according to some embodiments.

FIG. 5 is a block diagram of hardware logic of a graphics processor core 500, according to some embodiments described herein. Elements of FIG. 5 having the same reference numbers (or names) as the elements of any other figure herein can operate or function in any manner similar to that described elsewhere herein, but are not limited to such. The illustrated graphics processor core 500, in some embodiments, is included within the graphics core array 414 of FIG. 4. The graphics processor core 500, sometimes referred to as a core slice, can be one or multiple graphics cores within a modular graphics processor. The graphics processor core 500 is exemplary of one graphics core slice, and a graphics processor as described herein may include multiple graphics core slices based on target power and performance envelopes. Each graphics core 500 can include a fixed function block 530 coupled with multiple sub-cores 501A-501F, also referred to as sub-slices, that include modular blocks of general-purpose and fixed function logic.

In some embodiments the fixed function block 530 includes a geometry/fixed function pipeline 536 that can be shared by all sub-cores in the graphics processor 500, for example, in lower performance and/or lower power graphics processor implementations. In various embodiments, the geometry/fixed function pipeline 536 includes a 3D fixed function pipeline (e.g., 3D pipeline 312 as in FIG. 3 and FIG. 4) a video front-end unit, a thread spawner and thread dispatcher, and a unified return buffer manager, which manages unified return buffers, such as the unified return buffer 418 of FIG. 4.

In one embodiment the fixed function block 530 also includes a graphics SoC interface 537, a graphics microcontroller 538, and a media pipeline 539. The graphics SoC interface 537 provides an interface between the graphics core 500 and other processor cores within a system on a chip integrated circuit. The graphics microcontroller 538 is a programmable sub-processor that is configurable to manage various functions of the graphics processor 500, including thread dispatch, scheduling, and pre-emption. The media pipeline 539 (e.g., media pipeline 316 of FIG. 3 and FIG. 4) includes logic to facilitate the decoding, encoding, pre-processing, and/or post-processing of multimedia data, including image and video data. The media pipeline 539 implement media operations via requests to compute or sampling logic within the sub-cores 501-501F.

In one embodiment the SoC interface 537 enables the graphics core 500 to communicate with general-purpose application processor cores (e.g., CPUs) and/or other components within an SoC, including memory hierarchy elements such as a shared last level cache memory, the system RAM, and/or embedded on-chip or on-package DRAM. The SoC interface 537 can also enable communication with fixed function devices within the SoC, such as camera imaging pipelines, and enables the use of and/or implements global memory atomics that may be shared between the graphics core 500 and CPUs within the SoC. The SoC interface 537 can also implement power management controls for the graphics core 500 and enable an interface between a clock domain of the graphic core 500 and other clock domains within the SoC. In one embodiment the SoC interface 537 enables receipt of command buffers from a command streamer and global thread dispatcher that are configured to provide commands and instructions to each of one or more graphics cores within a graphics processor. The commands and instructions can be dispatched to the media pipeline 539, when media operations are to be performed, or a geometry and fixed function pipeline (e.g., geometry and fixed function pipeline 536, geometry and fixed function pipeline 514) when graphics processing operations are to be performed.

The graphics microcontroller 538 can be configured to perform various scheduling and management tasks for the graphics core 500. In one embodiment the graphics microcontroller 538 can perform graphics and/or compute workload scheduling on the various graphics parallel engines within execution unit (EU) arrays 502A-502F, 504A-504F within the sub-cores 501A-501F. In this scheduling model, host software executing on a CPU core of an SoC including the graphics core 500 can submit workloads one of multiple graphic processor doorbells, which invokes a scheduling operation on the appropriate graphics engine. Scheduling operations include determining which workload to run next, submitting a workload to a command streamer, pre-empting existing workloads running on an engine, monitoring progress of a workload, and notifying host software when a workload is complete. In one embodiment the graphics microcontroller 538 can also facilitate low-power or idle states for the graphics core 500, providing the graphics core 500 with the ability to save and restore registers within the graphics core 500 across low-power state transitions independently from the operating system and/or graphics driver software on the system.

The graphics core 500 may have greater than or fewer than the illustrated sub-cores 501A-501F, up to N modular sub-cores. For each set of N sub-cores, the graphics core 500 can also include shared function logic 510, shared and/or cache memory 512, a geometry/fixed function pipeline 514, as well as additional fixed function logic 516 to accelerate various graphics and compute processing operations. The shared function logic 510 can include logic units associated with the shared function logic 420 of FIG. 4 (e.g., sampler, math, and/or inter-thread communication logic) that can be shared by each N sub-cores within the graphics core 500. The shared and/or cache memory 512 can be a last-level cache for the set of N sub-cores 501A-501F within the graphics core 500, and can also serve as shared memory that is accessible by multiple sub-cores. The geometry/fixed function pipeline 514 can be included instead of the geometry/fixed function pipeline 536 within the fixed function block 530 and can include the same or similar logic units.

In one embodiment the graphics core 500 includes additional fixed function logic 516 that can include various fixed function acceleration logic for use by the graphics core 500. In one embodiment the additional fixed function logic 516 includes an additional geometry pipeline for use in position only shading. In position-only shading, two geometry pipelines exist, the full geometry pipeline within the geometry/fixed function pipeline 516, 536, and a cull pipeline, which is an additional geometry pipeline which may be included within the additional fixed function logic 516. In one embodiment the cull pipeline is a trimmed down version of the full geometry pipeline. The full pipeline and the cull pipeline can execute different instances of the same application, each instance having a separate context. Position only shading can hide long cull runs of discarded triangles, enabling shading to be completed earlier in some instances. For example and in one embodiment the cull pipeline logic within the additional fixed function logic 516 can execute position shaders in parallel with the main application and generally generates critical results faster than the full pipeline, as the cull pipeline fetches and shades only the position attribute of the vertices, without performing rasterization and rendering of the pixels to the frame buffer. The cull pipeline can use the generated critical results to compute visibility information for all the triangles without regard to whether those triangles are culled. The full pipeline (which in this instance may be referred to as a replay pipeline) can consume the visibility information to skip the culled triangles to shade only the visible triangles that are finally passed to the rasterization phase.

In one embodiment the additional fixed function logic 516 can also include machine-learning acceleration logic, such as fixed function matrix multiplication logic, for implementations including optimizations for machine learning training or inferencing.

Within each graphics sub-core 501A-501F includes a set of execution resources that may be used to perform graphics, media, and compute operations in response to requests by graphics pipeline, media pipeline, or shader programs. The graphics sub-cores 501A-501F include multiple EU arrays 502A-502F, 504A-504F, thread dispatch and inter-thread communication (TD/IC) logic 503A-503F, a 3D (e.g., texture) sampler 505A-505F, a media sampler 506A-506F, a shader processor 507A-507F, and shared local memory (SLM) 508A-508F. The EU arrays 502A-502F, 504A-504F each include multiple execution units, which are general-purpose graphics processing units capable of performing floating-point and integer/fixed-point logic operations in service of a graphics, media, or compute operation, including graphics, media, or compute shader programs. The TD/IC logic 503A-503F performs local thread dispatch and thread control operations for the execution units within a sub-core and facilitate communication between threads executing on the execution units of the sub-core. The 3D sampler 505A-505F can read texture or other 3D graphics related data into memory. The 3D sampler can read texture data differently based on a configured sample state and the texture format associated with a given texture. The media sampler 506A-506F can perform similar read operations based on the type and format associated with media data. In one embodiment, each graphics sub-core 501A-501F can alternately include a unified 3D and media sampler. Threads executing on the execution units within each of the sub-cores 501A-501F can make use of shared local memory 508A-508F within each sub-core, to enable threads executing within a thread group to execute using a common pool of on-chip memory.

Execution Units

Figure 6A:
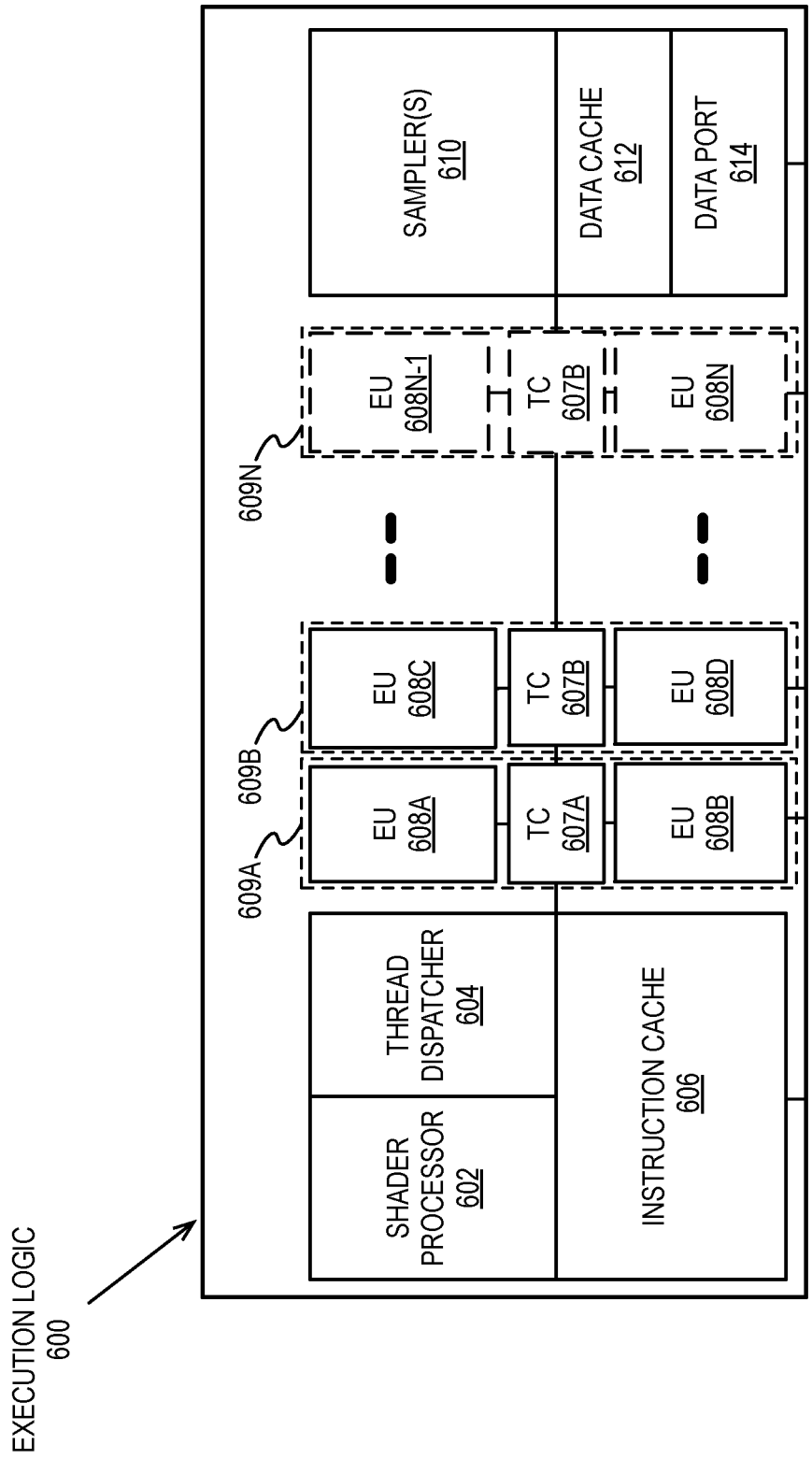
FIGS. 6A-6B illustrate thread execution logic including an array of processing elements employed in a graphics processor core according to some embodiments.
Figure 6B:
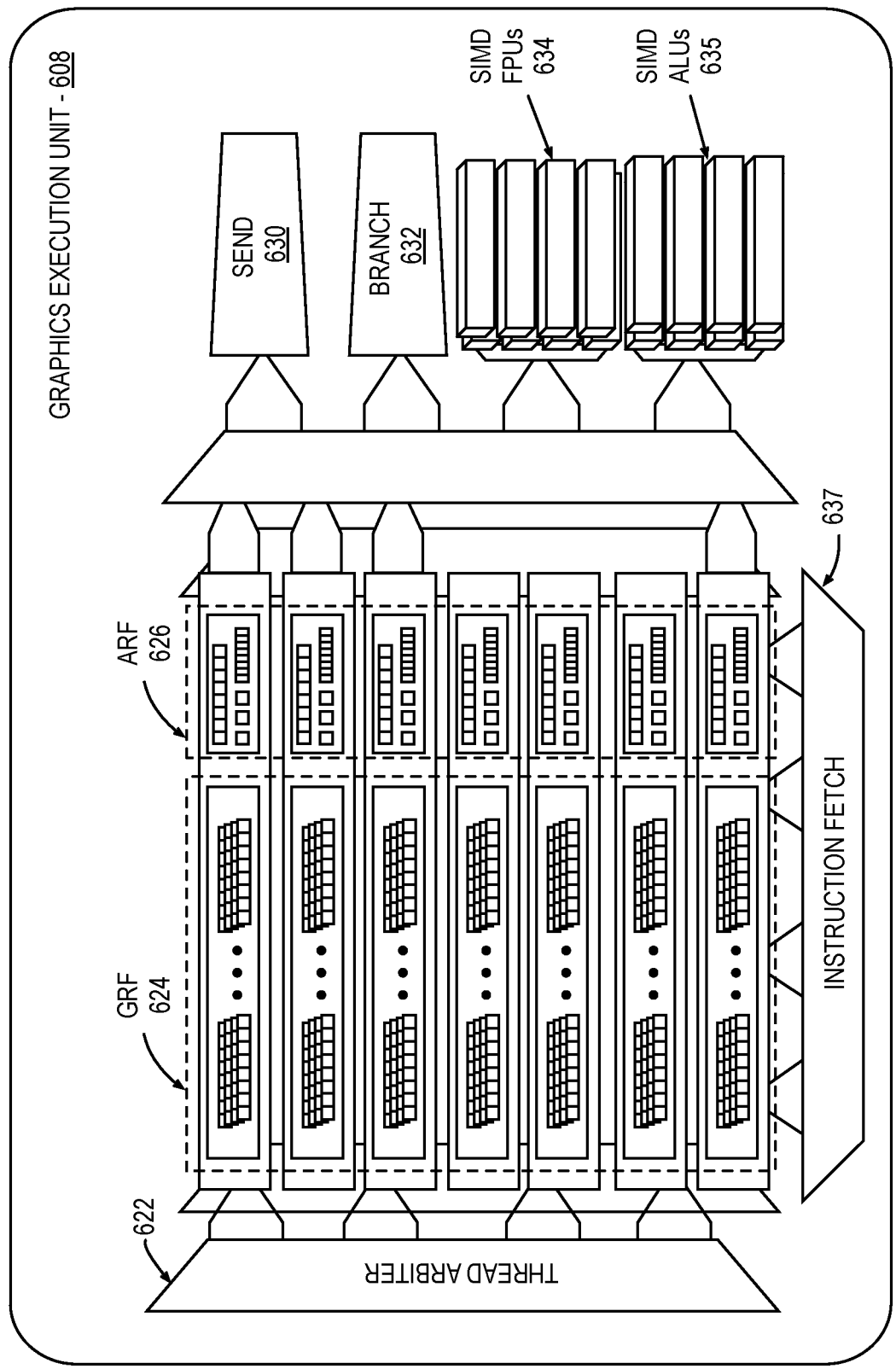

FIGS. 6A-6B illustrate thread execution logic 600 including an array of processing elements employed in a graphics processor core according to embodiments described herein. Elements of FIGS. 6A-6B having the same reference numbers (or names) as the elements of any other figure herein can operate or function in any manner similar to that described elsewhere herein, but are not limited to such. FIG. 6A illustrates an overview of thread execution logic 600, which can include a variant of the hardware logic illustrated with each sub-core 501A-501F of FIG. 5. FIG. 6B illustrates exemplary internal details of an execution unit.

As illustrated in FIG. 6A, in some embodiments thread execution logic 600 includes a shader processor 602, a thread dispatcher 604, instruction cache 606, a scalable execution unit array including a plurality of execution units 608A-608N, a sampler 610, a data cache 612, and a data port 614. In one embodiment the scalable execution unit array can dynamically scale by enabling or disabling one or more execution units (e.g., any of execution unit 608A, 608B, 608C, 608D, through 608N-1 and 608N) based on the computational requirements of a workload. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution units 608A-608N. In some embodiments, each execution unit (e.g. 608A) is a stand-alone programmable general-purpose computational unit that is capable of executing multiple simultaneous hardware threads while processing multiple data elements in parallel for each thread. In various embodiments, the array of execution units 608A-608N is scalable to include any number individual execution units.

In some embodiments, the execution units 608A-608N are primarily used to execute shader programs. A shader processor 602 can process the various shader programs and dispatch execution threads associated with the shader programs via a thread dispatcher 604. In one embodiment the thread dispatcher includes logic to arbitrate thread initiation requests from the graphics and media pipelines and instantiate the requested threads on one or more execution unit in the execution units 608A-608N. For example, a geometry pipeline can dispatch vertex, tessellation, or geometry shaders to the thread execution logic for processing. In some embodiments, thread dispatcher 604 can also process runtime thread spawning requests from the executing shader programs.

In some embodiments, the execution units 608A-608N support an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders). Each of the execution units 608A-608N is capable of multi-issue single instruction multiple data (SIMD) execution and multi-threaded operation enables an efficient execution environment in the face of higher latency memory accesses. Each hardware thread within each execution unit has a dedicated high-bandwidth register file and associated independent thread-state. Execution is multi-issue per clock to pipelines capable of integer, single and double precision floating point operations, SIMD branch capability, logical operations, transcendental operations, and other miscellaneous operations. While waiting for data from memory or one of the shared functions, dependency logic within the execution units 608A-608N causes a waiting thread to sleep until the requested data has been returned. While the waiting thread is sleeping, hardware resources may be devoted to processing other threads. For example, during a delay associated with a vertex shader operation, an execution unit can perform operations for a pixel shader, fragment shader, or another type of shader program, including a different vertex shader.

Each execution unit in execution units 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes SIMD instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

In one embodiment one or more execution units can be combined into a fused execution unit 609A-609N having thread control logic (607A-607N) that is common to the fused EUs. Multiple EUs can be fused into an EU group. Each EU in the fused EU group can be configured to execute a separate SIMD hardware thread. The number of EUs in a fused EU group can vary according to embodiments. Additionally, various SIMD widths can be performed per-EU, including but not limited to SIMD8, SIMD16, and SIMD32. Each fused graphics execution unit 609A-609N includes at least two execution units. For example, fused execution unit 609A includes a first EU 608A, second EU 608B, and thread control logic 607A that is common to the first EU 608A and the second EU 608B. The thread control logic 607A controls threads executed on the fused graphics execution unit 609A, allowing each EU within the fused execution units 609A-609N to execute using a common instruction pointer register.

One or more internal instruction caches (e.g., 606) are included in the thread execution logic 600 to cache thread instructions for the execution units. In some embodiments, one or more data caches (e.g., 612) are included to cache thread data during thread execution. In some embodiments, a sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. Once a group of geometric objects has been processed and rasterized into pixel data, pixel processor logic (e.g., pixel shader logic, fragment shader logic, etc.) within the shader processor 602 is invoked to further compute output information and cause results to be written to output surfaces (e.g., color buffers, depth buffers, stencil buffers, etc.). In some embodiments, a pixel shader or fragment shader calculates the values of the various vertex attributes that are to be interpolated across the rasterized object. In some embodiments, pixel processor logic within the shader processor 602 then executes an application programming interface (API)-supplied pixel or fragment shader program. To execute the shader program, the shader processor 602 dispatches threads to an execution unit (e.g., 608A) via a thread dispatcher 604. In some embodiments, shader processor 602 uses texture sampling logic in the sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 to output processed data to memory for further processing on a graphics processor output pipeline. In some embodiments, the data port 614 includes or couples to one or more cache memories (e.g., data cache 612) to cache data for memory access via the data port.

As illustrated in FIG. 6B, a graphics execution unit 608 can include an instruction fetch unit 637, a general register file array (GRF) 624, an architectural register file array (ARF) 626, a thread arbiter 622, a send unit 630, a branch unit 632, a set of SIMD floating point units (FPUs) 634, and in one embodiment a set of dedicated integer SIMD ALUs 635. The GRF 624 and ARF 626 includes the set of general register files and architecture register files associated with each simultaneous hardware thread that may be active in the graphics execution unit 608. In one embodiment, per thread architectural state is maintained in the ARF 626, while data used during thread execution is stored in the GRF 624. The execution state of each thread, including the instruction pointers for each thread, can be held in thread-specific registers in the ARF 626.

In one embodiment the graphics execution unit 608 has an architecture that is a combination of Simultaneous Multi-Threading (SMT) and fine-grained Interleaved Multi-Threading (IMT). The architecture has a modular configuration that can be fine-tuned at design time based on a target number of simultaneous threads and number of registers per execution unit, where execution unit resources are divided across logic used to execute multiple simultaneous threads.

In one embodiment, the graphics execution unit 608 can co-issue multiple instructions, which may each be different instructions. The thread arbiter 622 of the graphics execution unit thread 608 can dispatch the instructions to one of the send unit 630, branch unit 642, or SIMD FPU(s) 634 for execution. Each execution thread can access 128 general-purpose registers within the GRF 624, where each register can store 32 bytes, accessible as a SIMD 8-element vector of 32-bit data elements. In one embodiment, each execution unit thread has access to 4 Kbytes within the GRF 624, although embodiments are not so limited, and greater or fewer register resources may be provided in other embodiments. In one embodiment up to seven threads can execute simultaneously, although the number of threads per execution unit can also vary according to embodiments. In an embodiment in which seven threads may access 4 Kbytes, the GRF 624 can store a total of 28 Kbytes. Flexible addressing modes can permit registers to be addressed together to build effectively wider registers or to represent strided rectangular block data structures.

In one embodiment, memory operations, sampler operations, and other longer-latency system communications are dispatched via "send" instructions that are executed by the message passing send unit 630. In one embodiment, branch instructions are dispatched to a dedicated branch unit 632 to facilitate SIMD divergence and eventual convergence.

In one embodiment the graphics execution unit 608 includes one or more SIMD floating point units (FPU(s)) 634 to perform floating-point operations. In one embodiment, the FPU(s) 634 also support integer computation. In one embodiment the FPU(s) 634 can SIMD execute up to M number of 32-bit floating-point (or integer) operations, or SIMD execute up to 2M 16-bit integer or 16-bit floating-point operations. In one embodiment, at least one of the FPU(s) provides extended math capability to support high-throughput transcendental math functions and double precision 64-bit floating-point. In some embodiments, a set of 8-bit integer SIMD ALUs 635 are also present, and may be specifically optimized to perform operations associated with machine learning computations.

In one embodiment, arrays of multiple instances of the graphics execution unit 608 can be instantiated in a graphics sub-core grouping (e.g., a sub-slice). For scalability, product architects can choose the exact number of execution units per sub-core grouping. In one embodiment the execution unit 608 can execute instructions across a plurality of execution channels. In a further embodiment, each thread executed on the graphics execution unit 608 is executed on a different channel.

FIG. 7 is a block diagram illustrating graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit instruction format 710. A 64-bit compacted instruction format 730 is available for some instructions based on the selected instruction, instruction options, and number of operands. The native 128-bit instruction format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit instruction format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For instructions in the 128-bit instruction format 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 720, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode field 726 specifying, for example, whether direct register addressing mode or indirect register addressing mode is used. When direct register addressing mode is used, the register address of one or more operands is directly provided by bits in the instruction.

In some embodiments, the 128-bit instruction format 710 includes an access/address mode field 726, which specifies an address mode and/or an access mode for the instruction. In one embodiment the access mode is used to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction may use byte-aligned addressing for source and destination operands and when in a second mode, the instruction may use 16-byte-aligned addressing for all source and destination operands.

In one embodiment, the address mode portion of the access/address mode field 726 determines whether the instruction is to use direct or indirect addressing. When direct register addressing mode is used bits in the instruction directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 8:
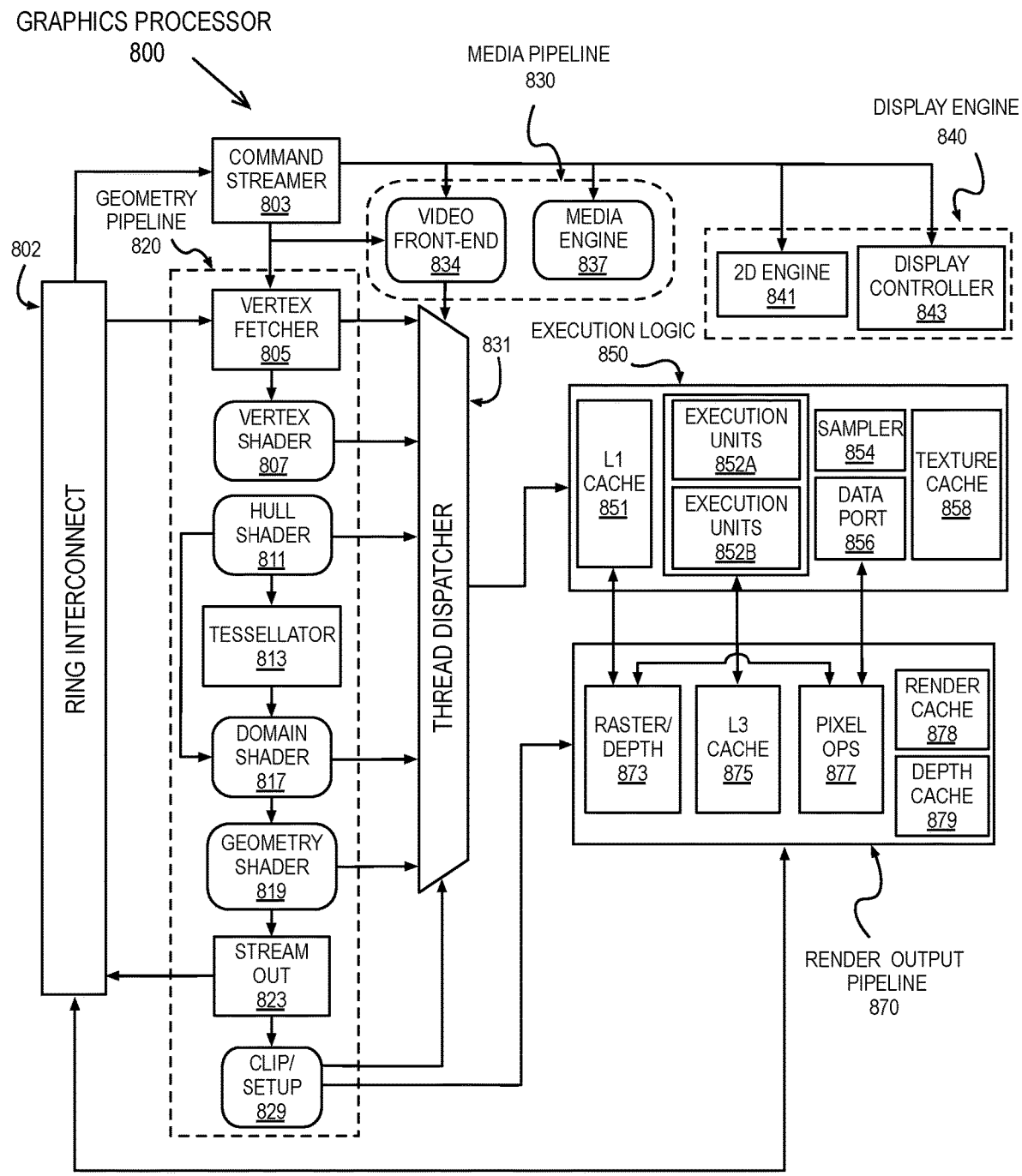
FIG. 8 is a block diagram of another embodiment of a graphics processor.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a geometry pipeline 820, a media pipeline 830, a display engine 840, thread execution logic 850, and a render output pipeline 870. In some embodiments, graphics processor 800 is a graphics processor within a multi-core processing system that includes one or more general-purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of the geometry pipeline 820 or the media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A-852B via a thread dispatcher 831.

In some embodiments, execution units 852A-852B are an array of vector processors having an instruction set for performing graphics and media operations. In some embodiments, execution units 852A-852B have an attached L1 cache 851 that is specific for each array or shared between the arrays. The cache can be configured as a data cache, an instruction cache, or a single cache that is partitioned to contain data and instructions in different partitions.

In some embodiments, geometry pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to geometry pipeline 820. In some embodiments, if tessellation is not used, tessellation components (e.g., hull shader 811, tessellator 813, and domain shader 817) can be bypassed.

In some embodiments, complete geometric objects can be processed by a geometry shader 819 via one or more threads dispatched to execution units 852A-852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into per pixel representations. In some embodiments, pixel shader logic is included in thread execution logic 850. In some embodiments, an application can bypass the rasterizer and depth test component 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A-852B and associated logic units (e.g., L1 cache 851, sampler 854, texture cache 858, etc.) interconnect via a data port 856 to perform memory access and communicate with render output pipeline components of the processor. In some embodiments, sampler 854, caches 851, 858 and execution units 852A-852B each have separate memory access paths. In one embodiment the texture cache 858 can also be configured as a sampler cache.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front-end 834. In some embodiments, video front-end 834 receives pipeline commands from the command streamer 803. In some embodiments, media pipeline 830 includes a separate command streamer. In some embodiments, video front-end 834 processes media commands before sending the command to the media engine 837. In some embodiments, media engine 837 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, the geometry pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL), Open Computing Language (OpenCL), and/or Vulkan graphics and compute API, all from the Khronos Group. In some embodiments, support may also be provided for the Direct3D library from the Microsoft Corporation. In some embodiments, a combination of these libraries may be supported. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a client 902, a command operation code (opcode) 904, and data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 9B illustrates an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930 or the media pipeline 924 beginning at the media pipeline state 940.

The commands to configure the 3D pipeline state 930 include 3D state setting commands for vertex buffer state, vertex element state, constant color state, depth buffer state, and other state variables that are to be configured before 3D primitive commands are processed. The values of these commands are determined at least in part based on the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment, command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general-purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of commands to configure the media pipeline state 940 are dispatched or placed into a command queue before the media object commands 942. In some embodiments, commands for the media pipeline state 940 include data to configure the media pipeline elements that will be used to process the media objects. This includes data to configure the video decode and video encode logic within the media pipeline, such as encode or decode format. In some embodiments, commands for the media pipeline state 940 also support the use of one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
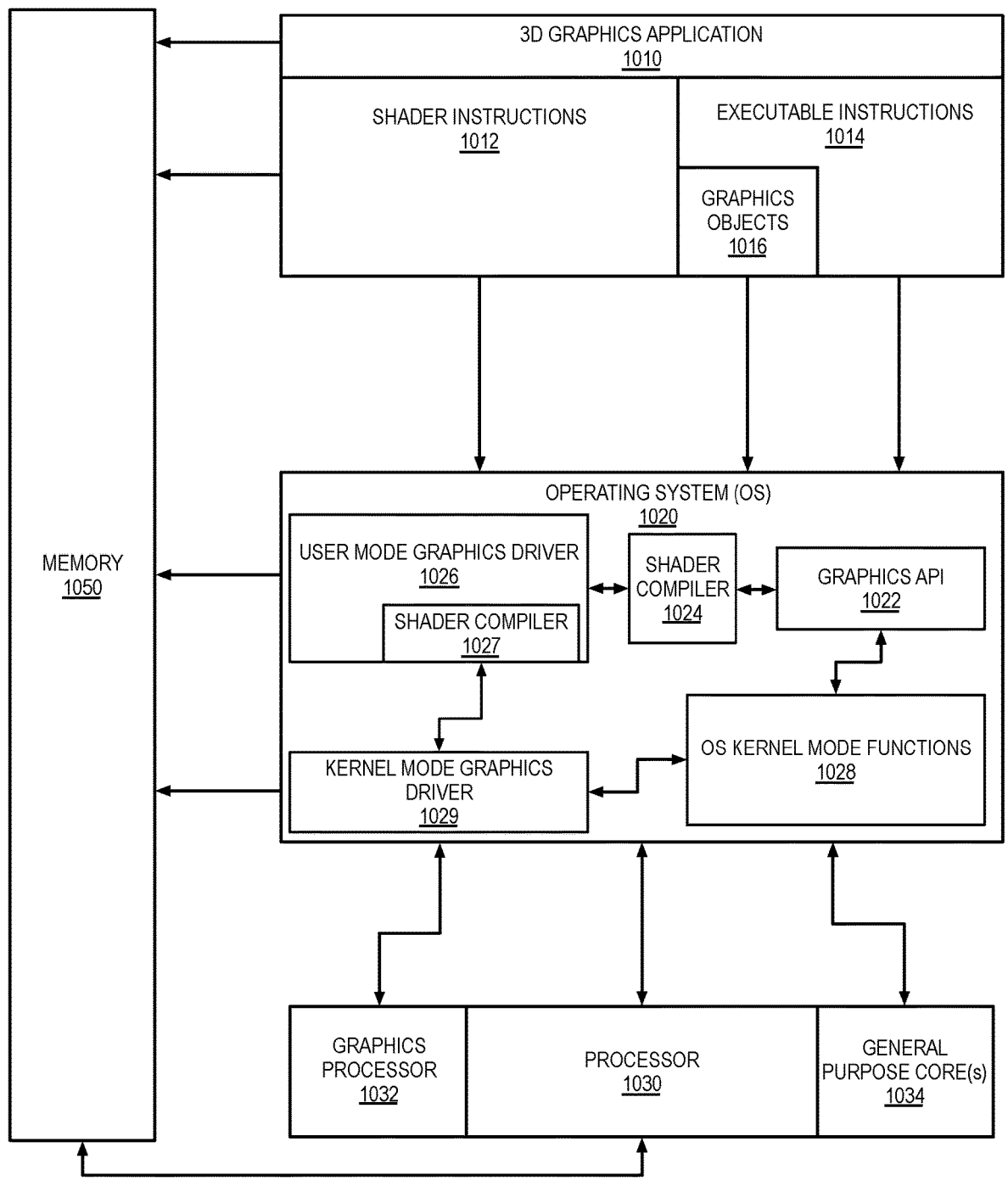
FIG. 10 illustrates exemplary graphics software architecture for a data processing system according to some embodiments.

FIG. 10 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. The operating system 1020 can support a graphics API 1022 such as the Direct3D API, the OpenGL API, or the Vulkan API. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010. In some embodiments, the shader instructions 1012 are provided in an intermediate form, such as a version of the Standard Portable Intermediate Representation (SPIR) used by the Vulkan API.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11A:
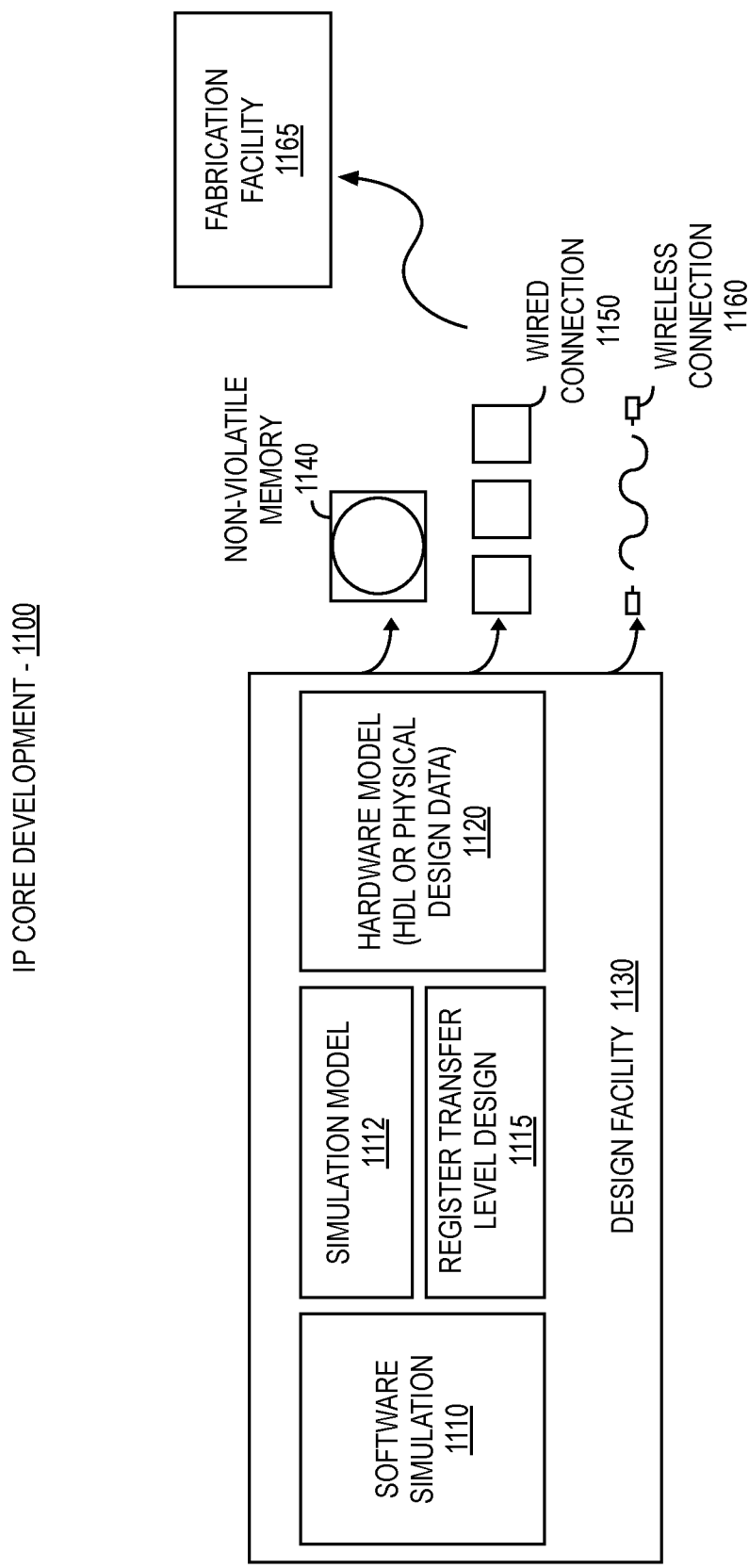
FIG. 11A is a block diagram illustrating an IP core development system 1100 that may be used to manufacture an integrated circuit to perform operations according to an embodiment.

FIG. 11A is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high-level programming language (e.g., C/C++). The software simulation 1110 can be used to design, test, and verify the behavior of the IP core using a simulation model 1112. The simulation model 1112 may include functional, behavioral, and/or timing simulations. A register transfer level (RTL) design 1115 can then be created or synthesized from the simulation model 1112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a $3^{rd}$ party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Figure 11B:
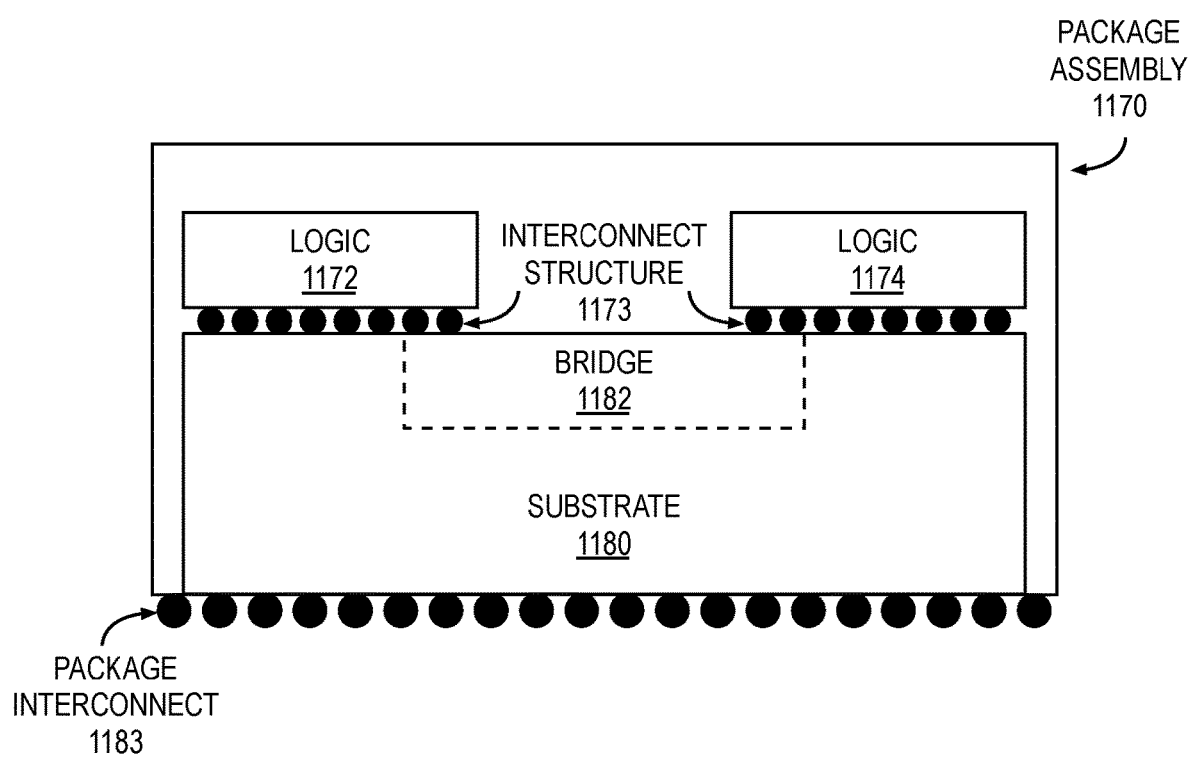
FIG. 11B illustrates a cross-section side view of an integrated circuit package assembly according to some embodiments.

FIG. 11B illustrates a cross-section side view of an integrated circuit package assembly 1170, according to some embodiments described herein. The integrated circuit package assembly 1170 illustrates an implementation of one or more processor or accelerator devices as described herein. The package assembly 1170 includes multiple units of hardware logic 1172, 1174 connected to a substrate 1180. The logic 1172, 1174 may be implemented at least partly in configurable logic or fixed-functionality logic hardware, and can include one or more portions of any of the processor core(s), graphics processor(s), or other accelerator devices described herein. Each unit of logic 1172, 1174 can be implemented within a semiconductor die and coupled with the substrate 1180 via an interconnect structure 1173. The interconnect structure 1173 may be configured to route electrical signals between the logic 1172, 1174 and the substrate 1180, and can include interconnects such as, but not limited to bumps or pillars. In some embodiments, the interconnect structure 1173 may be configured to route electrical signals such as, for example, input/output (I/O) signals and/or power or ground signals associated with the operation of the logic 1172, 1174. In some embodiments, the substrate 1180 is an epoxy-based laminate substrate. The package substrate 1180 may include other suitable types of substrates in other embodiments. The package assembly 1170 can be connected to other electrical devices via a package interconnect 1183. The package interconnect 1183 may be coupled to a surface of the substrate 1180 to route electrical signals to other electrical devices, such as a motherboard, other chipset, or multi-chip module.

In some embodiments, the units of logic 1172, 1174 are electrically coupled with a bridge 1182 that is configured to route electrical signals between the logic 1172, 1174. The bridge 1182 may be a dense interconnect structure that provides a route for electrical signals. The bridge 1182 may include a bridge substrate composed of glass or a suitable semiconductor material. Electrical routing features can be formed on the bridge substrate to provide a chip-to-chip connection between the logic 1172, 1174.

Although two units of logic 1172, 1174 and a bridge 1182 are illustrated, embodiments described herein may include more or fewer logic units on one or more dies. The one or more dies may be connected by zero or more bridges, as the bridge 1182 may be excluded when the logic is included on a single die. Alternatively, multiple dies or units of logic can be connected by one or more bridges. Additionally, multiple logic units, dies, and bridges can be connected together in other possible configurations, including three-dimensional configurations.

Exemplary System on a Chip Integrated Circuit

Figure 12:
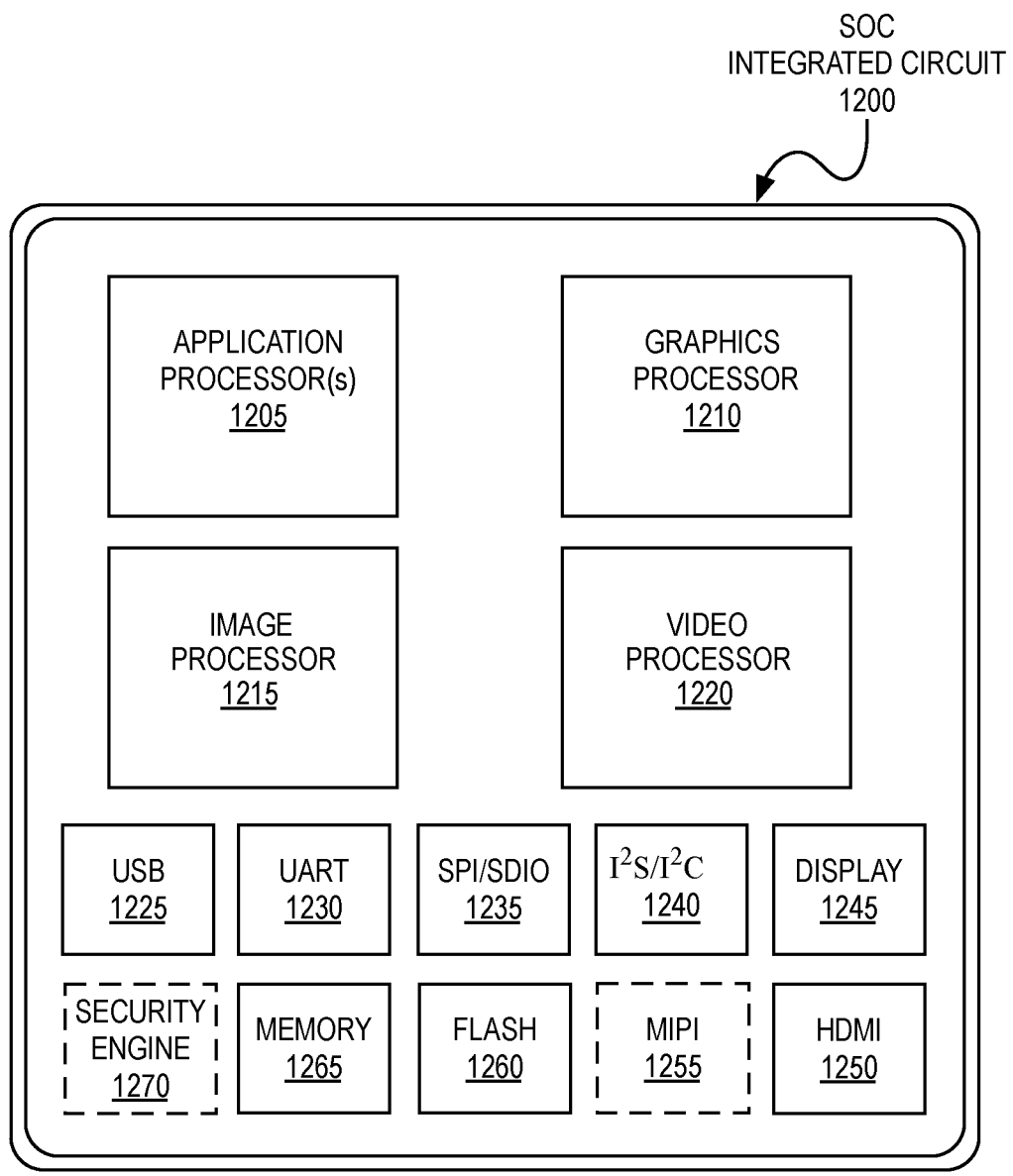
FIG. 12 is a block diagram illustrating an exemplary system on a chip integrated circuit 1200 that may be fabricated using one or more IP cores, according to an embodiment.

FIGS. 12-14 illustrated exemplary integrated circuits and associated graphics processors that may be fabricated using one or more IP cores, according to various embodiments described herein. In addition to what is illustrated, other logic and circuits may be included, including additional graphics processors/cores, peripheral interface controllers, or general-purpose processor cores.

FIG. 12 is a block diagram illustrating an exemplary system on a chip integrated circuit 1200 that may be fabricated using one or more IP cores, according to an embodiment. Exemplary integrated circuit 1200 includes one or more application processor(s) 1205 (e.g., CPUs), at least one graphics processor 1210, and may additionally include an image processor 1215 and/or a video processor 1220, any of which may be a modular IP core from the same or multiple different design facilities. Integrated circuit 1200 includes peripheral or bus logic including a USB controller 1225, UART controller 1230, an SPI/SDIO controller 1235, and an I²S/I²C controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

Figure 13A:
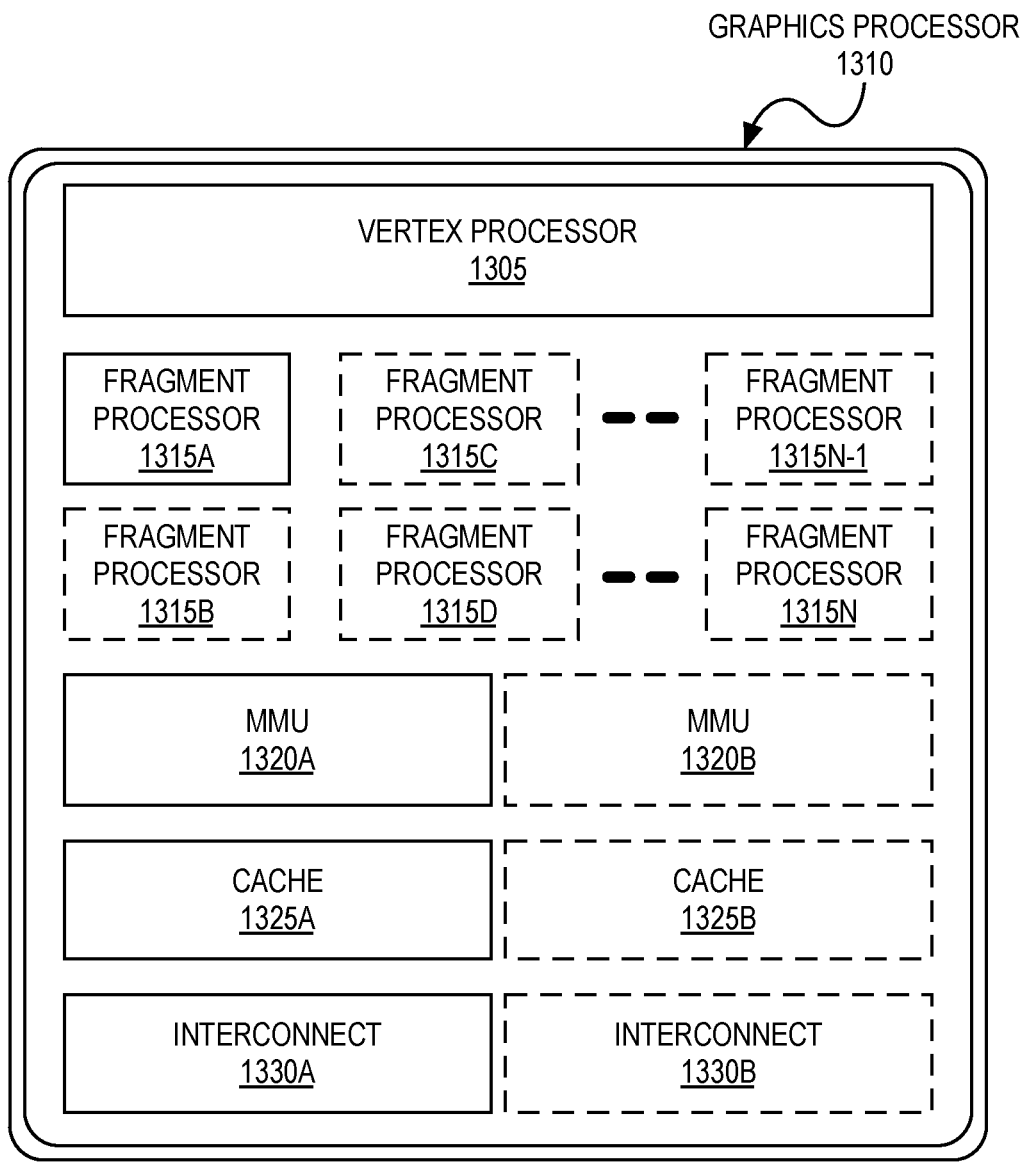
FIG. 13A illustrates an exemplary graphics processor of a system on a chip integrated circuit that may be fabricated using one or more IP cores, according to an embodiment.
Figure 13B:
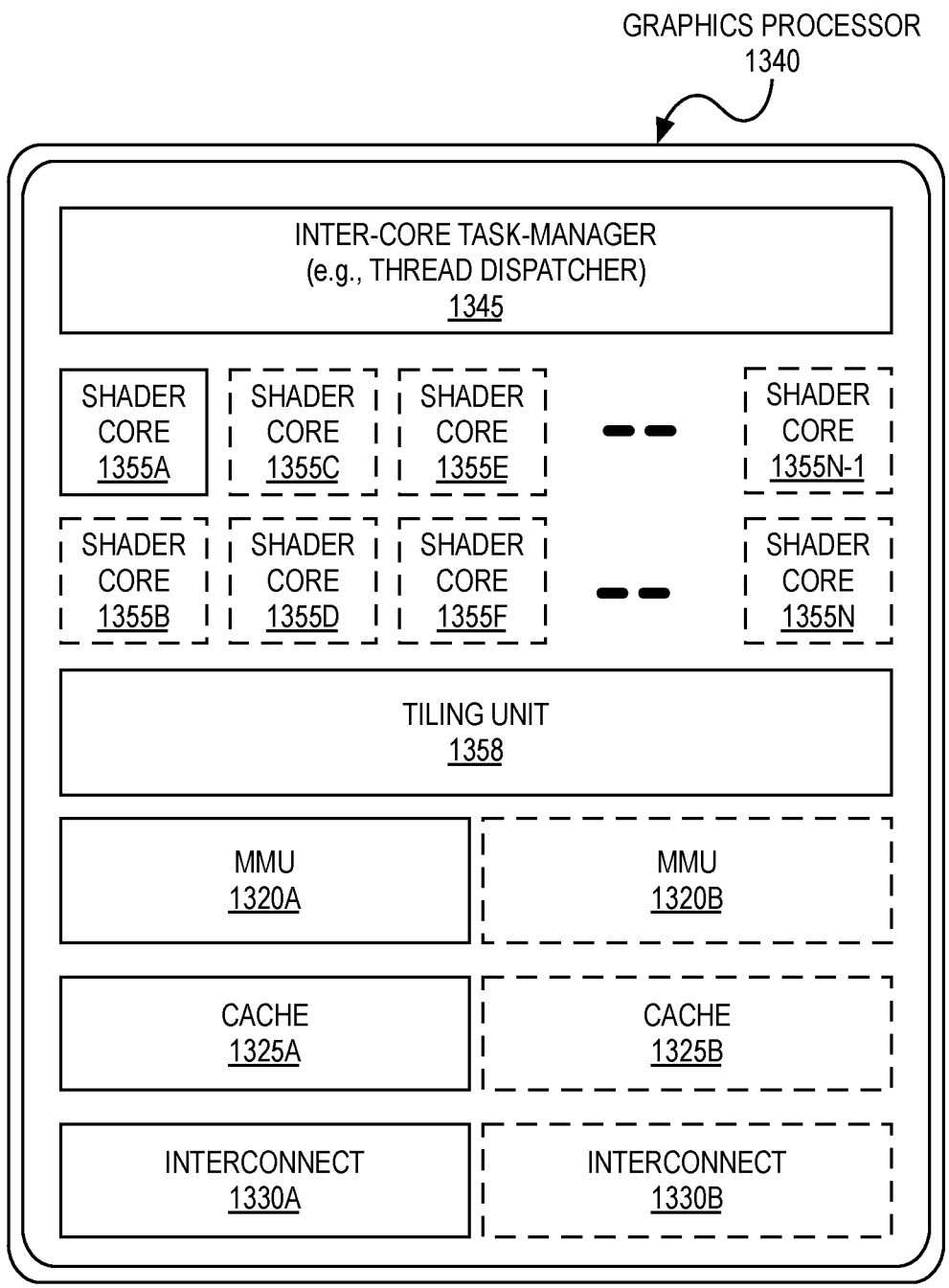
FIG. 13B illustrates an additional exemplary graphics processor of a system on a chip integrated circuit that may be fabricated using one or more IP cores, according to an embodiment.

FIGS. 13A-13B are block diagrams illustrating exemplary graphics processors for use within an SoC, according to embodiments described herein. FIG. 13A illustrates an exemplary graphics processor 1310 of a system on a chip integrated circuit that may be fabricated using one or more IP cores, according to an embodiment. FIG. 13B illustrates an additional exemplary graphics processor 1340 of a system on a chip integrated circuit that may be fabricated using one or more IP cores, according to an embodiment. Graphics processor 1310 of FIG. 13A is an example of a low power graphics processor core. Graphics processor 1340 of FIG. 13B is an example of a higher performance graphics processor core. Each of the graphics processors 1310, 1340 can be variants of the graphics processor 1210 of FIG. 12.

As shown in FIG. 13A, graphics processor 1310 includes a vertex processor 1305 and one or more fragment processor(s) 1315A-1315N (e.g., 1315A, 1315B, 1315C, 1315D, through 1315N-1, and 1315N). Graphics processor 1310 can execute different shader programs via separate logic, such that the vertex processor 1305 is optimized to execute operations for vertex shader programs, while the one or more fragment processor(s) 1315A-1315N execute fragment (e.g., pixel) shading operations for fragment or pixel shader programs. The vertex processor 1305 performs the vertex processing stage of the 3D graphics pipeline and generates primitives and vertex data. The fragment processor(s) 1315A-1315N use the primitive and vertex data generated by the vertex processor 1305 to produce a framebuffer that is displayed on a display device. In one embodiment, the fragment processor(s) 1315A-1315N are optimized to execute fragment shader programs as provided for in the OpenGL API, which may be used to perform similar operations as a pixel shader program as provided for in the Direct 3D API.

Graphics processor 1310 additionally includes one or more memory management units (MMUs) 1320A-1320B, cache(s) 1325A-1325B, and circuit interconnect(s) 1330A-1330B. The one or more MMU(s) 1320A-1320B provide for virtual to physical address mapping for the graphics processor 1310, including for the vertex processor 1305 and/or fragment processor(s) 1315A-1315N, which may reference vertex or image/texture data stored in memory, in addition to vertex or image/texture data stored in the one or more cache(s) 1325A-1325B. In one embodiment the one or more MMU(s) 1320A-1320B may be synchronized with other MMUs within the system, including one or more MMUs associated with the one or more application processor(s) 1205, image processor 1215, and/or video processor 1220 of FIG. 12, such that each processor 1205-1220 can participate in a shared or unified virtual memory system. The one or more circuit interconnect(s) 1330A-1330B enable graphics processor 1310 to interface with other IP cores within the SoC, either via an internal bus of the SoC or via a direct connection, according to embodiments.

As shown FIG. 13B, graphics processor 1340 includes the one or more MMU(s) 1320A-1320B, caches 1325A-1325B, and circuit interconnects 1330A-1330B of the graphics processor 1310 of FIG. 13A. Graphics processor 1340 includes one or more shader core(s) 1355A-1355N (e.g., 1455A, 1355B, 1355C, 1355D, 1355E, 1355F, through 1355N-1, and 1355N), which provides for a unified shader core architecture in which a single core or type or core can execute all types of programmable shader code, including shader program code to implement vertex shaders, fragment shaders, and/or compute shaders. The exact number of shader cores present can vary among embodiments and implementations. Additionally, graphics processor 1340 includes an inter-core task manager 1345, which acts as a thread dispatcher to dispatch execution threads to one or more shader cores 1355A-1355N and a tiling unit 1358 to accelerate tiling operations for tile-based rendering, in which rendering operations for a scene are subdivided in image space, for example to exploit local spatial coherence within a scene or to optimize use of internal caches.

Figure 14A:
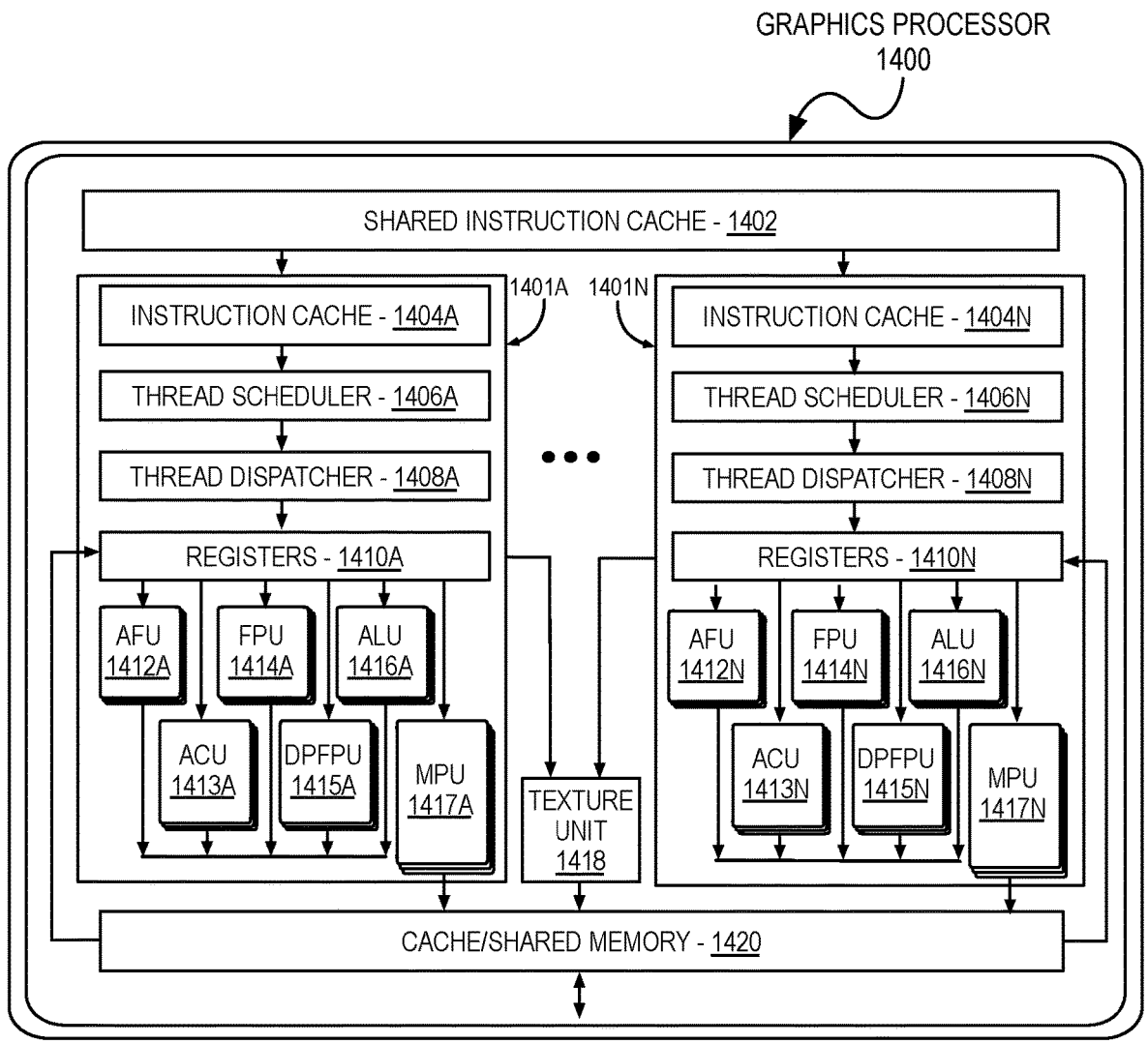
FIG. 14A illustrates a graphics core that may be included within a graphics processor according to some embodiments.
Figure 14B:
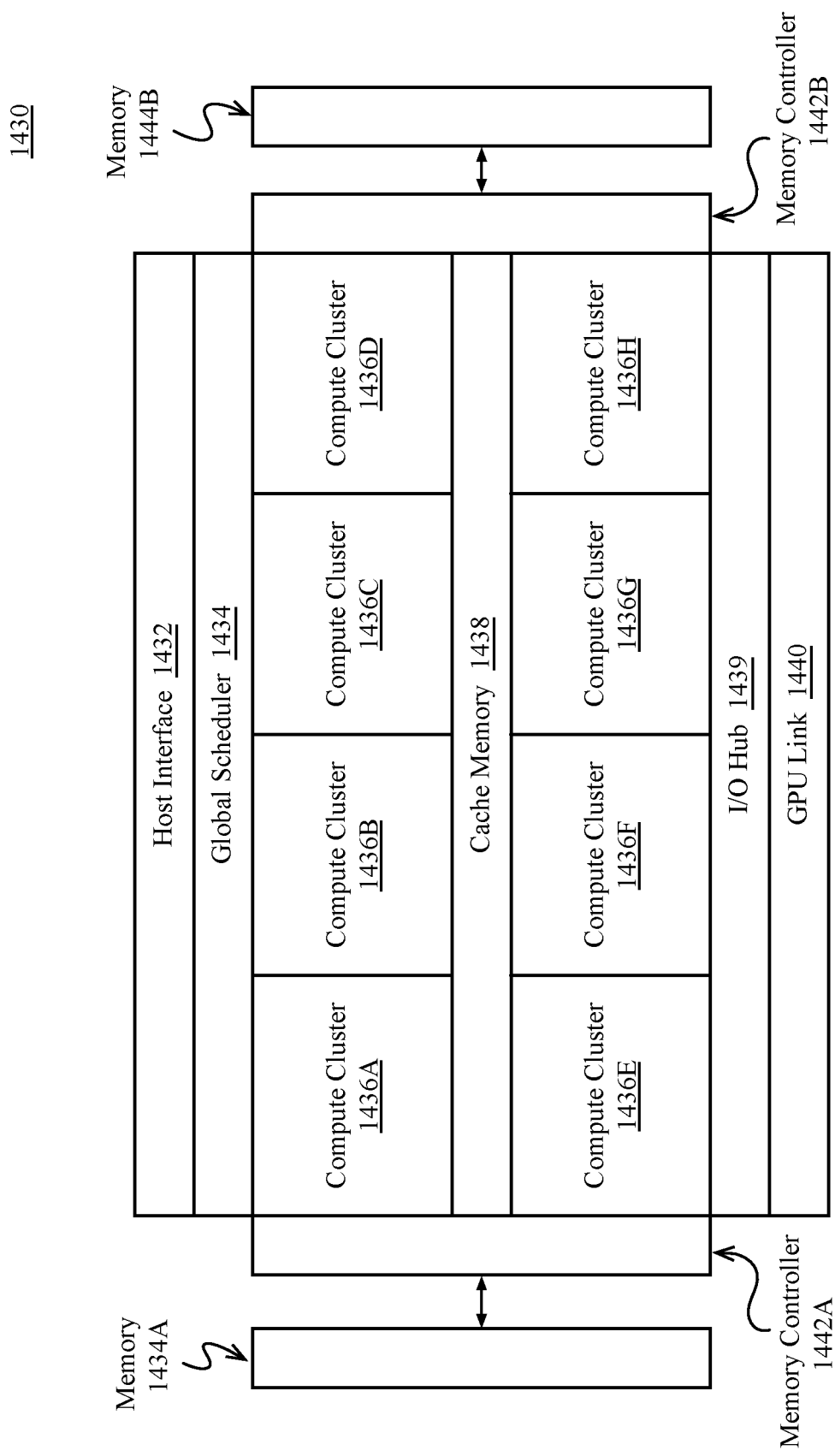
FIG. 14B illustrates a highly-parallel general-purpose graphics processing unit suitable for deployment on a multi-chip module according to some embodiments.

FIGS. 14A-14B illustrate additional exemplary graphics processor logic according to embodiments described herein. FIG. 14A illustrates a graphics core 1400 that may be included within the graphics processor 1210 of FIG. 12, and may be a unified shader core 1355A-1355N as in FIG. 13B. FIG. 14B illustrates a highly-parallel general-purpose graphics processing unit 1430 suitable for deployment on a multi-chip module.

As shown in FIG. 14A, the graphics core 1400 includes a shared instruction cache 1402, a texture unit 1418, and a cache/shared memory 1420 that are common to the execution resources within the graphics core 1400. The graphics core 1400 can include multiple slices 1401A-1401N or partition for each core, and a graphics processor can include multiple instances of the graphics core 1400. The slices 1401A-1401N can include support logic including a local instruction cache 1404A-1404N, a thread scheduler 1406A-1406N, a thread dispatcher 1408A-1408N, and a set of registers 1410A. To perform logic operations, the slices 1401A-1401N can include a set of additional function units (AFUs 1412A-1412N), floating-point units (FPU 1414A-1414N), integer arithmetic logic units (ALUs 1416-1416N), address computational units (ACU 1413A-1413N), double-precision floating-point units (DPFPU 1415A-1415N), and matrix processing units (MPU 1417A-1417N).

Some of the computational units operate at a specific precision. For example, the FPUs 1414A-1414N can perform single-precision (32-bit) and half-precision (16-bit) floating point operations, while the DPFPUs 1415A-1415N perform double precision (64-bit) floating point operations. The ALUs 1416A-1416N can perform variable precision integer operations at 8-bit, 16-bit, and 32-bit precision, and can be configured for mixed precision operations. The MPUs 1417A-1417N can also be configured for mixed precision matrix operations, including half-precision floating point and 8-bit integer operations. The MPUs 1417-1417N can perform a variety of matrix operations to accelerate machine learning application frameworks, including enabling support for accelerated general matrix to matrix multiplication (GEMM). The AFUs 1412A-1412N can perform additional logic operations not supported by the floating-point or integer units, including trigonometric operations (e.g., Sine, Cosine, etc.).

As shown in FIG. 14B, a general-purpose processing unit (GPGPU) 1430 can be configured to enable highly-parallel compute operations to be performed by an array of graphics processing units. Additionally, the GPGPU 1430 can be linked directly to other instances of the GPGPU to create a multi-GPU cluster to improve training speed for particularly deep neural networks. The GPGPU 1430 includes a host interface 1432 to enable a connection with a host processor. In one embodiment the host interface 1432 is a PCI Express interface. However, the host interface can also be a vendor specific communications interface or communications fabric. The GPGPU 1430 receives commands from the host processor and uses a global scheduler 1434 to distribute execution threads associated with those commands to a set of compute clusters 1436A-1436H. The compute clusters 1436A-1436H share a cache memory 1438. The cache memory 1438 can serve as a higher-level cache for cache memories within the compute clusters 1436A-1436H.

The GPGPU 1430 includes memory 1434A-1434B coupled with the compute clusters 1436A-1436H via a set of memory controllers 1442A-1442B. In various embodiments, the memory 1434A-1434B can include various types of memory devices including dynamic random access memory (DRAM) or graphics random access memory, such as synchronous graphics random access memory (SGRAM), including graphics double data rate (GDDR) memory.

In one embodiment the compute clusters 1436A-1436H each include a set of graphics cores, such as the graphics core 1400 of FIG. 14A, which can include multiple types of integer and floating point logic units that can perform computational operations at a range of precisions including suited for machine learning computations. For example and in one embodiment at least a subset of the floating point units in each of the compute clusters 1436A-1436H can be configured to perform 16-bit or 32-bit floating point operations, while a different subset of the floating point units can be configured to perform 64-bit floating point operations.

Multiple instances of the GPGPU 1430 can be configured to operate as a compute cluster. The communication mechanism used by the compute cluster for synchronization and data exchange varies across embodiments. In one embodiment the multiple instances of the GPGPU 1430 communicate over the host interface 1432. In one embodiment the GPGPU 1430 includes an I/O hub 1439 that couples the GPGPU 1430 with a GPU link 1440 that enables a direct connection to other instances of the GPGPU. In one embodiment the GPU link 1440 is coupled to a dedicated GPU-to-GPU bridge that enables communication and synchronization between multiple instances of the GPGPU 1430. In one embodiment the GPU link 1440 couples with a high speed interconnect to transmit and receive data to other GPGPUs or parallel processors. In one embodiment the multiple instances of the GPGPU 1430 are located in separate data processing systems and communicate via a network device that is accessible via the host interface 1432. In one embodiment the GPU link 1440 can be configured to enable a connection to a host processor in addition to or as an alternative to the host interface 1432.

While the illustrated configuration of the GPGPU 1430 can be configured to train neural networks, one embodiment provides alternate configuration of the GPGPU 1430 that can be configured for deployment within a high performance or low power inferencing platform. In an inferencing configuration the GPGPU 1430 includes fewer of the compute clusters 1436A-1436H relative to the training configuration. Additionally, the memory technology associated with the memory 1434A-1434B may differ between inferencing and training configurations, with higher bandwidth memory technologies devoted to training configurations. In one embodiment the inferencing configuration of the GPGPU 1430 can support inferencing specific instructions. For example, an inferencing configuration can provide support for one or more 8-bit integer dot product instructions, which are commonly used during inferencing operations for deployed neural networks.

Area-Efficient Implementation of Instructions

In some embodiments, a system provides for area-efficient implementations of graphical instructions, including SIMD (Single Instruction Multiple Data) and media block instructions.

Figure 15:
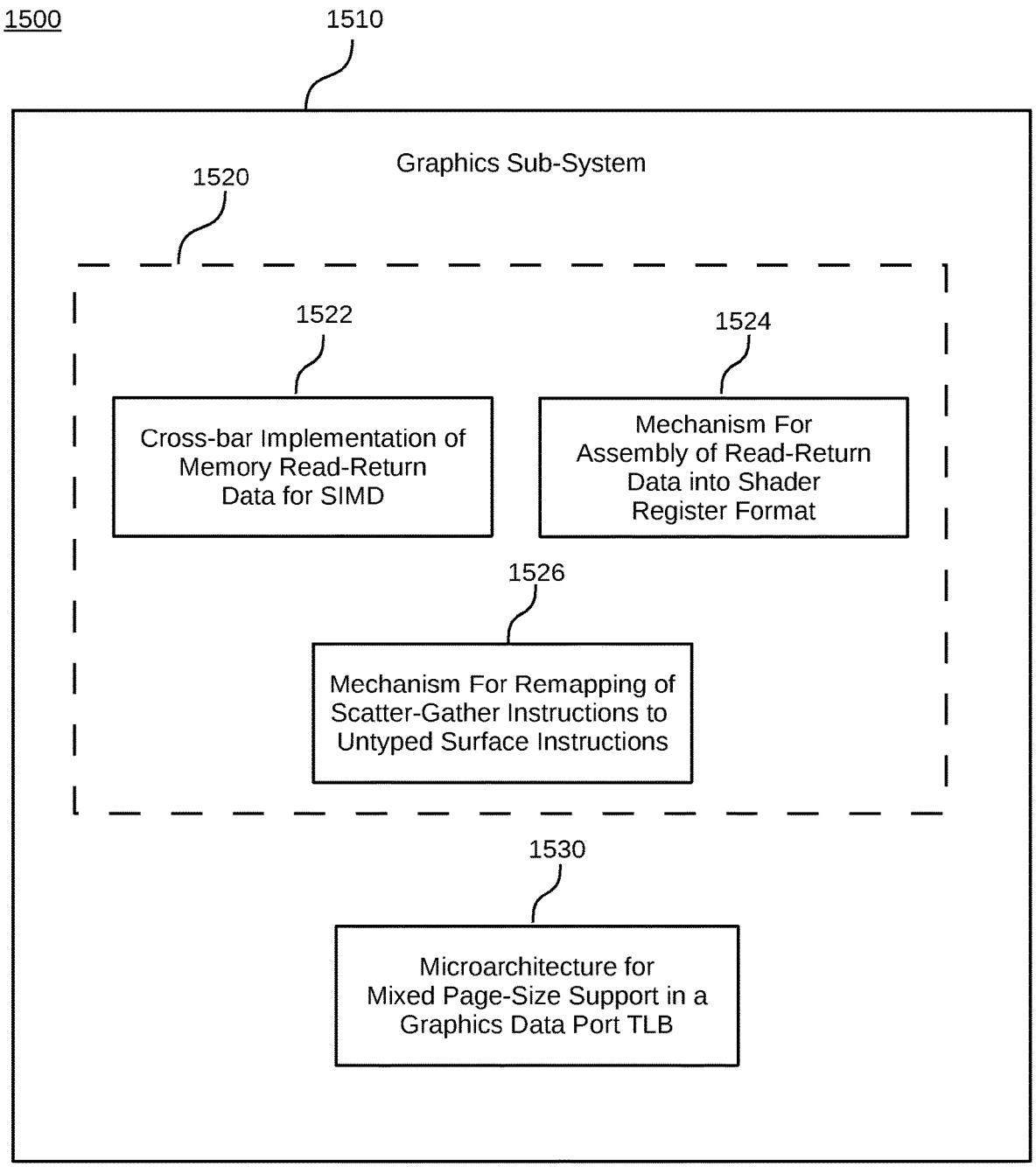
FIG. 15 is an illustration of a system to provide area-efficient implementations of graphical instructions according to some embodiments.

FIG. 15 is an illustration of a system to provide area-efficient implementations of graphical instructions according to some embodiments. In some embodiments, a system 1500, which may include a graphics subsystem 1510 including elements illustrated in one or more of FIGS. 1-14B, includes one or more of the following logics or mechanisms:

1520: One or more of the following logics or mechanisms for handling of graphical data:

1522: A first logic for area-efficient cross-bar implementation of memory read-return data for SIMD instructions. Embodiments of the first logic may include elements illustrated in one or more of FIGS. 16 and 17.

1524: A second logic for area-efficient assembly of memory read-return data for media block instructions into shader register format. Embodiments of the second logic may include elements illustrated in one or more of FIGS. 18A, 18B, 18C, 19, 20A, 20B, and 21.

1526: A third logic including a mapping element for remapping of scatter-gather SIMD instructions to untyped surface instruction types for area-efficiency and hardware simplification. Embodiments of the third logic may include elements illustrated in one or more of FIG. 22 and tables 2 to 9; or

1530: An area-efficient and performant microarchitecture for a controller in a graphics data port to provide mixed page-size support for a TLB (translation lookaside buffer). Embodiments may include those illustrated in one or more of FIGS. 23, 24, 25, and 26.

It is noted that embodiments of each of the first logic 1522, second logic 1524, third logic 1526, and microarchitecture 1530 may share or overlap with regard one or more elements of the others of such logics and microarchitecture.

Area-Efficient Cross-Bar Implementation of Memory Read-Return Data for SIMD Instructions In conventional operations, the read-return data storage in a data port unit of a graphics processor is in Shader register format. As a result, as memory data is received, the memory data is swizzled to the register format "on-the-fly" and saved in the data array. As used here, swizzling refers to the reordering of data format, which may commonly be performed to place memory data in a form to be most efficiently read by the graphics processor, also referred to herein as the graphical processing unit (GPU). The register format requires the data storage to be addressable at a byte-granularity, and to be 64-banked. Further, the read-return data storage structure is required to have enough entries to cover cache/memory latency, which is typically approximately 120 cycles.

However, constructing a data array that includes so many entries (128) and that is also byte-addressable is expensive in terms of area and power requirements.

Figure 16:
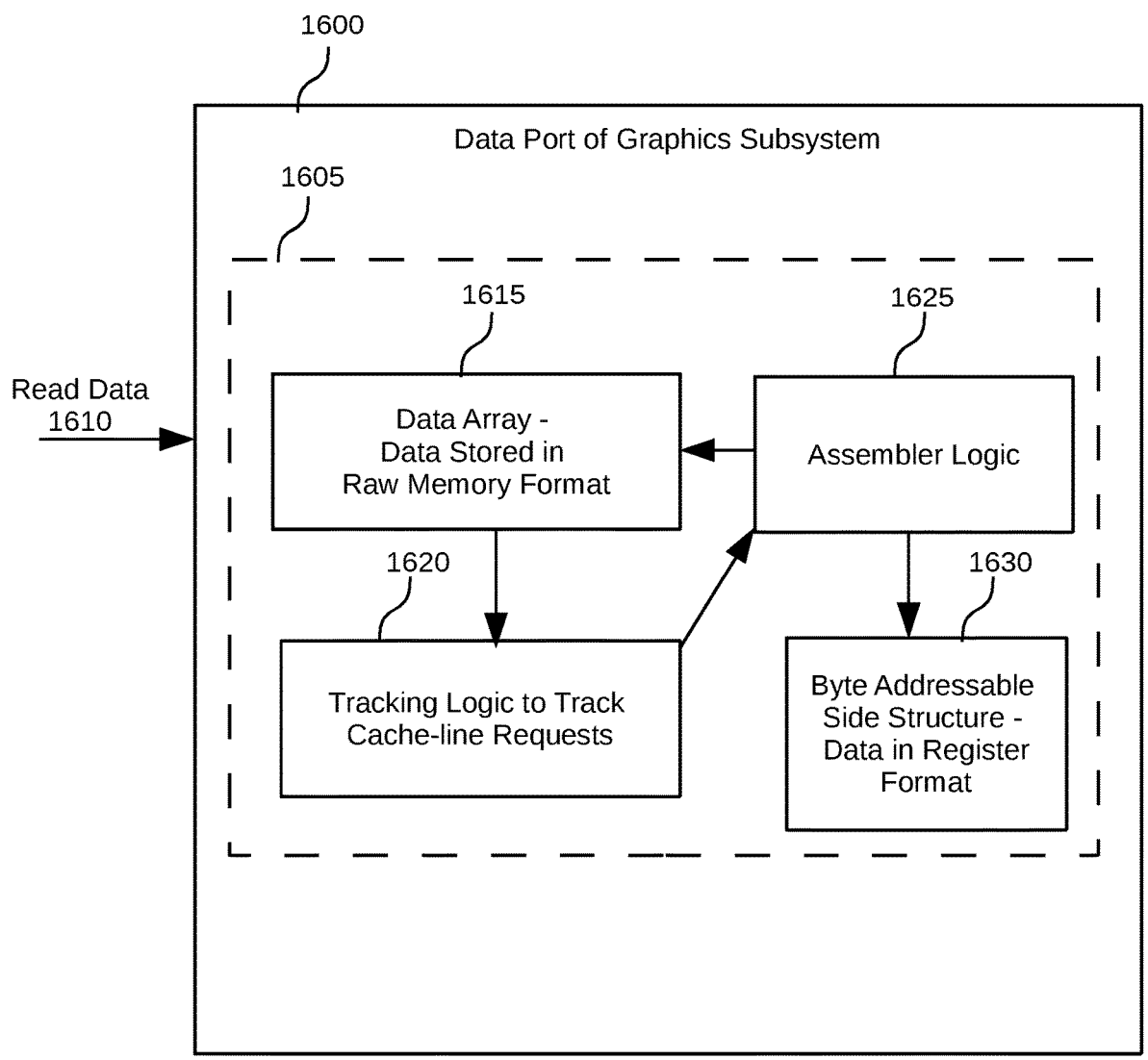
FIG. 16 is an illustration of a logic to provide an area-efficient cross-bar implementation of memory read-return data for SIMD instructions according to some embodiments.

FIG. 16 is an illustration of a logic to provide an area-efficient cross-bar implementation of memory read-return data for SIMD instructions according to some embodiments. In some embodiments, read data 1610 received at the data port 1600 of a graphics subsystem is stored in a data array 1615 of a logic 1605, the read data being stored in a raw memory format (wherein raw memory format refers to data that is unprocessed or minimally processed). In this manner, the ~128-entry data array 1615 may be single ported and accessed in cache line (64 byte) granularity, making the data array much less expensive to implement in comparison with a conventional data array implementation.

In some embodiments, the logic 1605 includes a tracking logic 1620 to track when cache line requests have been received for a given message, and further includes a separate assembler logic 1625 to process the raw memory formatted read data from the data array 1615 and assemble the read data into register format. In some embodiments, the tracking logic 1620 is to determine when all cache line requests have been received for a given message, and to provide a signal to the assembler logic 1625 indicating that all such cache line requests have been received. In response to receipt of the signal from the tracking logic 1620, the assembly logic is to read the raw memory formatted read data from the data array 1615, assemble the read data into register format, and store the register formatted read data.

In some embodiments, the logic 1605 further includes a byte addressable side structure 1630 for the storage of the register-formatted data from the assembler logic 1625. However, the side structure 1630 may be relatively small in size because the maximum number of registers per message is typically a small number (for example, a maximum of 4 or 8 registers per message).

Thus, through the implementation of a data port structure allowing for storing of read return data in raw memory format until cache line requests are completed, and the following conversion of the read return data from raw memory format into register format, significant area and power savings may be achieved in the graphical data port controller design in comparison with conventional apparatuses.

Figure 17:
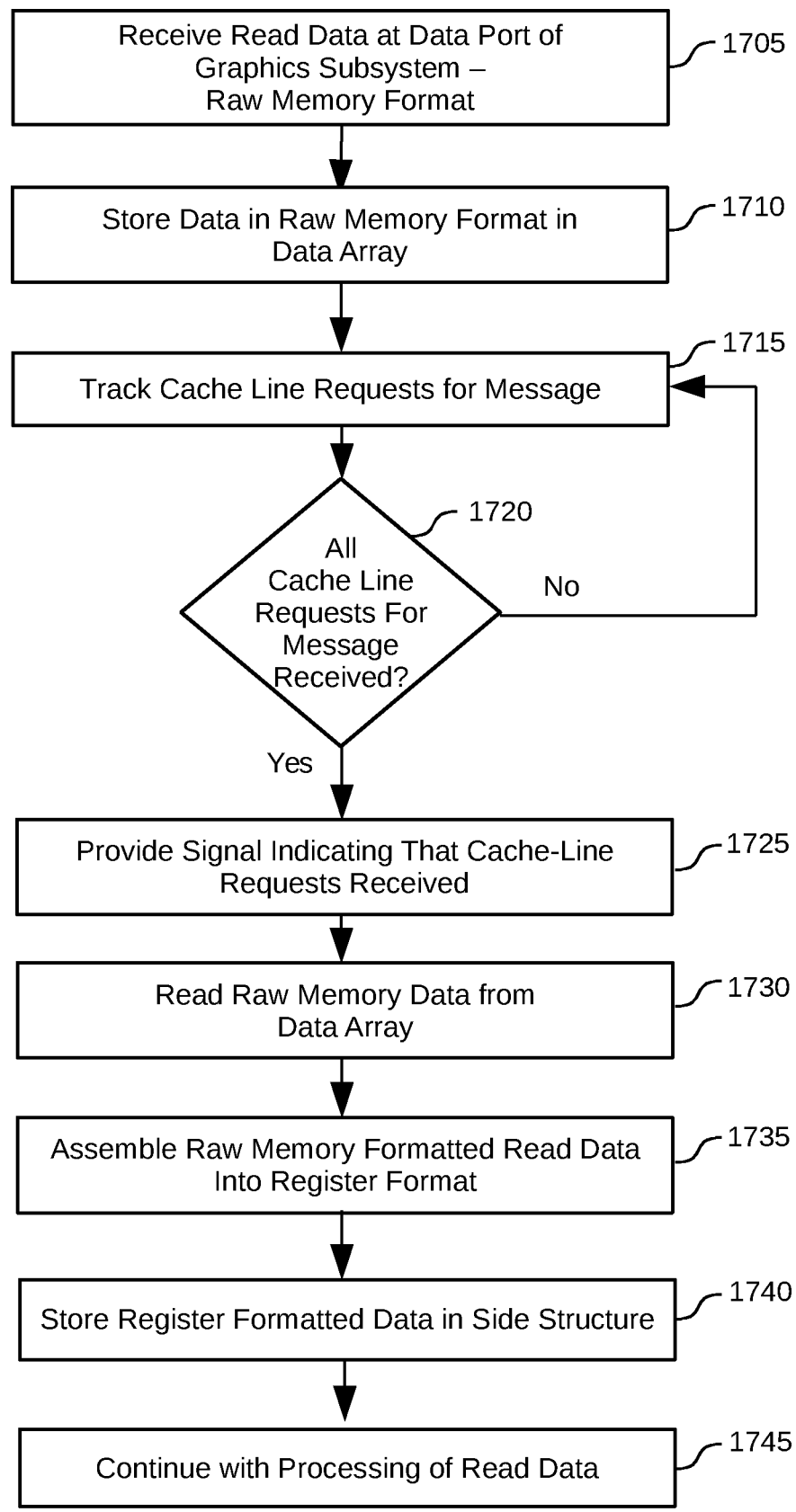
FIG. 17 is a flowchart to illustrate a process for handling of memory read-return data for GPU SIMD instructions according to some embodiments.

FIG. 17 is a flowchart to illustrate a process for handling of memory read-return data for SIMD instructions according to some embodiments. An embodiment of a process includes the following:

1705: Receive read data for a particular message at a data port of a graphics subsystem, wherein the data is received in raw memory format.

1710: Store the data in raw memory format in a data array, such as data array 1615 illustrated in FIG. 16.

1715: Track cache line requests for the message. In some embodiments, the cache line requests are tracked by a tracking logic, such as logic 1620 illustrated in FIG. 16.

1720: Determining whether all cache line requests for the message have been received.

1725: Providing a signal upon determining that all such cache line requests have been received. Continuing with tracking the cache line requests 1715 upon determining that all such requests have not been received.

1730: Upon receipt of the signal indicating that all cache line requests for the message have been received, read the raw memory data from the data array. In some embodiments, data is read by an assembler logic, such as assembler logic 1625 illustrated in FIG. 16.

1735: Assemble the raw memory formatted read data into register format.

1740: Store the register formatted read data. In some embodiments, the register formatted read data is stored in a side structure, which may be relatively small in size because of the maximum number of registers per message typically a small number, such as 4 or 8. In some embodiments, the side structure may include the byte addressable side structure 1630 illustrated in FIG. 16.

1745: Continue with normal processing of the stored read data.

Area-Efficient Assembly of Memory Read-Return Data for Media Block Instructions into Shader Register Format In conventional graphical operations, media block read/write message handling is very complex and area-consuming because of required support of variable size and byte-granular blocks, data padding requirements, and possible replication of out-of-bound pixels.

In some embodiments, a microarchitecture is provided to handle return-data for media block messages in the graphics data port unit, wherein the microarchitecture provides for assembly of raw data from memory into shader register format.

A read media block message enables a rectangular block of data samples to be read from a source surface and written into the GRF, and a write media block message enables data from the GRF to be written to a rectangular block. Inputs into a media block message includes a signed X-Y coordinate into a 2D surface and a block size (width, height). In some embodiments, for media block messages, the execution mask is ignored. Out-of-bounds (OOB) writes are dropped, while OOB reads return a replicated boundary pixel.

In some embodiments, handling of media block messages includes the following:

(1) Byte masked media block write: Calculating an AND operation of a Byte-enable calculated by address compressor logic with the message provided by a Byte-enable vector.

(2) For block writes: Determining and implementing write data multiplexing logic from GRF format to L3 format. Such multiplexing logic is in general an inverse of read data multiplexing logic, but is less complex because there is no requirement for OOB support for write operations.

(3) Block width for writes and reads: Maximum block widths are provided for block write and read operations. Maximum block width for writes is 64 bytes. For block reads, the maximum width is 32 bytes.

Further, a maximum block height is limited by the respective block width. The maximum data size supported in a media block message is 64 DWords (256 Bytes), with blocks wider than 32 Bytes being supported only for write operations with either linear and Tile-X surfaces, as illustrated in Table 1 below.

TABLE 1

| Block Width (Bytes) | Block Height (Rows) | Tile Modes Supported |
|---|---|---|
| 1-4 | 1-64 | Linear, Tile-X, Tile-Y/YF/YS |
| 5-8 | 1-32 | Linear, Tile-X, Tile-Y/YF/YS |
| 9-16 | 1-16 | Linear, Tile-X, Tile-Y/YF/YS |
| 17-32 | 1-8 | Linear, Tile-X, Tile-Y/YF/YS |
| 33-64 | 1-4 | Linear, Tile-X |

In some embodiments, the layout of read and write data payloads depends on the respective block height and block width. The data is aligned to the least significant bits of the first register, with the register pitch being equal to the next power-of-2 that is greater than or equal to the block width.

For media block address compression and tiler, the following apply:

(1) Iteration of one row at a time. Stop at cache line boundary (max 2 cycles per row, if row crosses boundary), or at a surface boundary, whichever is closest.

(2) Out-of-bounds: Follow the same process for iteration OOB. Check whether a part of a segment being processed during the current clock is inside or outside the surface. If outside: for writes, disable the byte-enables, and for reads, point to the nearest in-bound pixel and set up the replication field.

In some embodiments, read return control information for media block message provides OOB support. In some embodiments, the following restrictions or rules apply to media block read messages:

(1) Maximum block width is 32 bytes;

(2) Surface base is 32B aligned;

(3) If block width is not equal to $2^n$, register pitch is to be rounded up to nearest $2^n$; and (4) A maximum of 8 GRFs are written (maximum block size=256 bytes) by a single message.

In some embodiments, operations are split in to 2 cases: Tile-X/Linear surface, and Tile-Y surfaces.

(a) Tile-X and Linear surfaces: For Tile-X, because of the established maximum block width (32 Bytes), one L3 cache line can feed into a maximum of 1 GRF (General-purpose Register File).

Figure 18A:
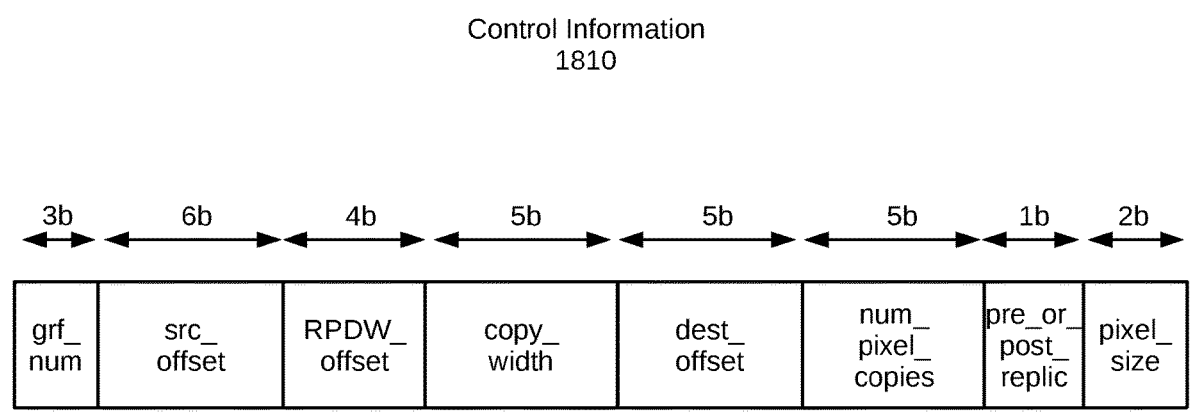
FIG. 18A is an illustration of control information for Tile-X and linear surfaces according to some embodiments.

FIG. 18A is an illustration of control information for Tile-X and linear surfaces according to some embodiments. In some embodiments, the following control information 1810 is utilized (providing a total of 33 bits) as illustrated in FIG. 18A:

grf_num (3 bits): Destination GRF number.

src_offset (6 bits): Byte offset of the cache line (CL) from which to copy (wherein src refers to a source).

replication_pixel_dword_offset (4 bits): Double-word (DWORD) offset in the CL for the pixel to be replicated (OOB (Out of Band) handling). Replicated pixel will be inside a DWORD aligned block because the surface edges are to be aligned to 4*bpe (DWORD). The actual pixel byte(s) could be aligned at the end or beginning of the Dword (depending on pre or post replication), and depending on the pixel size.

copy_width (5 bits): Number of bytes to copy from source to destination (max 32 bytes).

dest_offset (5 bits): Byte offset into the destination GRF (the GRF that is being written to).

num_pixel_copies (5 bits): Number of times the pixel will be copied into the destination GRF (used in OOB handling).

pre_or_post_replication (1 bit): Whether the pixel replication is done at the lowermost bytes or the uppermost bytes of the GRF. Setting of 1 means pre-replication, i.e., lowermost bytes (used in OOB handling).

pixel_size (2 bits): Pixel size (1/2/4 bytes). Encoding is 0:1 byte, 1:2 bytes, 2: illegal, 3:4 bytes (used in OOB handling).

The following pseudo code illustrates an embodiment of a process for handling of data in a system:

```
// Create 2 sets of grf_data and byte_enables:
// A first set for the replicated pixel (if any), and
// a second set for the normal copy.
// Merge the 2 sets of data at the end of the process.
// One-hot grf_write_enable (8 bit vector)
grf_write_enable[7:0] = (1 << grf_num);
// Generate destination grf write byte-enable (32-bit vector).
// Decode width and then shift left by dest_offset
wire [5:0] pre_copy_width;
// Check if it is necessary to move the copy pointer up
// due to pixel replication at the beginning
pre_copy_width = (pre_or_post_replication == 1'b1)?
  replication_copy_width : 0;
grf_copy_byte_enable[31:0] = 32{1'b0} | (((1 << dest_width) - 1) <<
  (dest_offset + pre_copy_width));
// Generate grf copy data (256-bit vector)
grf_copy_data[255:0] = 256{1'b0} |
  fragment_data[src_offset*8+copy_width*8-1:src_offset*8] <<
  (dest_offset+pre_copy_width)*8;
// Create the data and byte-enable vectors for the pixel replication
// (if any)
// Calculate how many bytes will be replicated
wire [31:0] replicated_bytes;
casex (pixel_size)
  0: replicated_bytes = num_pixel_copies; // 8bpe
  1: replicated_bytes = num_pixel_copies*2; // 16bpe
  3: replicated_bytes = num_pixel_copies*4; // 32bpe
  default: replicated_bytes = 0; // illegal value
endcase
grf_replication_byte_enable[31:0] = 32{1'b0};
if (pre_or_post_replication == 1'b1) then
  // replication is done at the lower bytes of grf
  grf_replication_byte_enable[31:0] = 32{1'b0} | (((1 <<
    replicated_bytes) - 1) << dest_offset);
end
else begin
  // pixels are copied at the upper end of the GRF
  grf_replication_byte_enable[31:0] = 32{1'b0} | (((1 <<
    replicated_bytes) - 1) << (dest_offset + copy_width));
end
// Create the replicated data
grf_replicated_data[255:0] = 256{1'b0}; //initialize
wire [5:0] byte_offset;
byte_offset = 0;
if (replication_width != 0) begin
  for (pixel=0; pixel< num_pixel_copies; pixel++) begin
    // Get the pixel and copy it to the right location
    grf_replicated_data[255:0] = grf_replicated_data[255:0] |
      (fragment_data[replication_pixel_dword_offset*4*8+pixel_size*
      8-1:replication_pixel_dword_offset*4*8] << byte_offset*8)
    byte_offset = byte_offset + (pixel_size + 1)
  end
  // Shift up the replicated data to the right grf location
  if (pre_or_post_replication == 1'b0) begin
    grf_replicated_data[255:0] = grf_replicated_data[255:0] <<
      copy_width + dest_offset);
  end
  else begin
    grf_replicated_data[255:0] = grf_replicated_data[255:0] <<
      dest_offset;
  end
end
// Create the final data and BE vectors
grf_byte_enable[31:0] = grf_copy_byte_enable[31:0] |
  grf_replication_byte_enable[31:0];
grf_data[255:0] = grf_copy_data[255:0] | grf_replication_data[255:0];
```

(b) Tile-Y surface: Tile-Y handling has additional complications in comparison to Tile-X and linear surface handling. Because a single cache line can span into 4 rows, there can be up to 4 non-overlapping regions from a single fragment that is written into the GRFs. The regions may be adjacent to each other in the fragment, or may be disjoint. A single fragment can write up to 4 GRFs.

Figure 18B:
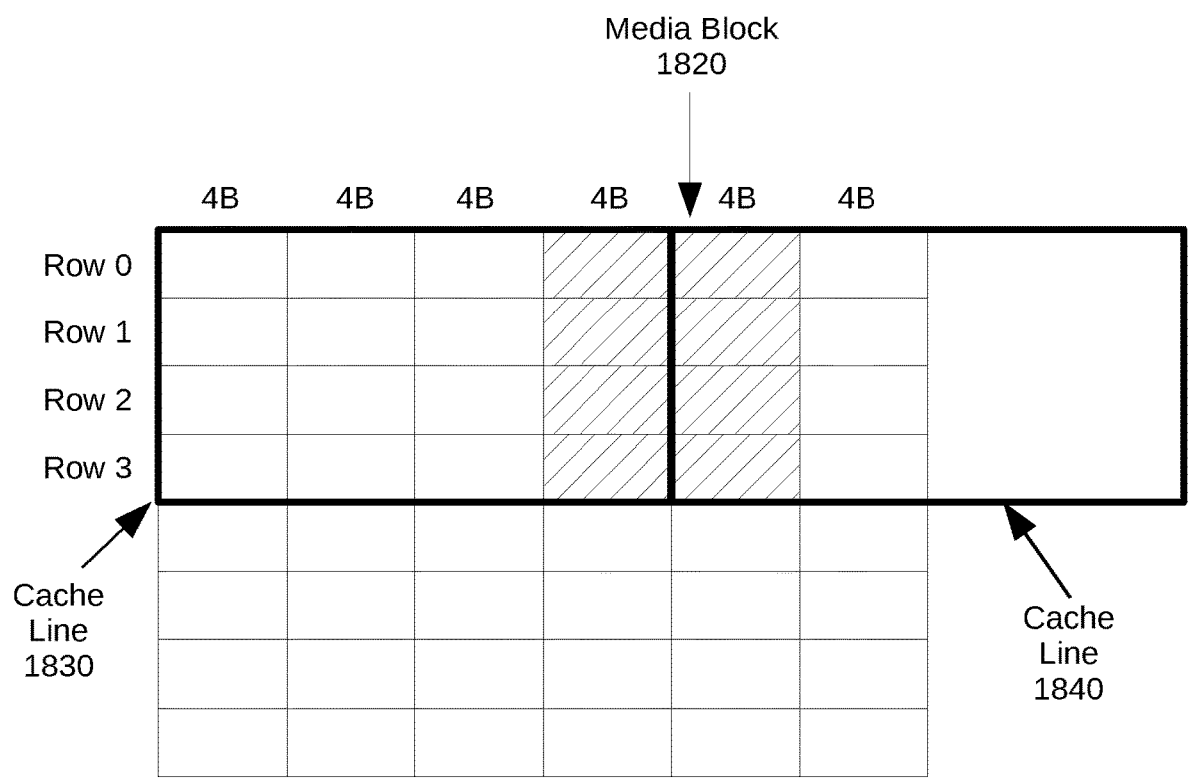
FIG. 18B is an illustration of Tile-Y data to be handled according to some embodiments.

FIG. 18B is an illustration of Tile-Y data to be handled according to some embodiments. As shown in FIG. 18B, the media box 1820 (with crosshatching) is the media block being read (32 bytes=1 GRF). The media block 1820 is being fed by 2 cache lines, cache line 1830 and cache line 1840. Each of the cache lines has 4 regions that fill in the GRF.

Control information needed for Tile-Y:

There are up to 4 regions in the fragment that has valid data. The regions are non-overlapping. Each region can write to only one GRF. Multiple regions can map to same GRF.

For OOB handling, the process is similar to Tile-X, but the process needs to be performed 4 times (once per row in a CL). Further, because the maximum row width is 16 bytes, the replication_pixel_dword_offset is 2 bits (4 DWORDs), instead of 4 bits as in Tile-X.

Figure 18C:
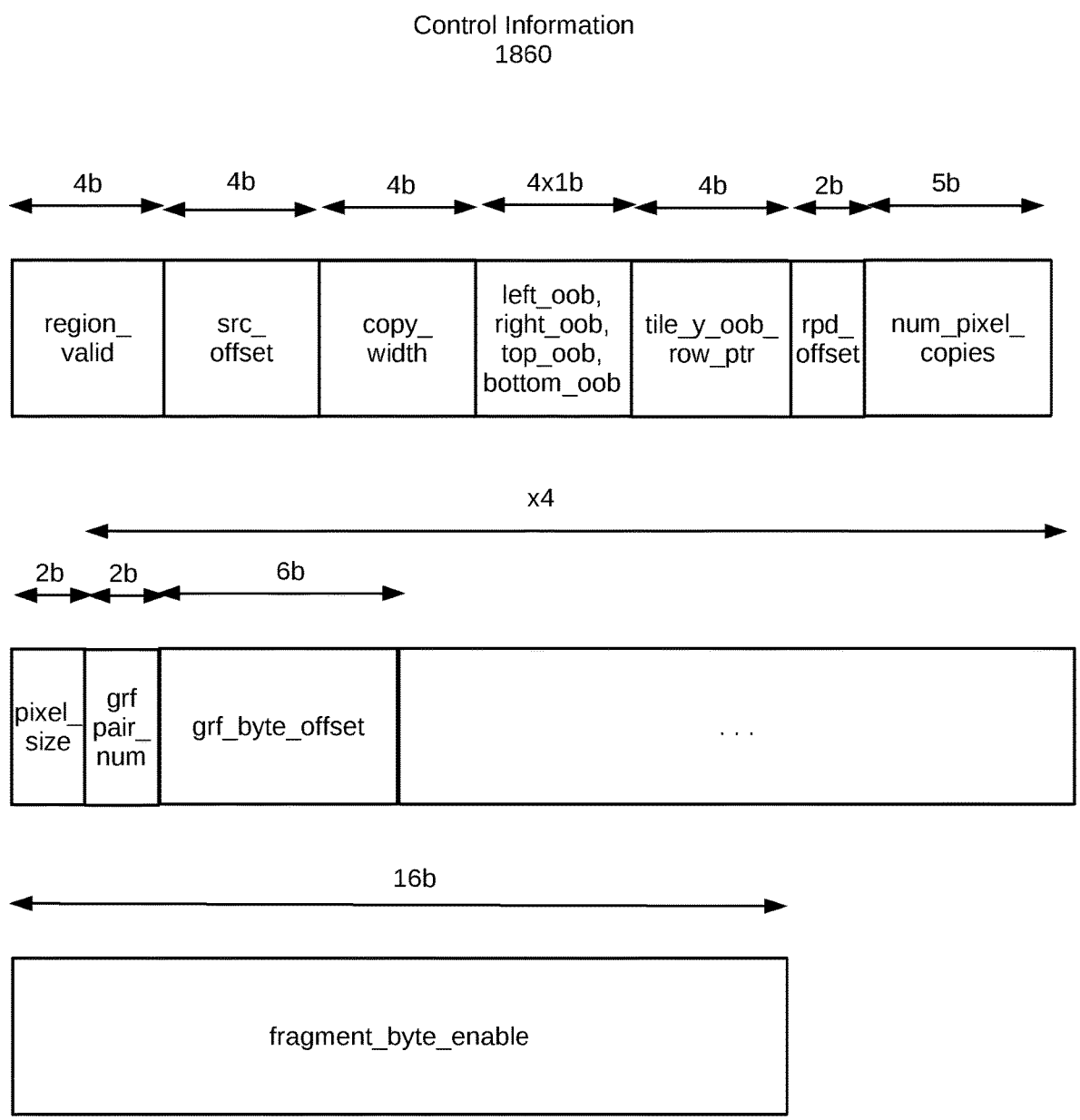
FIG. 18C is an illustration of control information for Tile-Y surfaces according to some embodiments.

FIG. 18C is an illustration of control information for Tile-Y surfaces according to some embodiments. In some embodiments, the following control information 1860 is utilized (providing a total of 61 bits) as illustrated in FIG. 18C:

region_valid (4 bits): Indicates how many regions will be written to GRF from this cache line. Decoded form (1 bit per region). Note that multiple regions can map to same row for OOB.

src_offset (4 bits): Byte offset in to the rows for the first valid data byte to copy. All regions in a CL must have the same src_offset, hence it is 1 value for all regions. In the example above, the value is 12.

copy_width (4 bits): Number of bytes to copy from cache line per row (1-16 bytes). All regions must have the same copy length.

left_oob, right_oob, top_oob, bottom_oob (1 bit each): Indicates whether the block rows being processed are OOB on one or more of these directions. For copying of data of OOB rows, the source row is the nearest in-bound region. If top_oob or bottom_oob is set, the CL region used for copying data is given by tile_y_oob_row_ptr tile_y_oob_row_ptr (4 bits): The region number to use for top or bottom OOB case.

replication_pixel_dword_offset (2 bits—shown as rpd_offset in FIG. 18C): This is the DWORD offset in the row for the pixel to be replicated for OOB handling. All valid rows should have the same value, hence only one field is defined.

num_pixel_copies (5 bits): How many times the replicated pixel will be copied at the destination GRF (for OOB handling).

pixel_size (2 bits)

4 sets of grfpair_num (2 bits) and grfpair_byte_offset (6 bits): GRF-pair number and offset, one per region.

fragment_byte_enable (16 bits): Region byte enable bit-vector (for Tile-Y, this is for one region).

Total=4+4*2+4+4+2+5+2+4*(2+6)=61 bits

The following pseudo code illustrates an embodiment of a process for handling of data in a system:

```
// Generate byte_enables (32-bit) and 32Byte write data per region.
// Calculate how many bytes will be replicated (if any)
wire [31:0] replicated_bytes;
```

```
casex (pixel_size)
   0: replicated_bytes = num_pixel_copies; // 8bpe
   1: replicated_bytes = num_pixel_copies*2; // 16bpe
   3: replicated_bytes = num_pixel_copies*4; // 32bpe
   default: replicated_bytes = 0; // illegal values
endcase
wire [5:0] pre_copy_width;
// Check if it is necessary to move the copy pointer due to pixel
replication at the beginning
pre_copy_width = (left_oob == 1'b1)? replicated_bytes : 0;
for (region=0; region<4; region++)
begin
   // Generate destination grf-pair write byte-enable (64-bit vector).
   if (copy_width != 0) then
      // Offset the fragment_byte_enable by the destination (i.e. GRF-
      pair) byte offset
         dest_byte_enable[63:0] = fragment_byte_enable[15:0] <<
      grfpair_byte_offset[region][5:0];
         region_copy_data[255:0] = 256{1'b0} |
fragment_data[((row_pointer[region][1:0]*16+src_offset)*
8+copy_width*8−1):(row_pointer[region][1:0]*16+src_offset)*8] <<
(dest_offset[region]+pre_copy_width)*8;
   // Create the data and byte-enable vectors for the pixel
   replication (if any)
      grf_replication_byte_enable[31:0] = 32{1'b0};
      if (pre_or_post_replication == 1'b1) then
         // replication is done at the lower bytes of grf
         grf_replication_byte_enable[31:0] = 32{1'b0} | (((1 <<
         replicated_bytes) − 1) << dest_offset);
      end
      else begin
         // pixels are copied at the upper end of the GRF
         grf_replication_byte_enable[31:0] = 32{1'b0} | (((1 <<
         replicated_bytes) − 1) << (dest_offset+copy_width));
      end
      // Create the replicated data vector
      grf_replicated_data[255:0] = 256{1'b0};
      if (replicated_bytes != 0) begin
      byte_offset = 0;
      for (num_pixel=0; num_pixel<num_pixel_copies; num_pixel++)
      begin
         // Get the pixel data from cacheline and copy it to the right
         location
            grf_replicated_data[255:0] = grf_replicated_data[255:0] |
         (fragment_data[(replication_pixel_dword_offset*4+pixel_size)*8−
         1:replication_pixel_dword_offset*4*8] << byte_offset*8)
            byte_offset = byte_offset + (pixel_size + 1);
         end
         // Shift up the replicated data to the right grf location
         if (pre_or_post_replication == 1'b0) begin
            grf_replicated_data[255:0] = grf_replicated_data[255:0] <<
            (copy_width + dest_offset);
         end
         else begin
            grf_replicated_data[255:0] = grf_replicated_data[255:0] <<
            dest_offset;
         end
      end
      // Create the final BE and data bytes for this region
      region_byte_enable[region][31:0] =
grf_replication_byte_enable[31:0] | region_copy_byte_enable[31:0]
      region_data[region][255:0] = grf_replicated_data[255:0] |
region_copy_data[region];
end
// Generate Per-GRF write-enable, write data and BE, possibly OR-ing
data from different regions.
// Loop through all GRFs
for (i = 0; i<8; i++) begin
   grf_write_en[i] = 0;
   grf_byte_en[i][31:0] = 32'b0;
   grf_data[i][255:0] = 256'b0;
   // Loop through all regions
   for (region = 0; region < 4; region++) begin
      // Check if this region is targeting this grf
      if (region_valid[region] && (i == grf_num[region])) begin
         grf_write_en[i] = 1'b1;
         grf_byte_en[i][31:0] = grf_byte_en[i][31:0] |
      region_byte_enable[j][31:0];
         grf_data[i][255:0] = grf_data[i][255:0] |
```
```
      region_data[i][255:0];
      end //end if
   end //end for
end //end for
```

Figure 19:
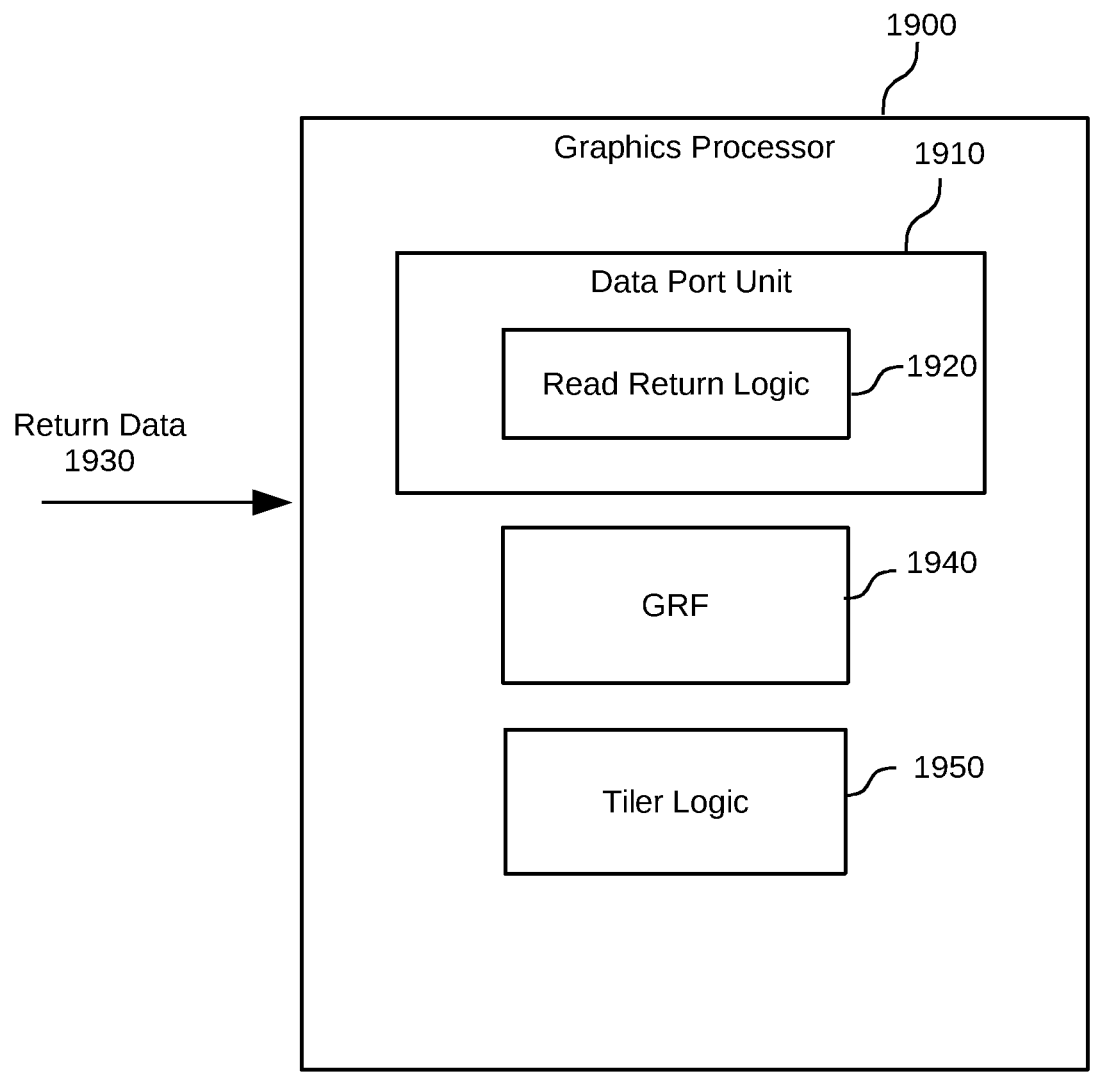
FIG. 19 is an illustration of a microarchitecture to handle return-data for media block messages in a graphics data port unit according to some embodiments.

FIG. 19 is an illustration of a microarchitecture to handle return-data for media block messages in a graphics data port unit according to some embodiments. In some embodiments, a graphics processor 1900 (such as graphics processor 200 illustrated in FIG. 2 or graphics processor 300 illustrated in FIG. 3) includes a data port unit 1910, the data port unit including read return logic 1920 to handle return data 1925 for media block messages. In some embodiments, the graphics processor 1900 includes general purpose register file (GRF) 1940 including a certain number of entries.

In some embodiments, return logic is to round the GRF pitch (number of bytes) for data storage up to a next $2^n$ boundary (referring to a byte value of $2^n$) for a received cache fragment of read return data, wherein the read-return logic 1920 is to write only the valid bytes from the cache fragment (i.e., potentially a non-$2^n$ number of bytes). In some embodiments, a GRF number (grf_num) and destination offset (dest_offset) are determined for the storage of the data fragment. In some embodiments, it is the responsibility of a tiler logic 1950 to increment the grf_num and dest_offset (as illustrated in the control information 1810 in FIG. 18) to account for the rounding factor for the data fragment, with a remaining number of padded bytes as required for the storage of the cache fragment in the established pitch. There is no requirement that the padded bytes be filled with any specific value, and the padded bytes will have unknown data.

Figure 20A:
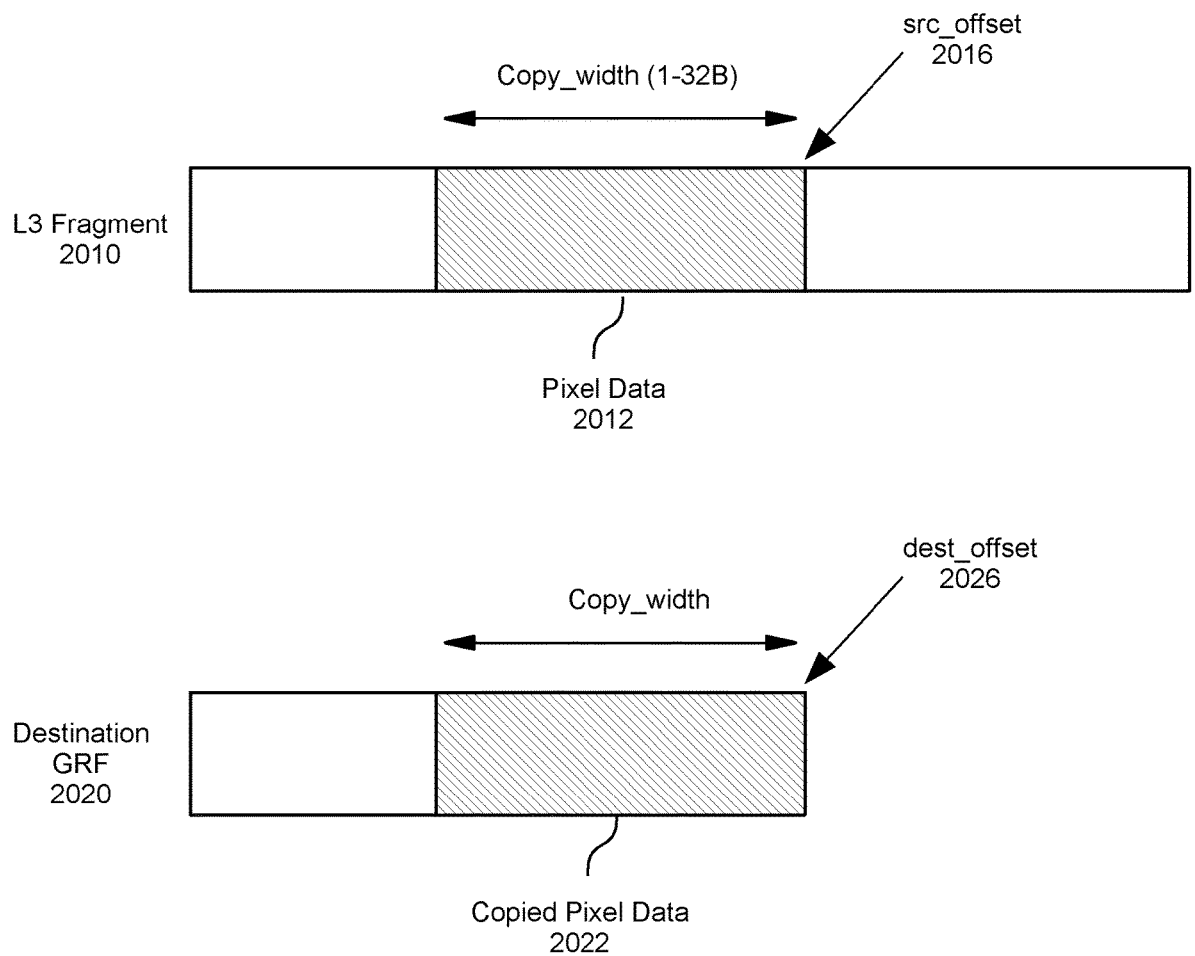
FIG. 20A is an illustration of a cache fragment and destination GRF entry according to some embodiments.

FIG. 20A is an illustration of a cache fragment and destination GRF entry according to some embodiments. In some embodiments, an L3 cache fragment 2010 (which may be referred to as the source of the fragment) includes data (such as pixel data 2012) of a certain copy width (copy_width=1-32B) that is offset by a certain source offset value (src_offset 2016). In some embodiments, a read return logic, such as read return logic 1920 illustrated in FIG. 19, is to write only the valid bytes from the L3 fragment (which thus may be a non-$2^n$ value) to a destination GRF entry 2020.

The destination GRF entry 2020 thus includes the data of the respective copy_width (which is copied pixel data 2022) that is offset by a certain destination offset (dest_offset 2026). In some embodiments, a tiler logic, such as tiler logic 1950 illustrated in FIG. 19, operates to increment the GRF number (grf_num) and the destination offset 2026 to account for rounding of the GRF pitch to the next $2^n$ boundary for the storage of the copied pixel data 2022.

Figure 20B:
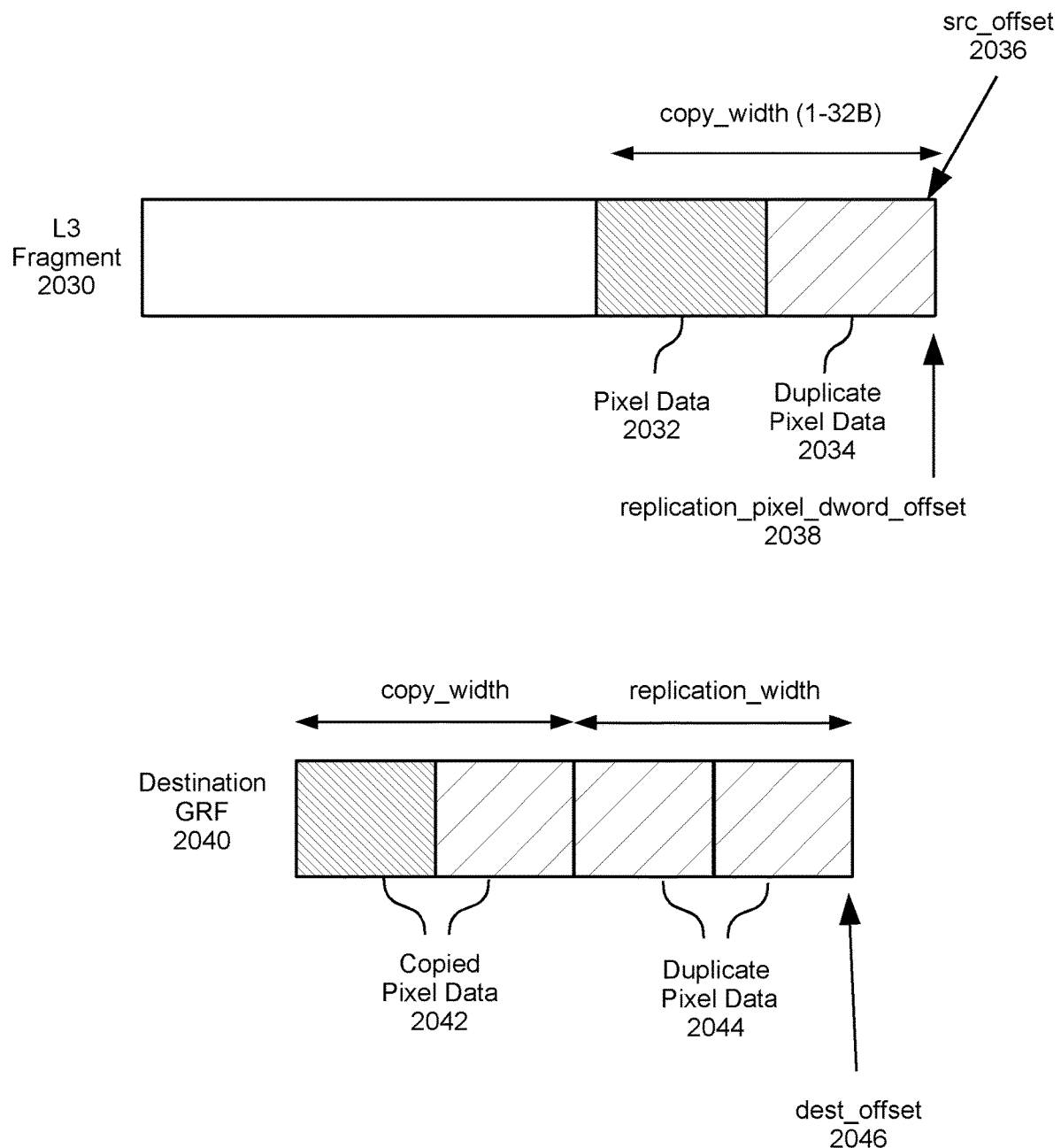
FIG. 20B is an illustration of a cache fragment and destination GRF including pixel duplication according to some embodiments.

FIG. 20B is an illustration of a cache fragment and destination GRF including pixel duplication according to some embodiments. As shown in FIG. 20B, in some embodiments, an L3 cache fragment 2030 includes data of a certain copy width (copy_width=1-32B) that is offset by a certain offset value (src_offset 2036). In this example, a process includes pixel duplication for OOB handling, the data thus including pixel data 2032 with a duplicate copy, illustrated as duplicate pixel data 2034. As illustrated in FIG. 20B, the offset may also be referred to as the replication pixel DWORD offset (replication_pixel_dword_offset 2038).

Thus, the pixel data is duplicated, and the resulting fragment data (pixel data 2032 and duplicate pixel data 2034) is then copied normally. This is "pre-replication", which is replication prior to copying to the destination GRF

2040. In some embodiments, "post-replication", which is replication after copying to the destination GRF 2040, results in copying the pixel data of the relevant copy width (copied pixel data 2042 deriving from pixel data 2032 and duplicate pixel data 2034) at the end of the destination GRF (resulting in duplicate pixel data 2046 of replication_width), which is offset by dest_offset 2046 to account for rounding of the GRF pitch to the next $2^n$ boundary for the storage of the copied pixel data 2042 and duplicate pixel data 2044.

As illustrated in FIG. 20B, the following apply:

(1) Pre/post replication width is a multiple of the pixel size.

(2) The source and destination copy_width are a multiple of the pixel size.

(3) The src_offset and replication_pixel_dword_offset are aligned to a pixel boundary.

(4) Total GRF bytes being written from a fragment (replicated bytes+copy bytes) does not exceed 32 bytes.

Figure 21:
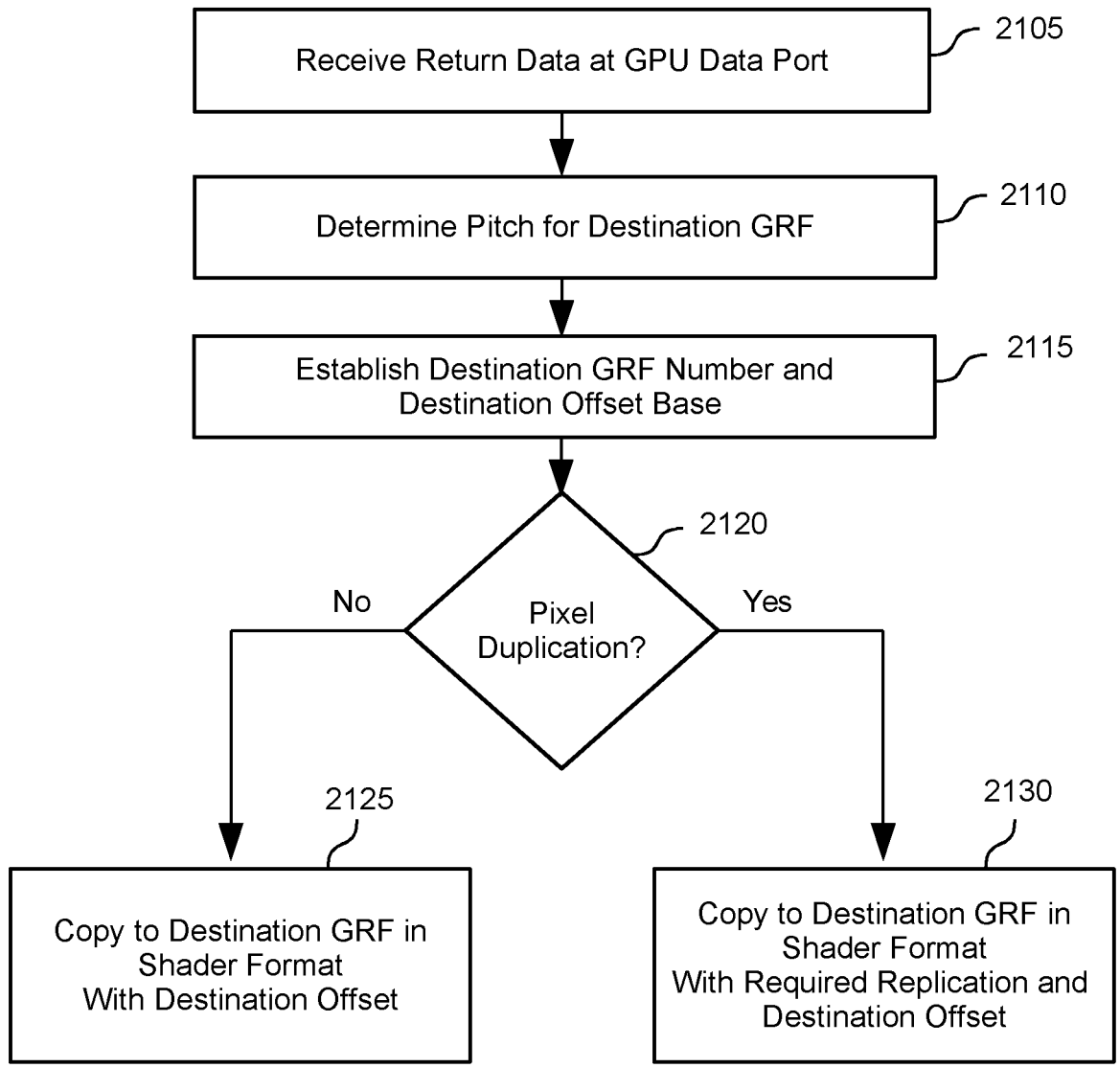
FIG. 21 is a flowchart to illustrate a process for assembly of memory read-return data for media block instructions into shader register format according to some embodiments.

FIG. 21 is a flowchart to illustrate a process for assembly of memory read-return data for media block instructions into shader register format according to some embodiments. In some embodiments, a process includes:

2105: Receive return data for a media block message at a graphical data port unit, such as at data port unit 1910 illustrated in FIG. 19. In some embodiments, the data includes a cache fragment (the fragment being non-$2^n$) in raw data format to be stored in cache and then to a destination GRF. The cache may be an L3 cache, such as included within the cache hierarchy illustrated in FIG. 2.

2110: Determine pitch for the destination GRF, wherein the pitch for a cache fragment is rounded up to a next $2^n$ boundary.

2115: Establish destination GRF number and destination offset based at least in part on copy width for the cache fragment and the determined GRF pitch.

2120: The handling of the data is dependent on whether the data handling is with or without pixel duplication.

In some embodiments, data handling for a cache fragment directed to a destination GRF entry without pixel duplication is as follows:

2125: Copy data to the designated destination GRF in shader format, the copied pixel data being stored in the destination GRF 2020 with the established destination offset, such as illustrated in FIG. 20A.

In some embodiments, data handling for a cache fragment directed to a destination GRF entry with pixel duplication is as follows:

2130: Copy data to the designated destination GRF in shader format, the copied pixel data being stored in the destination GRF, the pixel data being replicated the required number of times and offset by the established destination offset, such as illustrated in FIG. 20B.

Remapping of Scatter-Gather SIMD Instructions to Untyped Surface Instruction Types for Area-Efficiency and Hardware Simplification SIMD (Single Instruction Multiple Data) systems generally operate with memory that is laid out in a contiguous manner. In SIMD instructions, such as in a sparsely populated vector, gather operations operate to read elements from memory and pack them into SIMD registers. Similarly, scatter messages operate to unpack the stored data and write the data to individual memory locations.

However, conventional systems and processes support different messages natively in the hardware. Each message decoded is decoded and handled independently throughout the data port pipeline. Such a structure and process is costly in terms of gates and power.

In some embodiments, scatter-gather SIMD instructions are mapped by a data port to untyped surface instruction types, with the mapping occurring inside the data port pipeline. An instruction is typed if the specification of the instruction defines the types of data to which the instruction is applicable, with the instruction being inapplicable to other types. The mapping of scatter-gather SIMD instructions to such untyped surface instruction types may be utilized to improve area efficiency of the data port logic, as well as to reduce complexity and provide better TTM (time to market) because a manufacturer is not required to design for and validate certain message types in the data port controller.

In some embodiments, an apparatus, system, or process is to map API defined double-word/quad-word (DWORD/QWORD) scatter-gather and Atomic messages to an existing untyped surface read/write message type. The mapping of messages to such untyped surface message type may be implemented without causing additional read/write bandwidth. Further, such mapping may be implemented without compromising any throughput expectations or adding additional latency through the data port pipeline.

Figure 22:
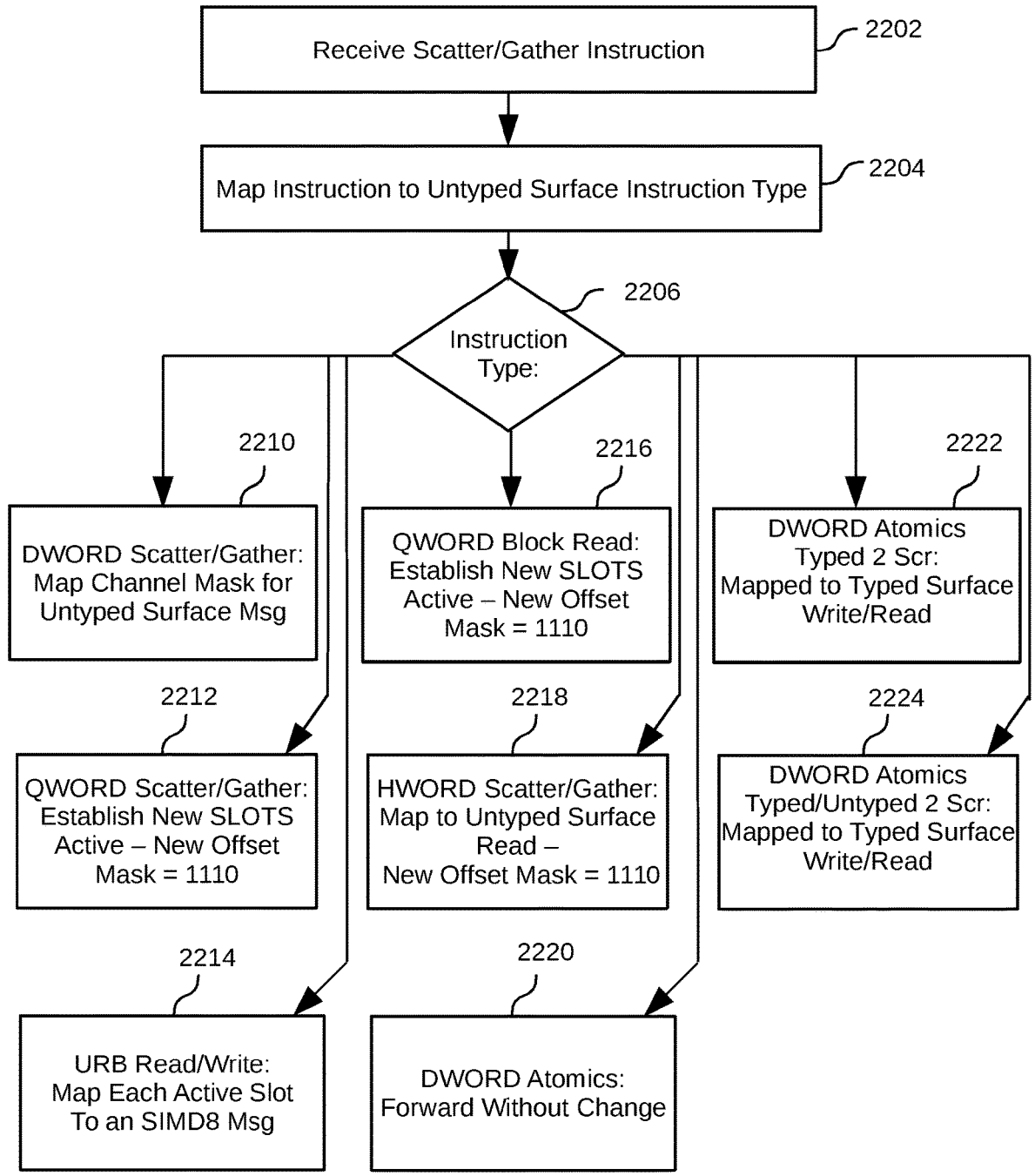
FIG. 22 is a flowchart to illustrate a process for remapping of scatter-gather SIMD instructions to untyped surface instructions types according to some embodiments.

FIG. 22 is a flowchart to illustrate a process for remapping of scatter-gather SIMD instructions to untyped surface instructions types according to some embodiments. In some embodiments, a process may include the following:

2202: Receive scatter or gather instruction.

2204: Map instruction to untyped surface instruction type according to the relevant instruction type (2206):

2210: DWORD Scatter/Gather→Mapped to Untyped Surface Write/Read

In some embodiments, DWORD scatter/gather messages are mapped to untyped surface messages without requiring change to any other message payload or function control except for mapping of the Message Lento Channel Mask for the Untyped Surface Message.

Table 2 shown below illustrates mapping of a DWORD message according to an embodiment:

TABLE 2

Mapping of DWORD Instruction

| DWORD Message Length | Converted Untyped Surface Channel Mask |
| --- | --- |
| 00 | 1110 |
| 01 | 1100 |
| 10 | 0000 |

The U offset for DWORD scatter/gather messages is the DWORD address, which means the offset needs to left shift by 2. An exception is A64 Messages, which have Byte addressing at all times.

2212: QWORD Gather/Scatter→Mapped to Untyped Surface Read/Write

In some embodiments, QWORD Scatter/Gather messages are also mapped to Untyped surface instructions. In this instance, the SIMD mode comes into play because the writeback for QWORD is 64 Bits per slot. The mapped untyped surface message will have the channel mask set to 1110 because only one DWORD per slot is required. The channel mask indicates which channels are valid for this access. Each SIMD can have up to 4 "channels" of data access: red, green, blue, alpha. A '0' in the channel mask means that the respective channel is accessed, and a '1' means that the respective channel is masked.

Table 3 shown below illustrates mapping of a SIMD8 QWORD message according to an embodiment:

TABLE 3

Mapping of QWORD Instruction

| SIMD Mode | SLOTS Active | New Message SIMD | New Message Slots Active | New Message U | New Message Channel Mask |
|---|---|---|---|---|---|
| SIMD8 | 0 | SIMD16 | 0 & 1 | U[0] and U[0] + 4 | 1110 |
|  | 1 |  | 2 & 3 | U[1] and U[1] + 4 |  |
|  | 2 |  | 4 & 5 | U[2] and U[2] + 4 |  |
|  | 3 |  | 6 & 7 | U[3] and U[3] + 4 |  |
|  | 4 |  | 8 & 8 | U[4] and U[4] + 4 |  |
|  | 5 |  | 10 & 11 | U[5] and U[5] + 4 |  |
|  | 6 |  | 12 & 13 | U[6] and U[6] + 4 |  |
|  | 7 |  | 14 & 15 | U[7] and U[7] + 4 |  |

In equation form, the following describes the mapping process for a QWORD message:

```
For (i = 0; i <8; i ++) begin
    new_slot_en[2*i] = slot_en;
    new_slot_en[2*i+1] = slot_en;
    new_u[2*i] = u[i];
    new_u[2*i+1] = u[i] + 4;
end
```

Similarly, if a message is a SIMD16 message, the message is broken into two SIMD8 messages with Slot 0-7 and Slot 8-15. For each of these messages the above description for SIMD8 is used for mapping to untyped surface read/write messages. Further, for MSG_LEN (message length in bytes)=2 & 4, the Message will be broken those many times.

In some embodiments, the offset (U) for a QWORD scatter/gather message is the QWORD address, which means the offset needs to left shift by 3. As with DWORD message, A64 messages are an exception, A64 messages having Byte addressing at all times.

2214: URB Read/Write→Mapped to Untyped Surface Read/Write

A URB (Unified Return Buffer) instruction is currently processed with only one slot at a time, with the U offset for the URB message being aligned to 16B.

In some embodiments, each active slot of a URB message is to be mapped to a SIMD8 message, thereby generating the same number of messages as the active slots. With each message, the rlen will be set to 0 because it occupies just 1 GRF. Each of the slots mapping to SIMD8 message will have the same number of slots enabled as the channel mask of the original URB message. Note the new channel mask will be 1110 because each slot will access only one DWORD.

Table 4 below is an illustration of mapping of a SIMD8 URB message according to an embodiment.

TABLE 4

Mapping of QWORD Instruction

| Slots Active | New Message SIMD | New Message Slots Active | New Message U(Byte addr) | New Message Channel Mask |
|---|---|---|---|---|
| 0 | SIMD8 | Channel Mask[7:0] | U[0], | 1110 |
| 1 |  |  | U[0] + 4, |  |
| 2 |  |  | U[0] + 8, |  |
| 3 |  |  | U[0] + 12, |  |
| 4 |  |  | U[0] + 16, |  |
| 5 |  |  | U[0] + 20, |  |
| 6 |  |  | U[0] + 24, |  |
| 7 |  |  | U[0] + 28 |  |

The U offset for a URB message is a 32-bit address, which thus means the offset needs to left shift by 5 bits.

2216: QWORD Block Read→Mapped to Untyped Surface Write/Read

In some embodiments, QWORD block read is also mapped to Untyped Surface Reads with Channel mask=1110. Table 5 below is an illustration of mapping of a QWORD block read message according to an embodiment.

TABLE 5

Mapping of QWORD Instruction

| Block Len | New Message SIMD | New Message SLOTS Active | New Message U(Byte addr) | New Message Channel Mask |
|---|---|---|---|---|
| 1 | SIMD8 | 0-3 | U, U + 4, U + 8, U + 12 | 1110 |
| 2 | SIMD8 | 0-7 | U, U + 4, U + 8, . . . , U + 28 |  |
| 4 | SIMD16 | 0-15 | U, U + 4, U + 8, . . . , U + 60 |  |
| 8 | SIMD16 | 0-15 | U, U + 4, U + 8, . . . , U + 60 |  |
|  | SIMD16 | 0-15 | U + 64, U + 68, U + 72, . . . , U + 124 |  |

2218: HWORD Block Read→Mapped to Untyped Surface Write/Read

In some embodiments, HWORD (Half Word) block read is also mapped to Untyped Surface Reads with Channel mask=1110. Table 6 is a table based on the Block Length.

TABLE 6

Mapping of QWORD Instruction

| Block Len | New Message SIMD | New Message SLOTS Active | New Message U(Byte addr) | New Message Channel Mask |
|---|---|---|---|---|
| 1 | SIMD8 | 0-7 | U, U + 4, U + 8, . . . , U + 28 | 1110 |
| 2 | SIMD8 | 0-15 | U, U + 4, U + 8, . . . , U + 60 |  |
| 4 | SIMD16 | 0-15 | U, U + 4, U + 8, . . . , U + 60 |  |

TABLE 6-continued

Mapping of QWORD Instruction

| Block Len | New Message SIMD | New Message SLOTS Active | New Message U(Byte addr) | New Message Channel Mask |
|---|---|---|---|---|
| | SIMD16 | 0-15 | U + 64, U + 68, U + 72, . . . , U + 124 | |
| 8 | SIMD16 | 0-15 | U, U + 4, U + 8, . . . , U + 60 | |
| | SIMD16 | 0-15 | U + 64, U + 68, U + 72, . . . , U + 124 | |
| | SIMD16 | 0-15 | U + 128, U + 132, U + 136, . . . , U + 188 | |
| | SIMD16 | 0-15 | U + 192, U + 196, U + 200, . . . , U + 252 | |

2220: DWORD Atomics (Typed/Untyped) 0/1 Src→ Mapped to Typed/Untyped Surface Write/Read In some embodiments, DWORD atomics are handled as standard forward without changes to multi-message generations. Typed messages go forward as Typed read/writes 32 BPP (Bits Per Pixel). In some embodiments, DWORD Untyped Atomics are mapped to Untyped Surface in the manner of DWORD Scatter/gather described above with MSG_LEN=1 DWORD. For 0 src force all BE to 0, while DATA can be X.

2222: DWORD Atomics Typed 2 Src→Mapped to Typed Surface Write/Read

In some embodiments, DWORD atomics are mapped directly to Typed surface write/read with 2 channels enabled, as shown in Table 7.

TABLE 7

Mapping of DWORD Atomics

| Old SIMD | New Message SIMD | SRFT | Message Channel Mask |
|---|---|---|---|
| SIMD8 | SIMD1 | R_32 | 1110 |
| | SIMD1 | R_32 | 1110 |
| | SIMD1 | R_32 | 1110 |
| | SIMD1 | R_32 | 1110 |
| | SIMD1 | R_32 | 1110 |
| | SIMD1 | R_32 | 1110 |
| | SIMD1 | R_32 | 1110 |
| | SIMD1 | R_32 | 1110 |

2224: DWORD Atomics (Typed/Untyped) 2 Src→ Mapped to Typed/Untyped Surface Write/Read In some embodiments, DWORD atomics are mapped to typed/untyped surface write/read as shown in Tables 8 and 9:

TABLE 8

Mapping of DWORD Untyped 2 Src Atomics

| Old SIMD | New Message SIMD | Message Channel Mask Write | Message Channel Mask Read |
|---|---|---|---|
| SIMD8 SIMG16 | SIMD8 SIMD16 | 1100 | 1110 |

TABLE 9

Mapping of DWORD Untyped 2 Src Atomics (64 Bit Operations)

| Old SIMD | New Message SIMD | Message Channel Mask Write | Message Channel Mask Read |
|---|---|---|---|
| SIMD8 SIMG16 | SIMD8 SIMD16 | 0000 | 1110 |

Area-Efficient Microarchitecture for Mixed Page-Size Support in a Graphics Data Port TLB A data port translation lookaside buffer (TLB) in general is a memory cache that is utilized to store recent translations of virtual memory to physical addresses to allow for faster retrieval of data.

In design and operation of a TLB, providing support for larger page sizes (e.g., 64 KB, 2 MB) can greatly improve the TLB hit rate, and thus improve operational efficiency. However, supporting mixed size pages inside the data port TLB is a complex issue because, when a TLB miss happens, the page size of the request will not be known.

In some embodiments, a microarchitecture for a data-port controller for a TLB (translation lookaside buffer) provides support for mixed-page size elements in a manner that is area efficient and allows efficient operation, the microarchitecture operating to avoid duplication of entries in the TLB.

A traditional graphics TLB architecture allocates entry (for fill) at the first lookup time, in case of a TLB miss. This is not efficient when the same graphics context has mixed page sizes (e.g. 64 KB and 4 KB pages). This is because, at the request time, for a TLB miss, the page size not known. The page size is only known when a lower level TLB is checked (and hit) or the page table is walked, which can take from tens of cycles to hundreds of cycles. Because the page size is not known upfront, the traditional TLB architecture is required to make a conservative assumption that the page is of the smallest size (i.e., 4 KB). For this reason, if there are multiple requests back to back to the same 64 KB page in a short time (which is common when a new thread is started) that miss the TLB, the architecture may allocate up to 16 different entries assuming 4 KB page size. This wastes TLB entries by a factor of 16, and, for small TLB size, it causes a large performance loss.

In some embodiments, a microarchitecture instead moves the fill entry allocation to the end of the pipeline, after the result from the lower level TLB is received. At that point, the page size is known, and in an example of a 64 KB page, only one entry is allocated.

Figure 23:
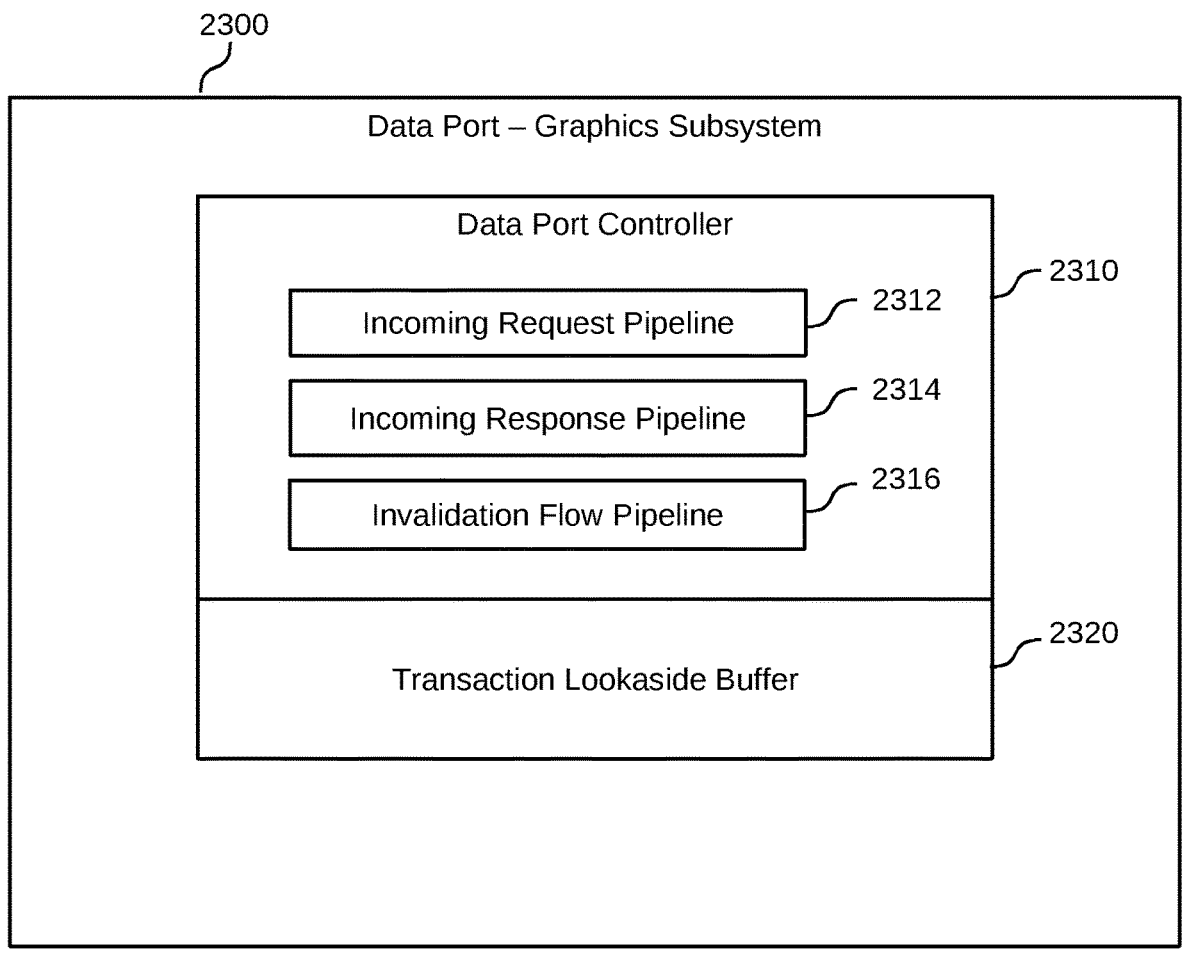
FIG. 23 is an illustration of a data port controller to support mixed page sizes in a graphics data port translation lookaside buffer (TLB) according to some embodiments.

FIG. 23 is an illustration of a data port controller to support mixed page sizes in a graphics data port TLB according to some embodiments. In some embodiments, a data port controller 2310 of a graphics data port 2300 provides support for multiple page sizes in a data port TLB 2320. As illustrated in FIG. 23, the data port controller 2310 includes three different pipelines, the pipelines being the following:

(a) An incoming request pipeline 2312 (a first pipeline) to process an incoming request for address translation with virtual address (VA) and generate an L3 response for an IOMMU (I/O Memory Management Unit) interface, wherein the IOMMU interface refers to fabric connecting the data port to the IOMMU.

(b) Incoming response pipeline 2314 (a second pipeline) to receive an incoming response and generate an L3 request.

(c) An invalidation flow pipeline 2316 (a third pipeline).

Figure 24:
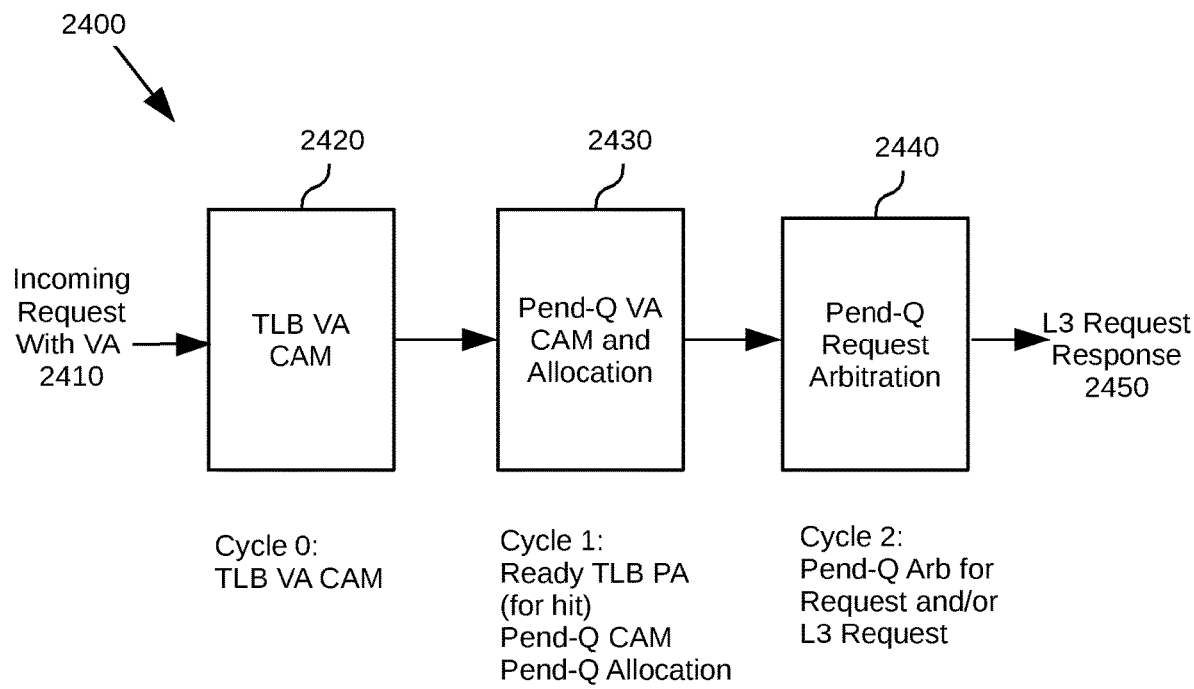
FIG. 24 is an illustration of a pipeline for incoming requests with virtual addresses according to some embodiments.

FIG. 24 is an illustration of a pipeline for incoming requests with virtual addresses according to some embodiments. In some embodiments, a pipeline (such as incoming request pipeline 2312 of data port controller 2310 illustrated in FIG. 23) for incoming requests 2410 includes the following:

Cycle 0: A first stage 2420 to receive incoming request for TLB with virtual address (VA) 2410 in TLB content addressable memory (CAM). If the virtual address is a hit in the TLB, determine new least frequently used (LRU) value and physical address (PA) array index.

Cycle 1: A second stage 2430 to write the request into the pending queue (Pend-Q) virtual address CAM. If the request is a TLB-hit, then the physical address (PA) is written in the Pend-Q entry. For a non-coherent tiled resource translation table (TRTT) request, the PA is same as the VA, and the null tile information is also written (if this is known from TLB-hit). The request VA (page and line) is CAM-ed with all Pend-Q entries. In some embodiments, the second stage of the pipeline provides the following:

(a) Same cache line (CL) address dependency check: To make certain that requests to the same address and from same thread are properly ordered, the incoming VA[47:6] and thread-id are compared with all Pend-Q entries. The CAM returns the youngest entry among all hits. If a match is found:

(i) If the hit pend-Q entry is NOT ready (not ready to be scheduled), then the new entry is marked as being dependent on the hit entry. The new entry will be ready only after the previous CAM match entry's status is ready.

(b) Same page-address check: If the page-address of the incoming entry matches with any of existing Pend-Q entries, and if the new entry is a TLB-miss, then:

(i) If the hitting pend-Q entry does not have its physical address yet (i.e., the entry is waiting for the response to the request for address translation), then the new entry will use the Index number of the previous matching entry and will wait for the same response. This is hit-to-miss case (does not launch a new request for address translation).

ii. Otherwise (there being no Pend-Q page match or Pend-Q page match has already received physical address), the incoming request will launch its own request for address translation. It is noted that it is possible to read out the PA from the ready entry. However, this operation would require multiplexing logic to read PA for a seemingly uncommon case, and thus it may be preferable to instead launch a new request for address translation.

Cycle 2: A third stage 2440 to arbitrate all ready Pend-Q entries, with the oldest ready entry being selected for L3. The oldest request that requires address translation is selected for the L3 request 2450. The tag for the L3 request 2450 is the Pend-Q entry number.

Thus, for response processing, the response is returned with tag, physical address, page-size (4 KB/64 KB/2 MB), and Null information (for TRTT).

Figure 25:
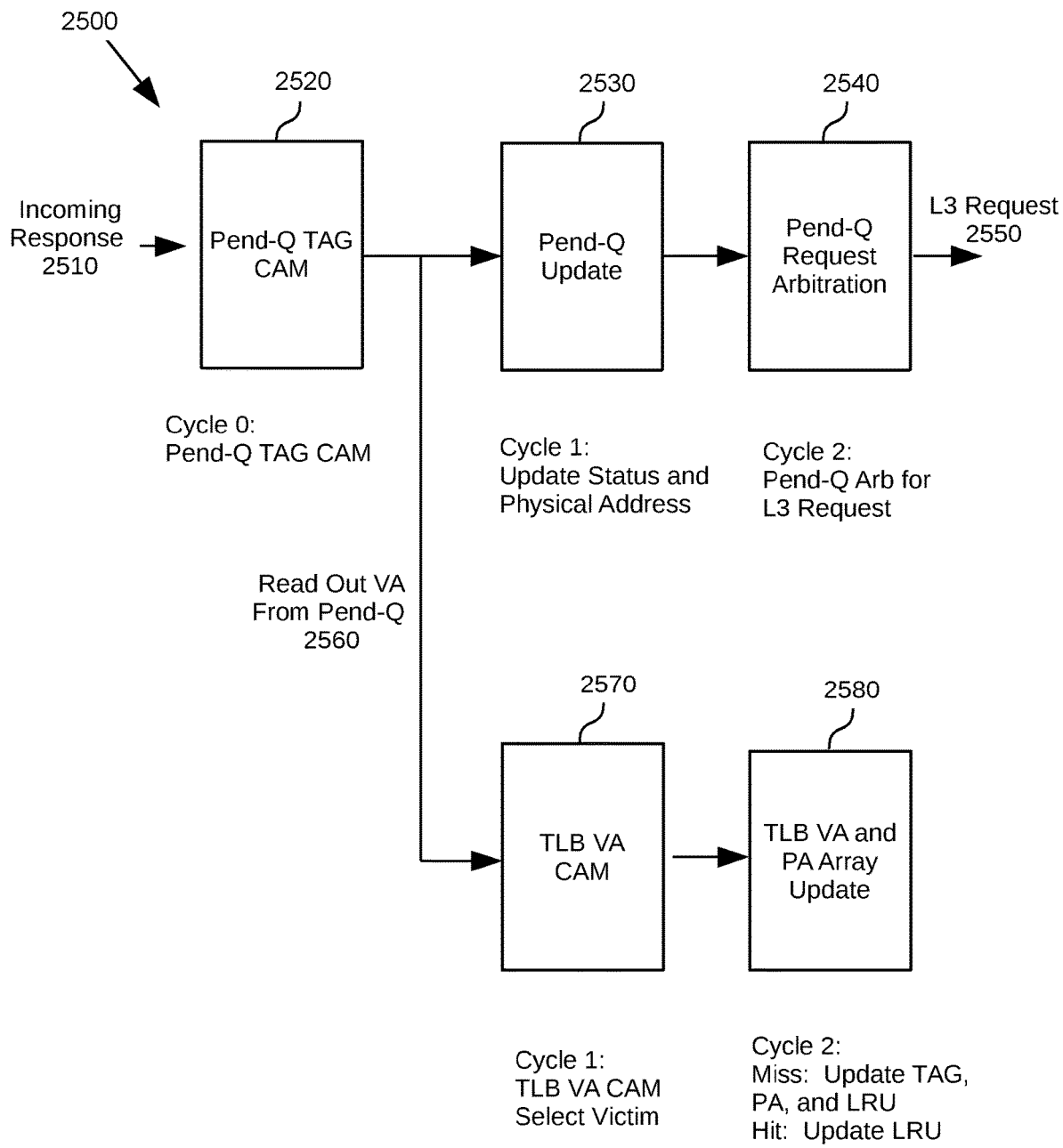
FIG. 25 is an illustration of a pipeline for incoming responses to address translation requests according to some embodiments.

FIG. 25 is an illustration of a pipeline for incoming responses to address translation requests according to some embodiments. In some embodiments, a pipeline for incoming responses 2500 (such as incoming response pipeline 2314 of data port controller 2310 illustrated in FIG. 23) includes the following:

Cycle 0 (a first clock cycle): A first stage 2520 in the pipeline to receive the incoming IOMMU interface response 2510. The tag for the IOMMU interface response is CAM matched with all Pend-Q entries, and any entry that is waiting for that tag is to update its physical address and status from the IOMMU interface response.

Cycle 1 (a second clock cycle): A second stage 2530 in the pipeline to update the Pend-Q entries, wherein the physical address and status of each Pend-Q entry is updated based on any respective tag match in the previous clock.

Cycle 2 (a third clock cycle): A third stage 2540 in the pipeline following the second stage in the pipeline to perform Pend-Q request arbitration to select an L3 cache request 2550.

Also operating in Cycle 1, a fourth stage 2570 in the pipeline to read out the virtual address 2560 from one of the matching entries from the first stage 2520, the virtual address to be used in CAM matching TLB (for update). In case of a miss, a victim entry (to be evicted from the cache) is to be selected.

Also operating in Cycle 2, a fifth stage 2580 in the pipeline is to perform TLB virtual address and physical address array update. If there is a CAM hit on the TLB, the LRU is updated (because the entry is already present). If there is a miss in the TLB, the Physical address and Tag (i.e., the VA) is written in the victim entry, and the LRU is updated.

In some embodiments, the TLB CAM port is arbitrated between the IOMMU interface response and a new request. In case of a conflict, the new request is back-pressured.

Figure 26:
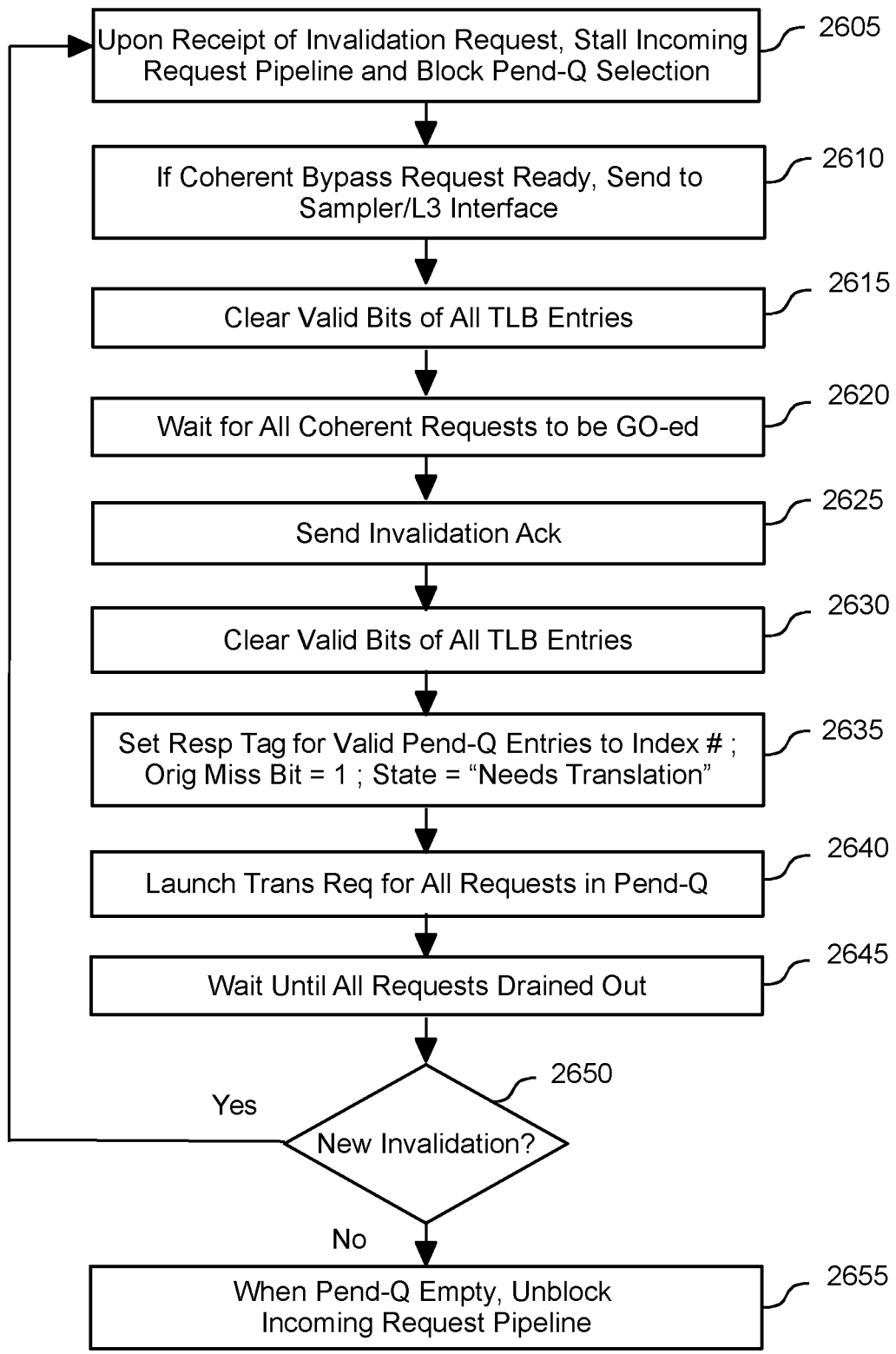
FIG. 26 is an illustration of an invalidation pipeline flow for incoming responses to address translation requests according to some embodiments.

FIG. 26 is an illustration of an invalidation pipeline flow for incoming responses to address translation requests according to some embodiments. If operating system (OS) managed shared virtual memory (SVM) is supported or VT-d (Virtualization Technology for Directed I/O) is supported, the invalidation flow is more complex because the invalidation can come asynchronously while there are in-flight requests from the same address space being invalidated. Before sending the invalidation acknowledgement, the data port TLB is required to ensure either that the requests that are already translated in the pipeline are globally observed (GO-ed), or that the translations that are not GO-ed are re-translated after the invalidation acknowledgement (Ack).

In some embodiments, the Invalidation command is inline on the system memory port-data port IOMMU interface. When the system memory port sends an Invalidation, any previous translation request for which there has not yet been a response will be dropped by the system memory port.

In some embodiments, an invalidation flow (such as for invalidation flow pipeline 2316 of data port controller 2310 illustrated in FIG. 23) is as follows:

2605: When an "Invalidation" request is received on the IOMMU interface, stall the incoming request pipeline, and block selection of the oldest Pend-Q Ready request for retirement.

2610: If there was a coherent bypass request Ready (already translated), the request is sent to the Sampler/L3 interface.

2615: Clear the valid bits of all TLB entries.

2620: Wait for all coherent requests that are already sent to Sampler/L3 interface to be GO-ed.

2625: Send Invalidation Ack to the system memory port.

2630: Wait for system memory port response—"Invalidation completed"

The following elements 2635 and 2640 regard re-launching the translation for all requests. All pre-invalidation translated requests should either be GO-ed or should be translated again, even if these requests had valid physical addresses before the invalidation cycle started.

2635: For all Pend-Q entries that are valid, set the "Response Tag" field to the entries' index number. Further, set the "Original Miss" bit as 1. Set the state of each of the entries to "Need Translation".

In some embodiments, 2635 may be performed prior to before 2625 and 2630.

2640: For all requests in the Pend-Q, a translation request is launched to the system memory port, and the request is drained to Sampler/L3 after the responses arrive. In some embodiments, in order to keep the needed hardware relatively simple, this process is performed serially, i.e. the request at the head of the queue is processed. When the request at the head of the queue drains out and the head pointer moves to the next request, it is processed in the same way.

2645: Wait until all the requests are drained out.

2650: If there is a new Invalidation from the system memory port during this process, return to 2605.

2655: When the Pend-Q is empty, un-block the incoming request pipeline.

In some embodiments, an apparatus includes a graphics subsystem, the graphics subsystem including one or more of the following logics for handling of graphical data: a first logic for processing of memory read-return data for single-instruction-multiple-data instructions, the first logic to store data for a message in raw data format and delay conversion into shader format until all cache line requests for the message have been received; a second logic for assembly of memory read-return data for media block instructions into shader register format, the second logic to provide for storage of valid bytes from a cache fragment in a register; or a third logic to remap scatter or gather instructions to untyped surface instruction types.

In some embodiments, the first logic includes a data array to store read data for a message received at a data port in a raw memory format; a tracking logic to track receipt of cache line requests for the message; and an assembly logic to process the raw memory formatted read data and assemble the read data into register format.

In some embodiments, the tracking logic is to provide a signal to the assembly logic upon determining that all cache line requests for the message have been received.

In some embodiments, upon receipt of the signal from the tracking logic, the assembly logic is to read the raw memory formatted read data from the data array, assemble the read data into register format, and store the register formatted read data.

In some embodiments, the first logic includes a byte addressable side structure to store the register formatted read data.

In some embodiments, the second logic includes a read return logic of a data port unit to handle return data for media block messages; a cache memory; and a general purpose register file (GRF). In some embodiments, the read return logic is to round a pitch of the GRF for storage of the cache fragment up to a next $2^n$-byte pitch value and to store only valid bytes from the cache fragment in the GRF.

In some embodiments, the cache fragment is to be stored at a determined destination offset in an entry in the GRF, the destination offset to account for rounding of the pitch to the next $2^n$-byte pitch value.

In some embodiments, a tiler logic is to increment a GRF number and the destination offset for storage of the cache fragment.

In some embodiments, remapping of scatter or gather instructions occurs within a data port pipeline.

In some embodiments, an apparatus includes a graphics subsystem, the graphics subsystem including a translation lookaside buffer (TLB); and a data port controller to control the TLB, the data port controller including an incoming request pipeline to receive an incoming request with virtual address and generate a response, an incoming response pipeline to receive the response and generate a cache request, and an invalidation flow pipeline.

In some embodiments, the incoming request pipeline includes a first stage to receive the request and, upon determining there is a hit in the TLB, determine new least frequently used (LRU) value and physical address (PA) array index; a second stage to write the request into a pending queue virtual address content addressable memory; and a third stage to arbitrate pending queue entries that are ready to be scheduled and to select an oldest request that requires address translation for the response.

In some embodiments, the incoming response pipeline includes a first stage to receive the response, to determine if a tag for the response matches one or more pending queue entries, and, upon determining that the tag matches with any pending queue entry, to update the matching queue entry's physical address and status; a second stage to update the pending queue entries, physical address and status of each pending queue being updated based up on any match that is identified by the first stage; and a third stage to perform pending queue arbitration to select an L3 cache request.

In some embodiments, the incoming response pipeline further includes a fourth stage to read out a virtual address from one of the one or more matching entries from the first stage for use in a TLB matching operation; and a fifth stage to perform virtual address and physical address array update based on the TLB matching operation.

In some embodiments, the first stage is to operate in a first clock cycle; the second and fourth stages are to operate in a second clock cycle; and the third and fifth stages are to operate in a third clock cycle.

In some embodiments, a non-transitory computer-readable storage medium has stored thereon data representing sequences of instructions that, when executed by a processor, cause the processor to perform operations including handling received graphical data, including one or more of the following: a first process for receiving a message including read data in a raw memory format, and assembling the read data into register format upon all cache line requests for the message being received; a second process for assembling memory read-return data for media block instructions into shader register format, including storing of valid bytes from a cache fragment into a register; or a third process for remapping scatter or gather instructions to untyped surface instruction types.

In some embodiments, the first process includes receiving read data for a message at a data port, the data being received in raw memory format; storing the data in raw memory format in a data array; tracking cache line requests for the message; determining whether all cache line requests for the message have been received; upon all cache line requests for the message being received, reading the raw memory data from the data array; assembling the raw memory formatted read data into register format; and storing the register formatted read data.

In some embodiments, the first process further includes providing a signal upon determining that all such cache line requests have been received.

In some embodiments, storing the register formatted read data including storing the register formatted read data in a byte addressable side structure.

In some embodiments, the second process includes receiving return data for a media block message at a graphical data port unit, the data including a cache fragment in raw data format; determining a pitch for a destination general purpose register file (GRF), wherein the pitch is rounded to a next $2^n$ bytes pitch; determining a destination offset for the destination GRF; and copying data from the cache fragment to the destination GRF in shader format, the copied data being offset by the destination offset.

In some embodiments, the copied data from the cache fragment includes duplicated data from the cache fragment.

In some embodiments, the remapping of the third process includes performing remapping of scatter or gather instructions occurs within a data port pipeline.

In some embodiments, a non-transitory computer-readable storage medium has stored thereon data representing sequences of instructions that, when executed by a processor, cause the processor to perform operations including receiving an incoming request with virtual address at a data port, the data port including a translation lookaside buffer (TLB); generating a response for the request; receiving the response and generating a cache request; and processing one or more invalid requests.

In some embodiments, generating the response for the request includes receiving the incoming request and, upon determining there is a hit in the TLB, determining new least frequently used (LRU) value and physical address (PA) array index; writing the request into a pending queue virtual address content addressable memory; and arbitrating pending queue entries that are ready to be scheduled, and selecting an oldest request that requires address translation for the response.

In some embodiments, generating the cache request includes receiving the response, determining if a tag for the response matches one or more entries in the pending queue, and, upon determining that the tag matches with any pending queue entry, to update the matching entry's physical address and status; updating the pending queue entries, the physical address and status of each pending queue being updated based upon any match that is identified with the tag for the response; and performing arbitration in the pending queue to select an L3 cache request.

In some embodiments, generating the cache request further includes reading out a virtual address from one of the one or more matching entries for use in a TLB matching operation; and performing virtual address and physical address array update based on the TLB matching operation.

In some embodiments, an apparatus includes means for handling received graphical data, including one or more of the following: a first means for receiving a message including read data in a raw memory format, and assembling the read data into register format upon all cache line requests for the message being received; a second means for assembling memory read-return data for media block instructions into shader register format, including storing of valid bytes from a cache fragment into a register; or a third means for remapping scatter or gather instructions to untyped surface instruction types.

In some embodiments, the first means includes means for receiving read data for a message at a data port, the data being received in raw memory format; means for storing the data in raw memory format in a data array; means for tracking cache line requests for the message; means for determining whether all cache line requests for the message have been received; means for reading the raw memory data from the data array upon all cache line requests for the message being received; means for assembling the raw memory formatted read data into register format; and means for storing the register formatted read data.

In some embodiments, the first means further includes means for providing a signal upon determining that all such cache line requests have been received.

In some embodiments, the means for storing the register formatted read data includes means for storing the register formatted read data in a byte addressable side structure.

In some embodiments, the second means includes means for receiving return data for a media block message at a graphical data port unit, the data including a cache fragment in raw data format; means for determining a pitch for a destination general purpose register file (GRF), wherein the pitch is rounded to a next $2^n$ bytes pitch; means for determining a destination offset for the destination GRF; and means for copying data from the cache fragment to the destination GRF in shader format, the copied data being offset by the destination offset.

In some embodiments, the copied data from the cache fragment includes duplicated data from the cache fragment.

In some embodiments, the remapping of the third means includes means for performing remapping of scatter or gather instructions occurs within a data port pipeline.

In some embodiments, an apparatus includes means for receiving an incoming request with virtual address at a data port, the data port including a translation lookaside buffer (TLB); means for generating a response for the request; means for receiving the response and generating a cache request; and means for processing one or more invalid requests.

In some embodiments, the means for generating the response for the request includes means for receiving the incoming request and means for determining new least frequently used (LRU) value and physical address (PA) array index upon determining there is a hit in the TLB; means for writing the request into a pending queue virtual address content addressable memory; and means for arbitrating pending queue entries that are ready to be scheduled, and selecting an oldest request that requires address translation for the response.

In some embodiments, the means for generating the cache request includes means for receiving the response, means for determining if a tag for the response matches one or more entries in the pending queue, and means for updating the matching entry's physical address and status upon determining that the tag matches with any pending queue entry; means for updating the pending queue entries, the physical address and status of each pending queue being updated based upon any match that is identified with the tag for the response; and means for performing arbitration in the pending queue to select an L3 cache request.

In some embodiments, the means for generating the cache request further includes means for reading out a virtual address from one of the one or more matching entries for use in a TLB matching operation; and means for performing virtual address and physical address array update based on the TLB matching operation.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

What is claimed is:

1. An apparatus comprising a graphics subsystem, the graphics subsystem including:
   a graphics data port, the graphics data port including:
      a translation lookaside buffer (TLB); and
      a data port controller to control the TLB, the data port controller including:
         an incoming request pipeline to receive and process incoming translation requests, including a first incoming translation request with virtual address, the first incoming translation request being received from a context having a plurality of different page sizes including a first page size and a second page size, the first page size being larger than the second page size, and, upon a miss in the TLB for the first incoming translation request, generate a cache request,
         an incoming response pipeline to receive and process a response to the cache request, and
         an invalidation flow pipeline for translation requests;
      wherein the data port controller is to provide a fill entry allocation for the TLB upon receiving the response to the cache request, the response to the cache request including a certain page size of the plurality of page sizes, the page size of the response being unavailable to the graphics data port until the response to the cache request is received.

2. The apparatus of claim 1, wherein the incoming request pipeline includes:
   a first stage to receive incoming translation requests and, upon determining there is a hit in the TLB for an incoming translation request, determine a new least frequently used (LRU) value and physical address (PA) array index;
   a second stage to write the incoming translation requests into a pending queue in virtual address content addressable memory (CAM); and
   a third stage to arbitrate pending queue entries in the pending queue that are ready to be scheduled and to select an oldest request that requires address translation for the cache request.

3. The apparatus of claim 1, wherein the incoming response pipeline includes:
   a first stage to receive the responses to cache requests, to determine if a tag for a received response to a cache request matches one or more pending queue entries, and, upon determining that the tag matches with any pending queue entry, to update the matching queue entry's physical address and status based on the received response;
   a second stage to update the pending queue entries, physical address, and status of each pending queue entry being updated based upon any match that is identified by the first stage; and
   a third stage to perform pending queue arbitration to select a cache request for processing.

4. The apparatus of claim 3, wherein the incoming response pipeline further includes:
   a fourth stage to read out a virtual address from one of the one or more matching entries from the first stage for use in a TLB matching operation, wherein, for a miss in the TLB, a victim entry is to be selected for eviction; and a fifth stage to perform virtual address and physical address array update based on the TLB matching operation, wherein, for a hit on the TLB, a least recently used (LRU) value is updated and, for a miss in the TLB, a physical address and tag is written into the victim entry.

5. The apparatus of claim 4, wherein:
the first stage of the incoming response pipeline is to operate in a first clock cycle;
the second and fourth stages of the incoming response pipeline are to operate in a second clock cycle; and
the third and fifth stages of the incoming response pipeline are to operate in a third clock cycle.

6. The apparatus of claim 1, wherein the received response to the cache request is derived from data stored in a lower level TLB.

7. A non-transitory computer-readable storage medium having stored thereon data representing sequences of instructions that, when executed by a processor, cause the processor to perform operations comprising:
receiving and processing incoming translation requests, including a first incoming translation request with virtual address, at a graphics data port, the first incoming translation request being received from a context having a plurality of different page sizes including a first page size and a second page size, the first page size being larger than the second page size, the graphics data port including a translation lookaside buffer (TLB) and a data port controller to control the TLB;
upon a miss in the TLB for the first incoming translation request, generating a cache request for the translation request;
receiving and processing a response to the cache request;
providing a fill entry allocation for the TLB upon receiving the response to the cache request, the response to the cache request including a certain page size of the plurality of page sizes, the page size of the response being unavailable to the graphics data port until the response to the cache request is received; and
performing an invalidation process for one or more translation requests.

8. The medium of claim 7, wherein receiving and processing the incoming translation requests includes:
receiving the incoming translation requests, and, upon determining there is a hit in the TLB for an incoming translation request, determining a new least frequently used (LRU) value and physical address (PA) array index;
writing the incoming translation requests into a pending queue in virtual address content addressable memory (CAM); and
arbitrating pending queue entries in the pending queue that are ready to be scheduled, and selecting an oldest request that requires address translation for the cache request.

9. The medium of claim 8, wherein receiving and processing responses to cache requests includes:
receiving a response to a first cache request, determining if a tag for the received response matches one or more entries in the pending queue, and, upon determining that the tag matches with any pending queue entry, to update the matching entry's physical address and status based on the received response;
updating the pending queue entries, the physical address and status of each pending queue entry being updated based upon any match that is identified with the tag for the response; and
performing arbitration in the pending queue to select a cache request for processing.

10. The medium of claim 9, wherein receiving and processing responses to cache requests further includes:
reading out a virtual address from one of the one or more matching entries for use in a TLB matching operation, wherein, for a miss in the TLB, a victim entry is to be selected for eviction; and
performing virtual address and physical address array update based on the TLB matching operation, wherein, for a hit on the TLB, a least recently used (LRU) value is updated and, for a miss in the TLB, a physical address and tag is written into the victim entry.

11. A method comprising:
receiving and processing incoming translation requests, including a first incoming translation request with virtual address, at a graphics data port, the first incoming translation request being received from a context having a plurality of different page sizes including a first page size and a second page size, the first page size being larger than the second page size, the data port including a translation lookaside buffer (TLB) and a data port controller to control the TLB;
upon a miss in the TLB for the first incoming translation request, generating a cache request for the translation request;
receiving and processing a response to the cache request;
providing a fill entry allocation for the TLB upon receiving the response to the cache request, the response to the cache request including a certain page size of the plurality of page sizes, the page size of the response being unavailable to the graphics data port until the response to the cache request is received; and
performing an invalidation process for one or more translation requests.

12. The method of claim 11, wherein receiving and processing the incoming translation requests includes:
receiving the incoming translation requests, and, upon determining there is a hit in the TLB for an incoming translation request, determining a new least frequently used (LRU) value and physical address (PA) array index;
writing the incoming translation requests into a pending queue in virtual address content addressable memory (CAM); and
arbitrating pending queue entries in the pending queue that are ready to be scheduled, and selecting an oldest request that requires address translation for the cache request.

13. The method of claim 12, wherein receiving and processing responses to cache requests includes:
receiving a response to a first cache request, determining if a tag for the received response matches one or more entries in the pending queue, and, upon determining that the tag matches with any pending queue entry, to update the matching entry's physical address and status based on the received response;
updating the pending queue entries, the physical address and status of each pending queue entry being updated based upon any match that is identified with the tag for the response; and
performing arbitration in the pending queue to select a cache request for processing.

14. The method of claim 13, wherein receiving and processing responses to cache requests further includes:

reading out a virtual address from one of the one or more matching entries for use in a TLB matching operation, wherein, for a miss in the TLB, a victim entry is to be selected for eviction; and performing virtual address and physical address array update based on the TLB matching operation, wherein, for a hit on the TLB, a least recently used (LRU) value is updated and, for a miss in the TLB, a physical address and tag is written into the victim entry.

* * * * *